United States Patent [19]
Ikemori et al.

[11] Patent Number: 5,305,148
[45] Date of Patent: Apr. 19, 1994

[54] COMPACT VARIFOCAL LENS

[75] Inventors: Keiji Ikemori; Kouji Oizumi; Yoshinori Itoh, all of Kanagawa, Japan

[73] Assignee: Canon Kabushiki Kaisha, Tokyo, Japan

[21] Appl. No.: 3,668

[22] Filed: Jan. 12, 1993

Related U.S. Application Data

[63] Continuation of Ser. No. 608,400, Nov. 2, 1990, abandoned.

[30] Foreign Application Priority Data

Nov. 8, 1989 [JP] Japan ................... 1-290464
Nov. 17, 1989 [JP] Japan ................... 1-299175
Dec. 15, 1989 [JP] Japan ................... 1-325015
Mar. 9, 1990 [JP] Japan ................... 2-059612
Aug. 3, 1990 [JP] Japan ................... 2-206414

[51] Int. Cl.⁵ .................. G02B 15/14; G02B 13/18
[52] U.S. Cl. ................................ 359/689; 359/715; 359/716

[58] Field of Search ............... 350/423, 432; 359/689, 359/686, 715, 716

[56] References Cited

U.S. PATENT DOCUMENTS 4,757,336  7/1988  Nakayama et al. ........... 359/689 X
4,871,238 10/1989  Sato et al. .................... 359/683

FOREIGN PATENT DOCUMENTS 1-72114  3/1989  Japan .

Primary Examiner—Scott J. Sugarman
Attorney, Agent, or Firm—Fitzpatrick, Cella, Harper & Scinto

[57] ABSTRACT

A varifocal lens is disclosed, comprising, from front to rear, a first lens unit of negative power, a second lens unit of positive power, and a third lens unit of negative power, all these lenses being moved along a common optical axis when the focal length of the entire lens system varies, wherein all the lens units each are constructed with either one lens, or two lenses, the total number of lenses being limited to 3 or 4, while still maintaining good optical performance.

47 Claims, 36 Drawing Sheets

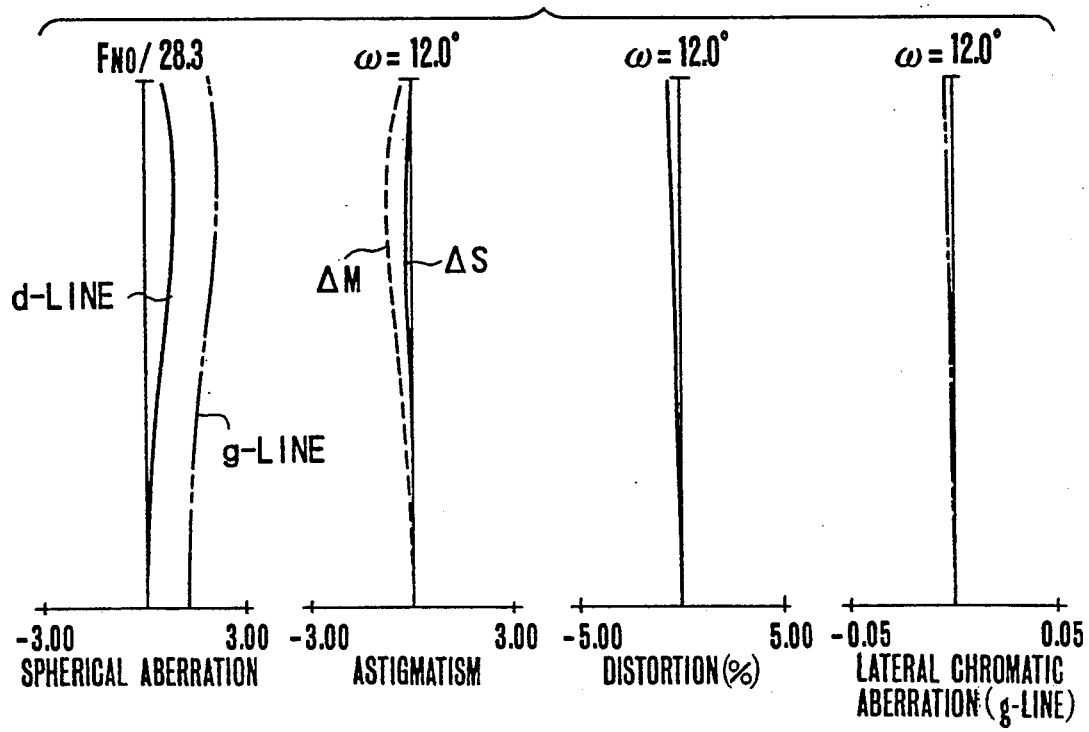

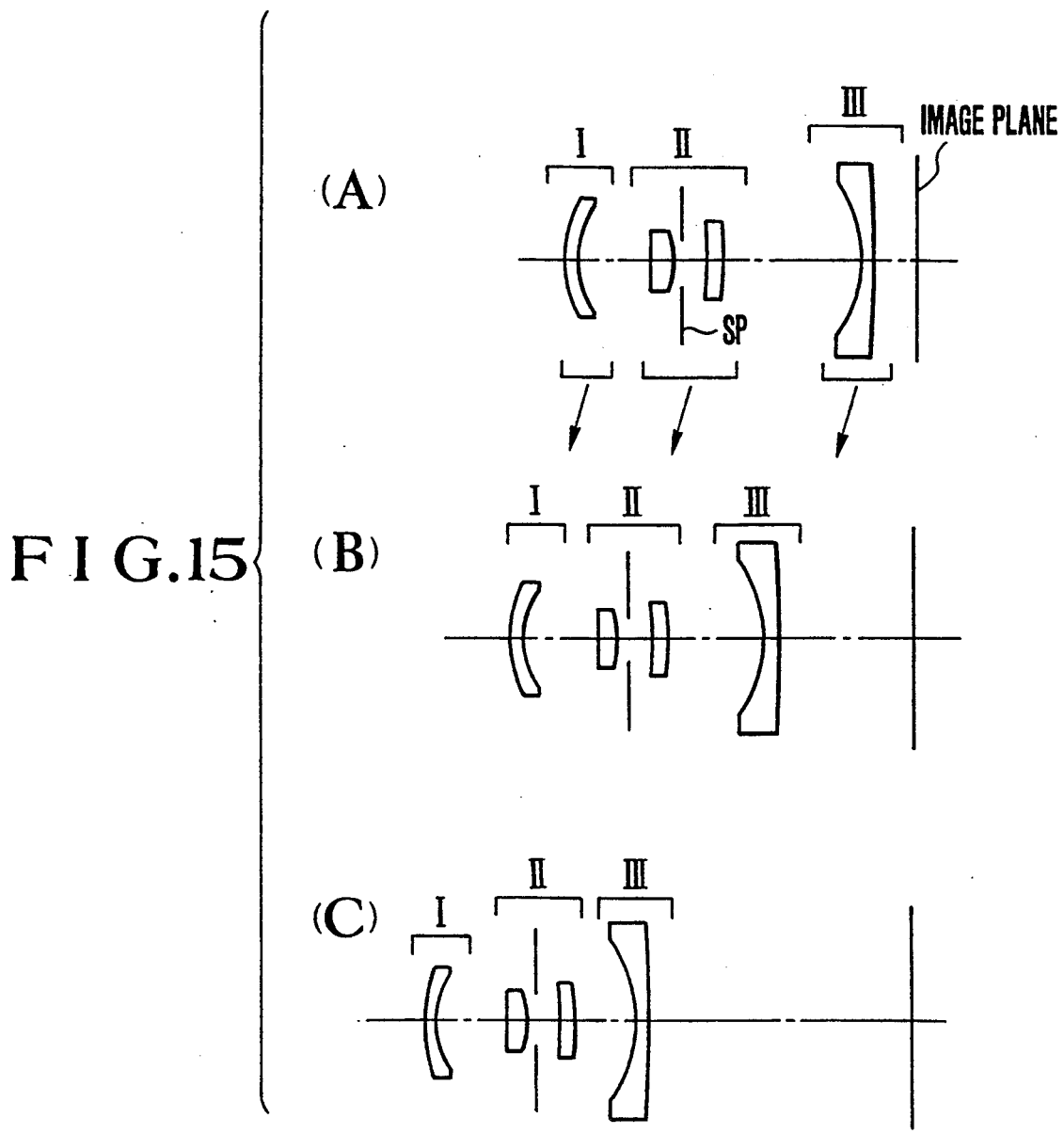

1

COMPACT VARIFOCAL LENS

This application is a continuation of application Ser. No. 07/608,400 filed Nov. 2, 1990 now abandoned.

BACKGROUND OF THE INVENTION

1. Field of the Invention

This invention relates to zoom lenses suited to photographic cameras or video cameras and, more particularly, to zoom lenses having three lens units with the lens unit of negative power preceding, these three lens units being made to move when varying the magnification, thus shortening the total length of the lens, minimizing the bulk and size and maintaining good optical performance.

2. Description of the Related Art

There have been previous proposals for a zoom lens comprising, from front to rear, a first lens unit of negative power, a second lens unit of positive power and a third lens unit of negative power, all these three lens units being made to move when varying the focal length, in, for example, Japanese Laid-Open Patent Application No. Sho 64-72114.

This type of zoom lens is amenable to a relatively wide image angle at the wide-angle end and, therefore, has found its use in many wide-angle photographic systems.

In the same document, conditions are set forth for moving the first, second and third lens units, and the construction and arrangement of the three lens units are specified for good stability of aberration correction against zooming, thereby achieving a zoom lens of high optical performance in a zoom ratio of 2-3. The zoom lens comprises 8-9 lens elements as a whole, and is relatively compact, so it is suited particularly to the lens-shutter camera.

The above-described proposal of the Japanese Laid-Open Patent application No. Sho 64-72114 provides for shortening the optical total length of a zoom lens (or the distance from the front vertex to the focal plane) by using two or more lens elements in constructing each of the lens groups. This affords to strengthen the refractive power of every lens unit in such a manner that, for example, chromatic aberrations are corrected in each individual lens unit.

SUMMARY OF THE INVENTION

A first object of the invention is to provide a compact zoom lens employing the refractive power arrangement of the prior art proposed in the Japanese Laid-Open Patent Application No. Sho 64-72114, yet having all its lens units each made of a fewer number of lens elements, while still maintaining the shortening of the total length of the entire system to be achieved in such a manner as to get a high optical performance over the entire zooming range, suited particularly to the lens-shutter camera.

A second object is to provide a zoom lens of extremely low price.

BRIEF DESCRIPTION OF THE DRAWINGS

FIGS. 1, 2, 3, 4, 5, 11, 12, 15, 16, 19, 20, 21, 25, 26, 27 and 28 are longitudinal section views of examples 1 to 16 of specific zoom lenses of the invention respectively.

FIGS. 6(A), 6(B) and 6(C), FIGS. 7(A), 7(B) and 7(C), FIGS. 8(A), 8(B) and 8(C), FIGS. 9(A), 9(B) and 9(C), FIGS. 10(A), 10(B) and 10(C), FIGS. 13(A), 13(B) and 13(C), FIGS. 14(A), 14(B) and 14(C), FIGS. 17(A), 17(B) and 17(C), FIGS. 18(A), 18(B) and 18(C), FIGS. 22(A) and 22(B), FIGS. 23(A) and 23(B), FIGS. 24(A) and 24(B), FIGS. 29(A), 29(B) and 29(C), FIGS. 30(A), 30(B) and 30(C), FIGS. 31(A), 31(B) and 31(C) and FIGS. 32(A), 32(B) and 32(C) are graphic representations of the aberrations of the examples 1 to 16 of zoom lenses respectively. Of these aberrations, the ones in FIGS., 6(A), 7(A), 8(A), 9(A), 10(A), 13(A), 14(A), 17(A), 18(A), 22(A), 23(A), 24(A), 29(A), 30(A), 31(A) and 32(A) are in the wide-angle end, the ones in FIGS. 6(B), 7(B), 8(B), 9(B), 10(B), 13(B), 14(B), 17(B), 18(B), 29(B), 30(B), 31(B) and 32(B) in an intermediate position, and the ones in FIGS. 6(C), 7(C), 8(C), 9(C), 10(C), 13(C), 14(C), 17(C), 18(C), 22(B), 23(B), 24(B), 29(C), 30(C), 31(C) and 32(C) in the telephoto end. d stands for the spectral d-line, g for the g-line, and S.C. represents the sine condition, S the sagittal image surface, and M the meridional image surface.

DETAILED DESCRIPTION OF THE PREFERRED EMBODIMENTS

Figure 1:
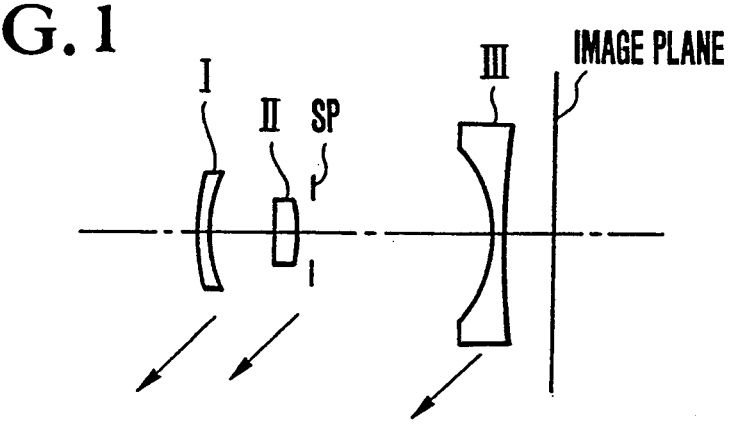
Figure 2:
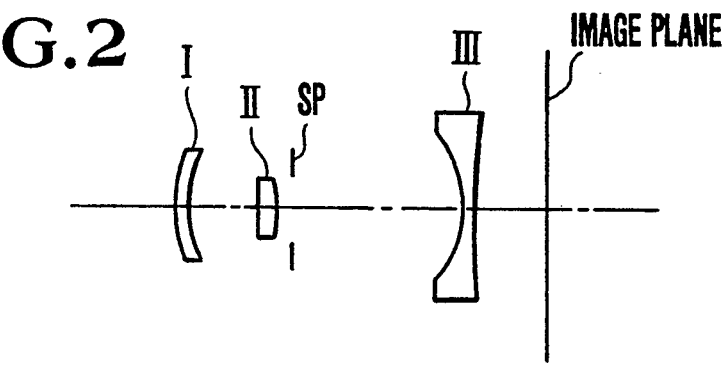
Figure 3:
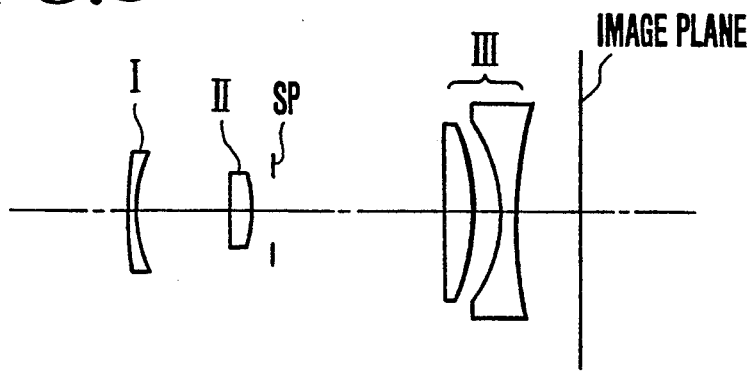
Figure 4:
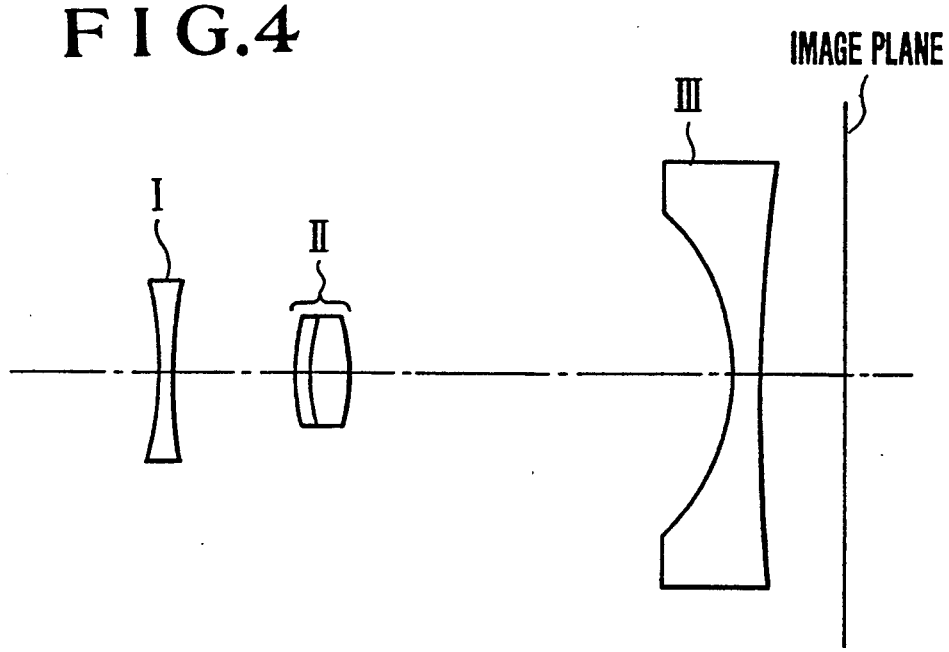
Figure 5:
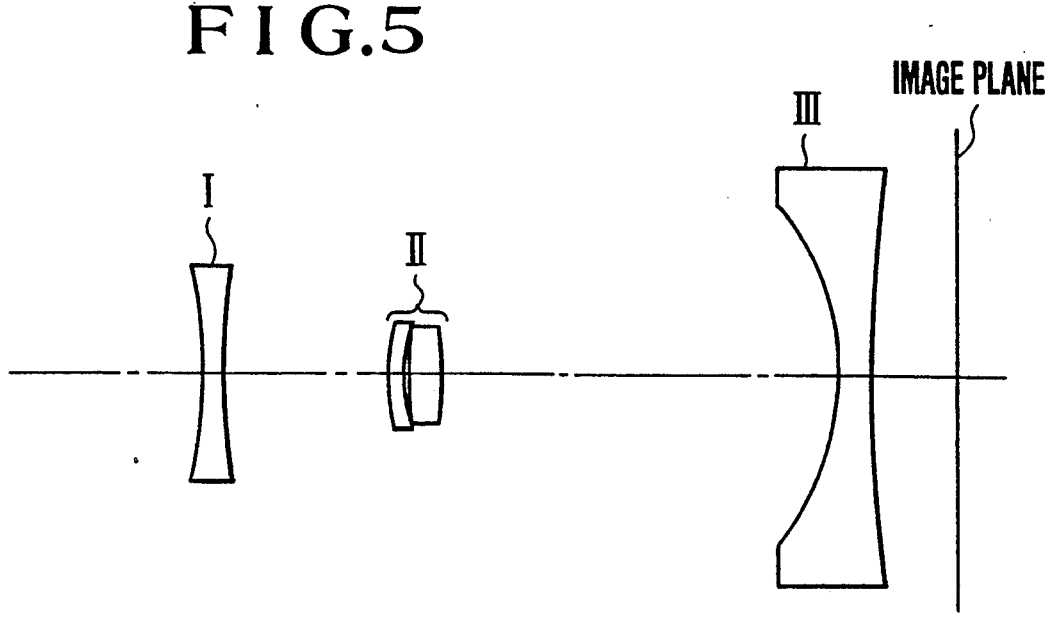
Figure 6A:
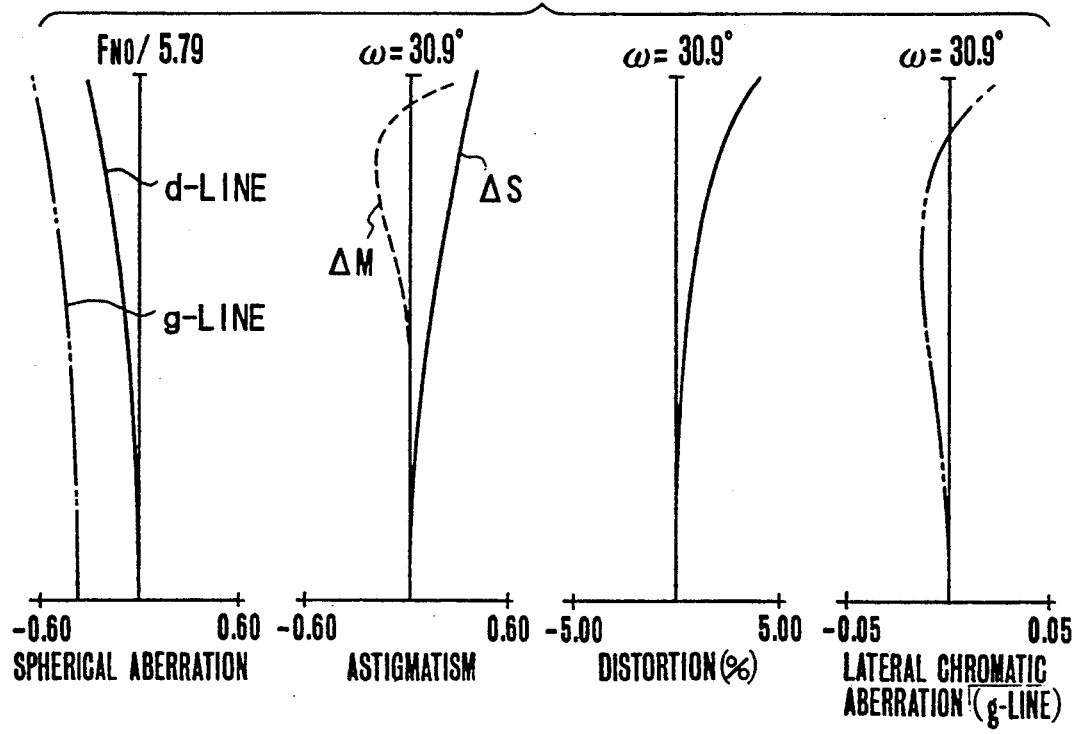
Figure 6B:
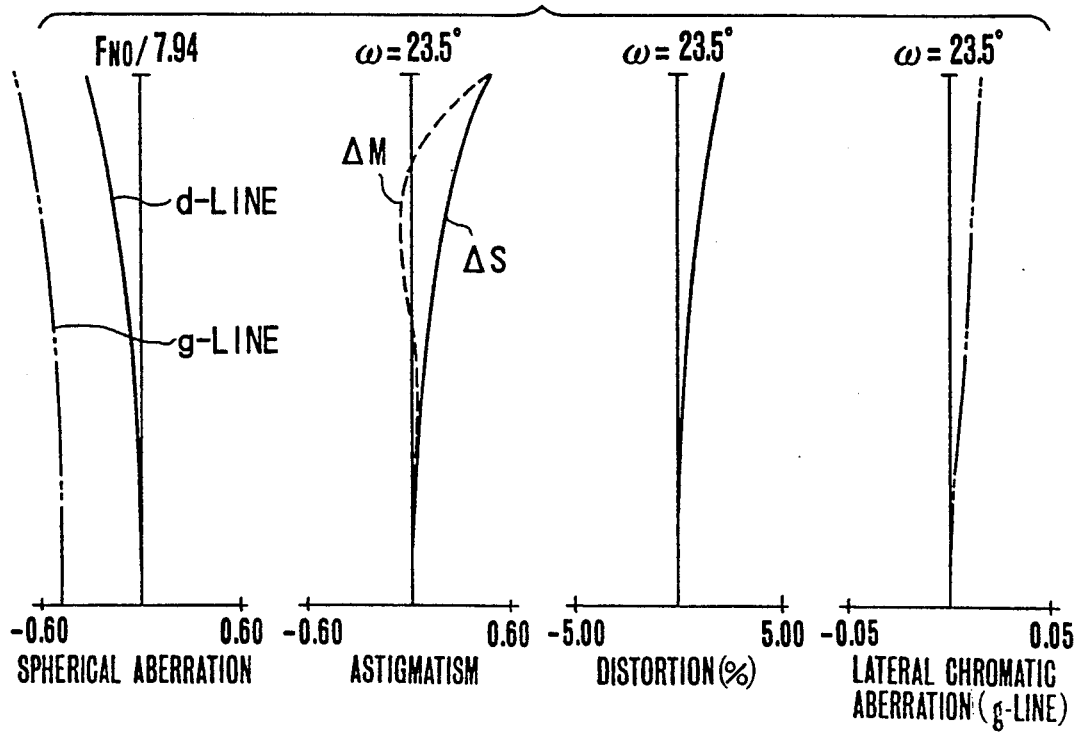
Figure 6C:
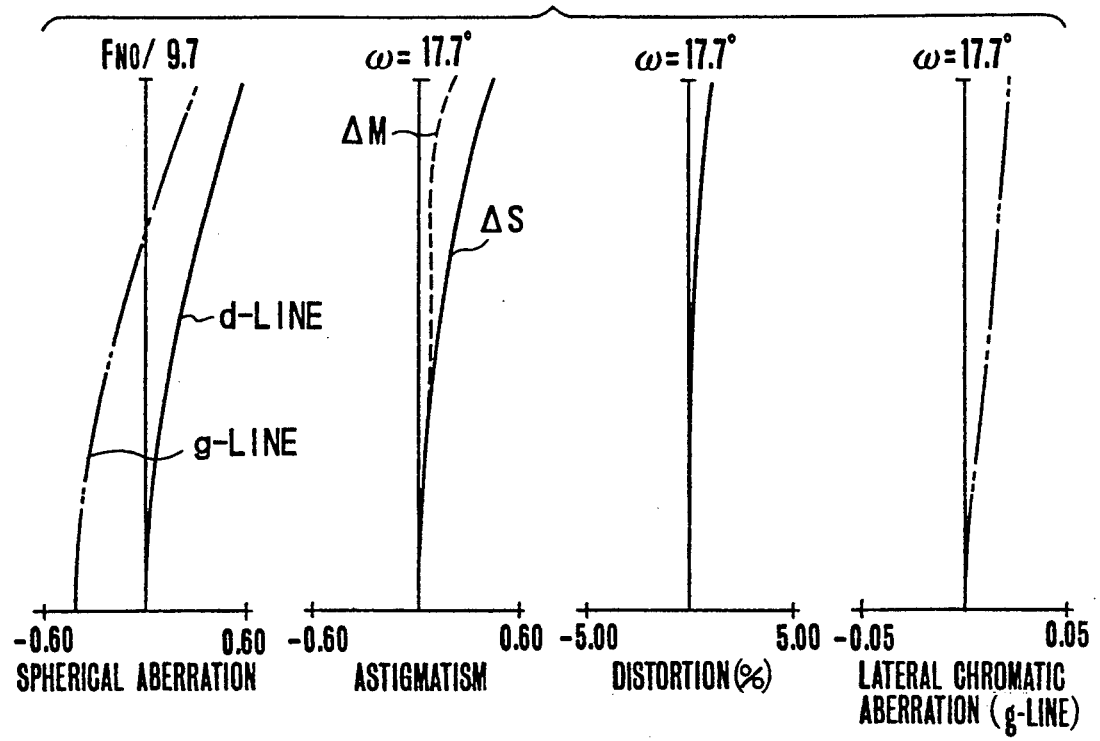
Figure 7A:
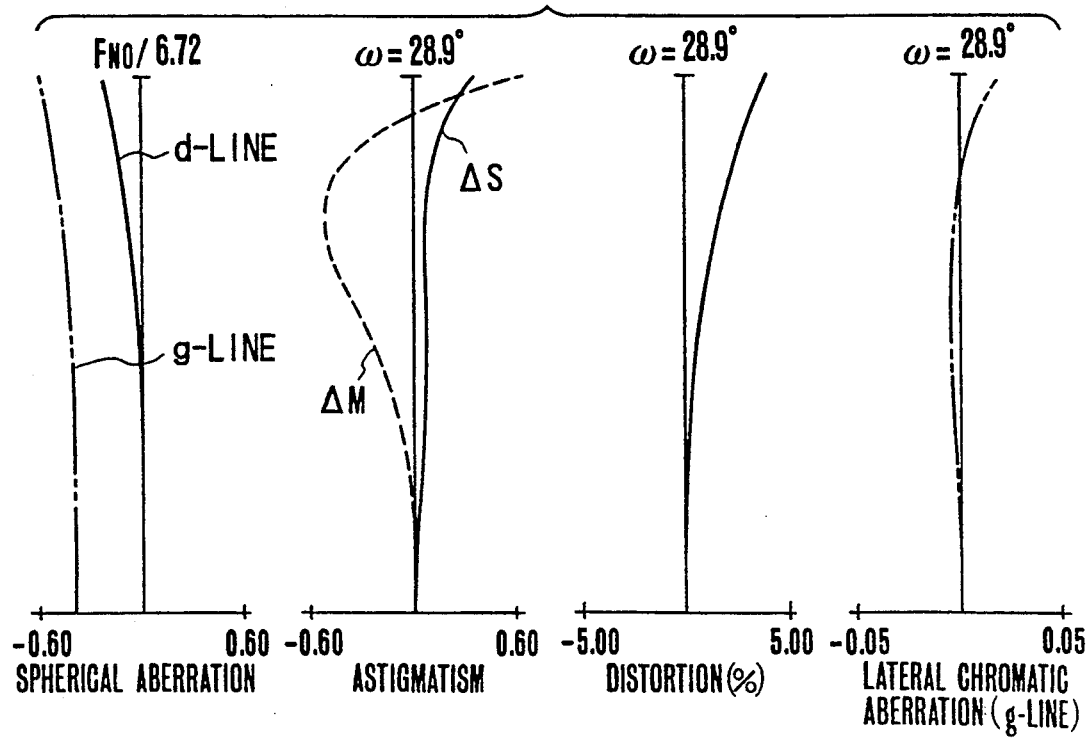
Figure 7B:
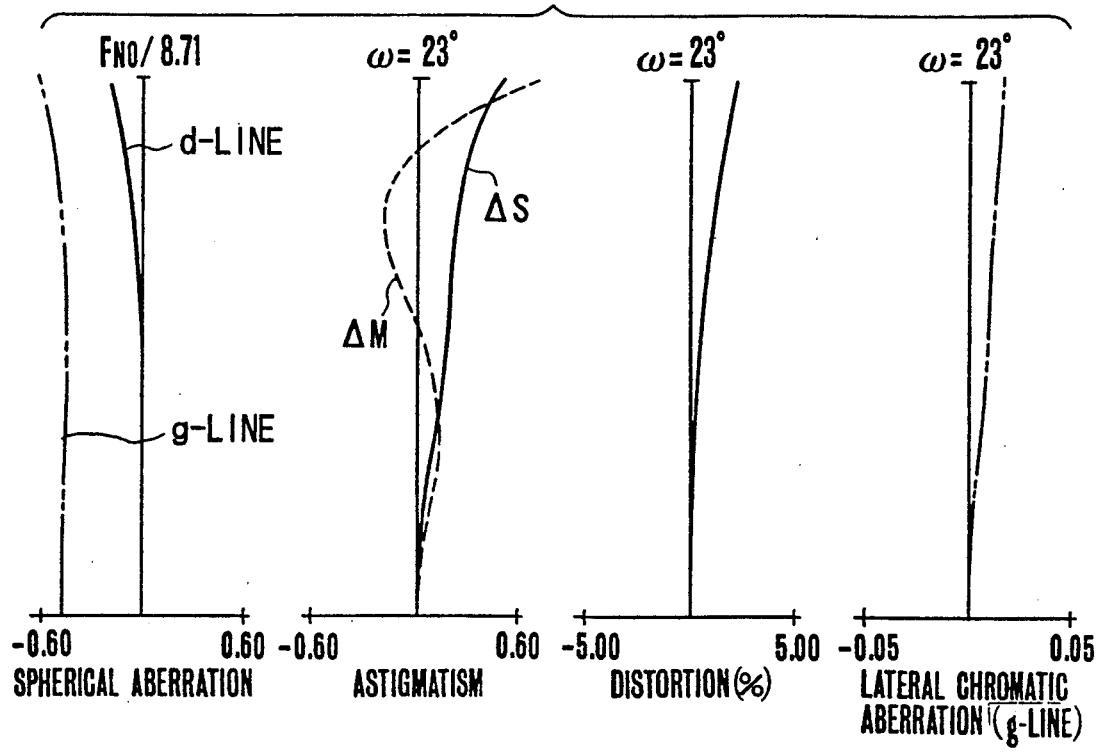
Figure 7C:
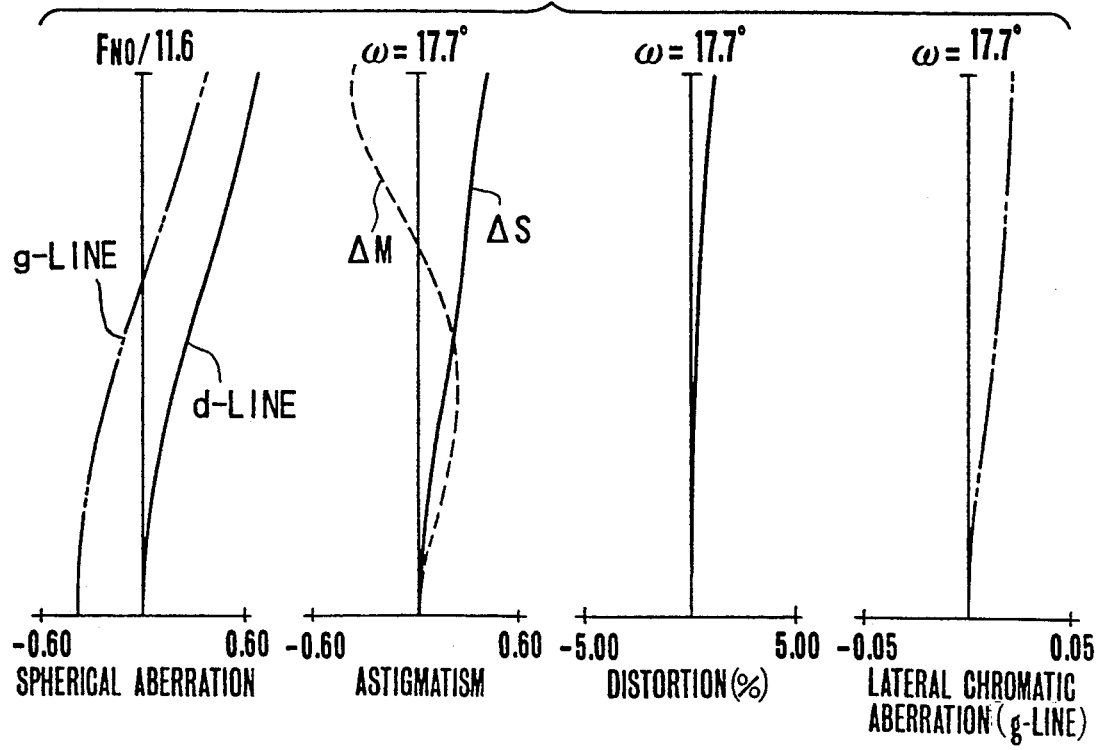
Figure 8A:
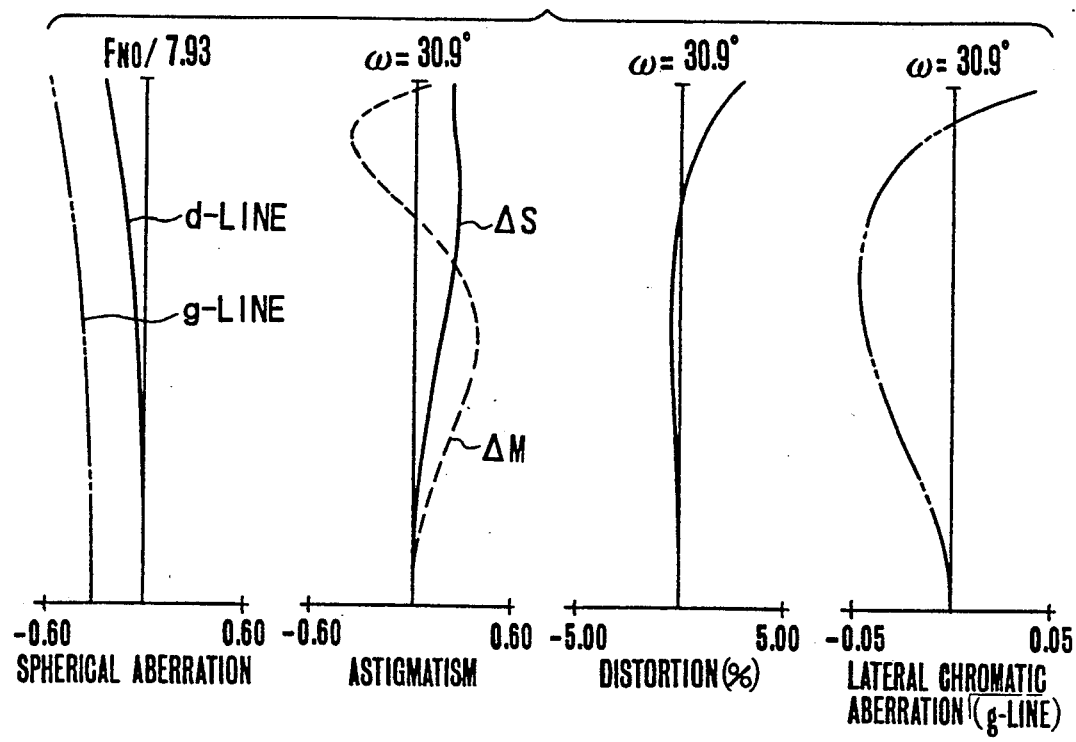
Figure 8B:
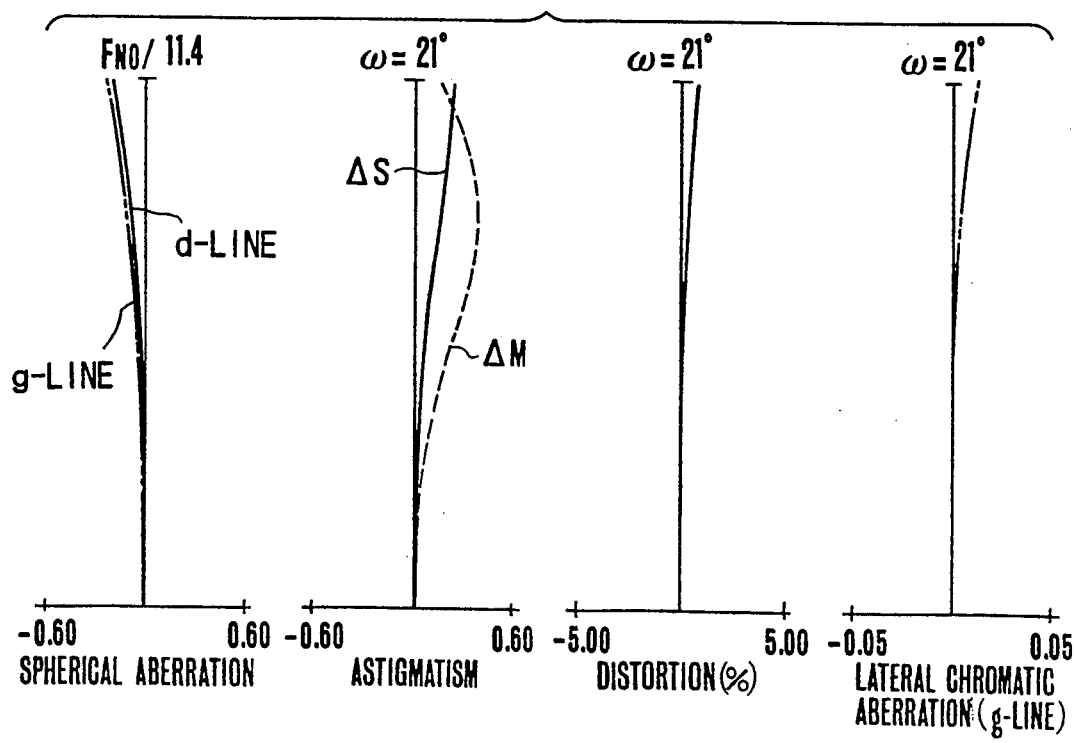
Figure 8C:
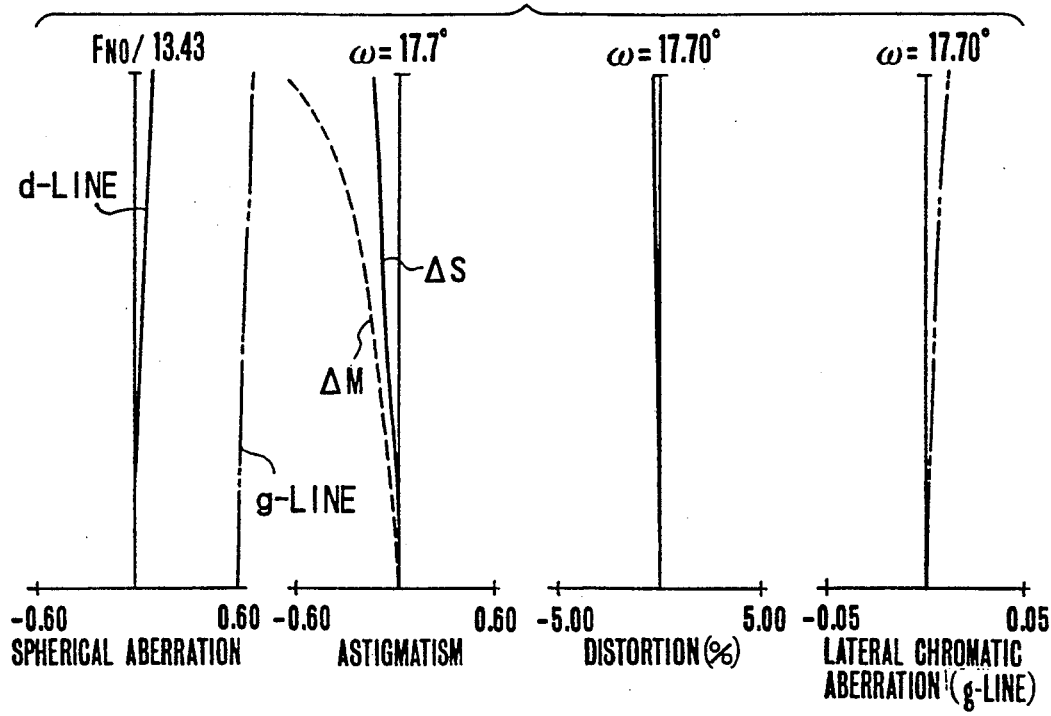
Figure 9A:
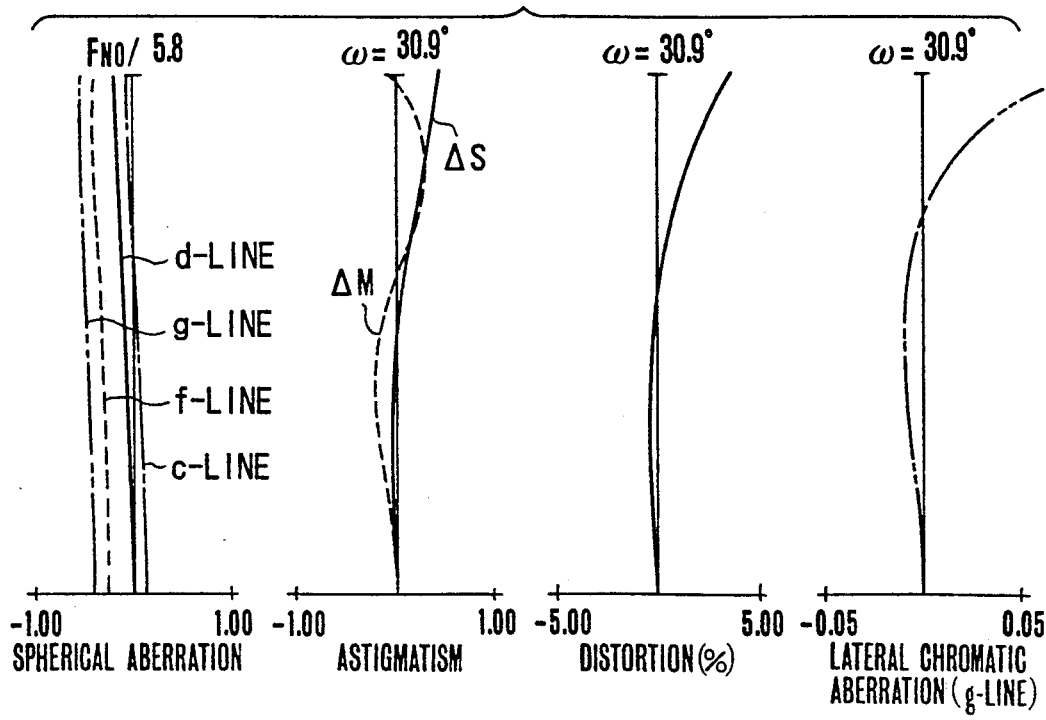
Figure 9B:
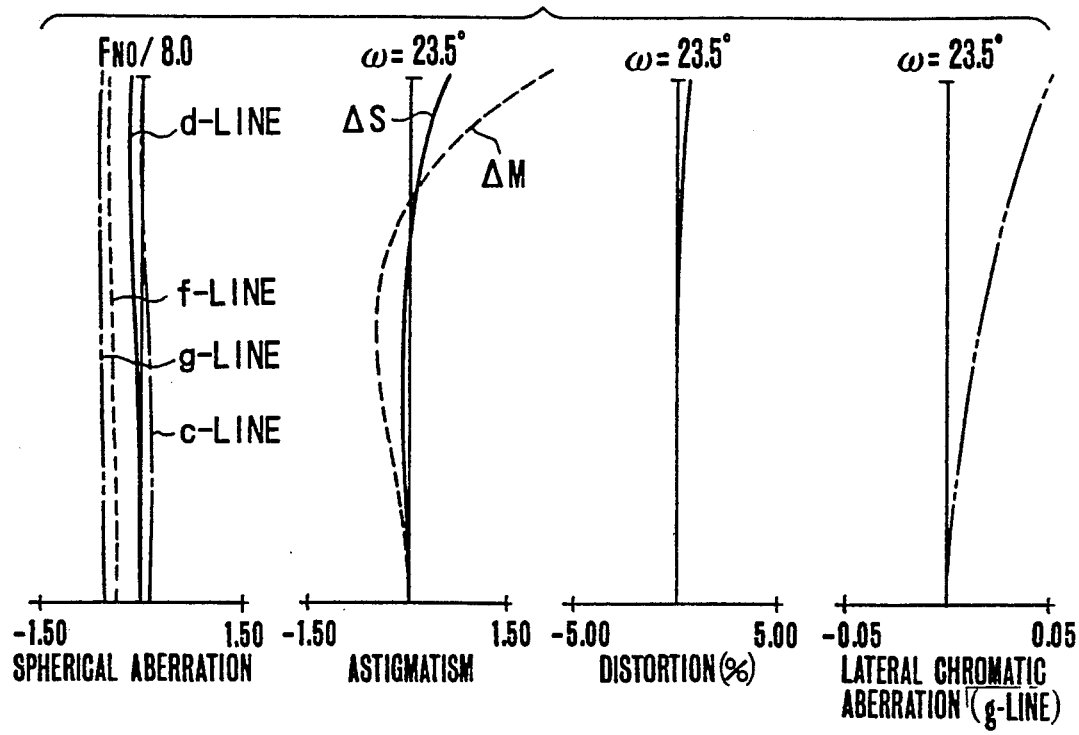
Figure 9C:
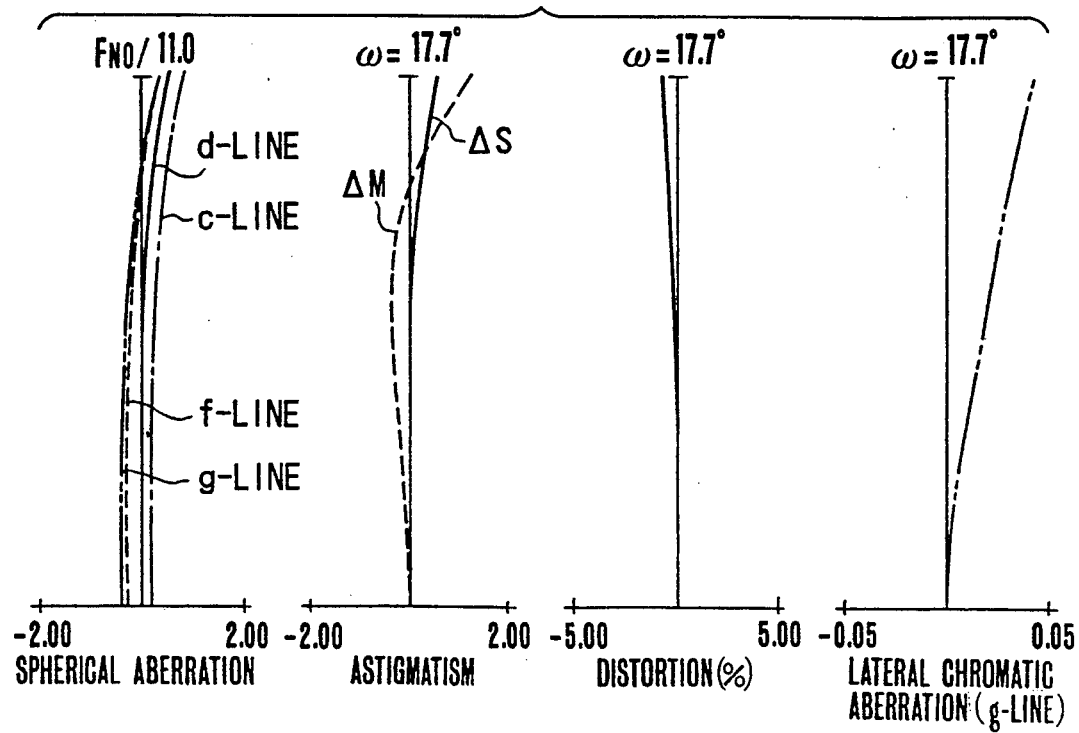
Figure 10A:
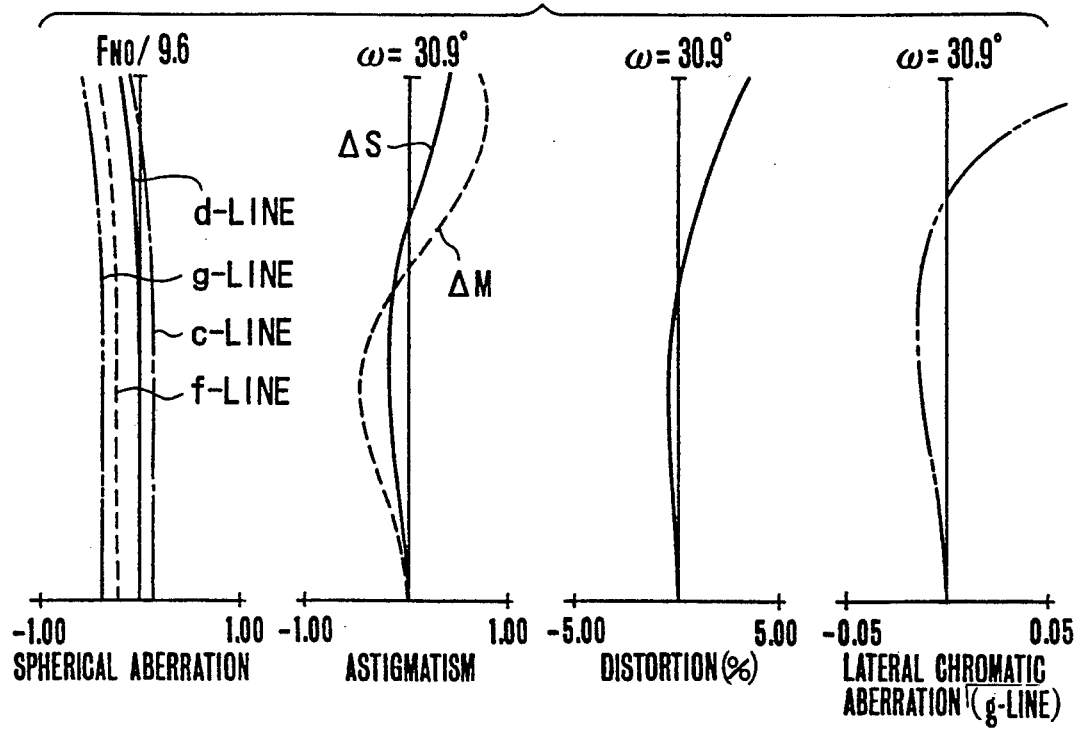
Figure 10B:
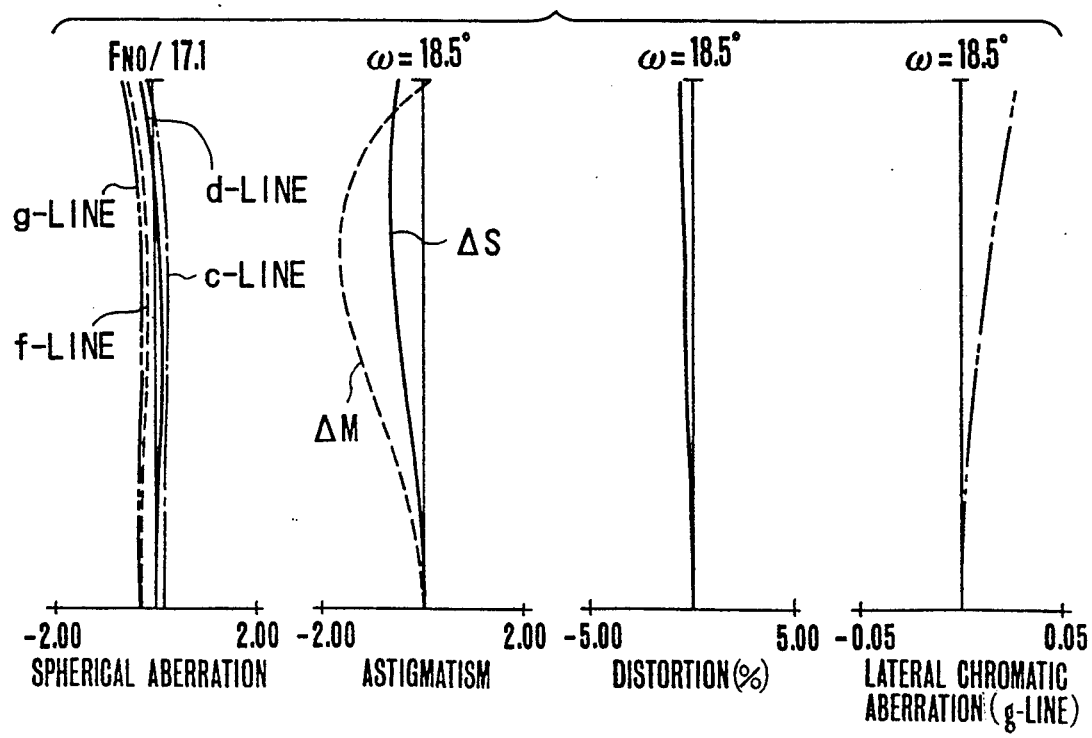

The invention is next described in connection with embodiments thereof by reference to the drawings In the lens block diagrams, reference Roman numeral I denotes a first lens unit of negative refractive power, II a second lens unit of positive refractive power, and III a third lens unit of negative refractive power. Again, the arrows indicate the moving directions of these lens units as zooming from the wide-angle end to the telephoto end.

In the general embodiment, the zoom lens has a feature that when zooming from the wide-angle end to the telephoto end, the three lens units move axially all forward in differential relation to each other. A stop SP is arranged on the image side of the second lens unit to move in unison with the second lens unit during zooming.

The zoom lens of the invention is, as shown in each of the lens block diagrams, constructed with three lens units of minus-plus-minus power arrangement. That is, on either side of the second lens unit of positive refractive power, there is disposed a lens unit of positive refractive power, namely, the first and third ones. The zoom lens is formed to a nearly symmetric type of refractive power arrangement.

By making use of such a nearly symmetric type in the lens configuration, the necessity of employing the method of correcting chromatic aberrations in every individual lens unit as was usual in the prior art is obviated, and instead the chromatic aberrations are corrected in good balance across the entire lens system. In other words, the aberrations of the three lens units are canceled with one another.

By employing such a method, in the present embodiment, despite the shortening of the total length of the zoom lens by constructing any one of the lens units from one or two lens elements, the various aberrations including the chromatic aberrations can be corrected in good balance over the entire zooming range, thus making it possible to obtain a zoom lens of high optical performance.

Next, the features of the design for the zoom lens of an embodiment shown in FIGS. 1 to 5 are described successively.

At first, to achieve a minimization of the size of the whole lens system, the present embodiment sets forth the following condition:

$$0.1 < \Sigma d/fw < 0.5 \quad (1)$$

where $\Sigma d$ is the sum of the axial thicknesses of the first, second and third lens units, and fw is the shortest focal length of the entire lens system.

When the lower limit of the inequalities of condition (1) is exceeded, the thickness of each of the lens elements of the lens groups becomes too thin to assure the prescribed precision accuracy of the surfaces when manufacturing the lens elements with ease. When the upper limit is exceeded, the size of the entirety of the lens system increases objectionably, because the lens elements becomes very thick.

Next, in the present embodiment, to achieve a shortening of the optical total length particularly in the wide-angle end, the interval E1w between the principal points of the first and second lens units, the interval E2w between the principal points of the second and third lens units in the wide-angle end, and the focal length f3 of the third lens unit in terms of the longest focal length FT of the entire lens system lie in ranges given below:

$$0.2 < E1w/E2w < 1.2 \quad (2)$$

$$0.2 < |f3|/FT < 1.0 \quad (3)$$

When the lower limit of the inequalities of condition (2) is exceeded, the back focal distance in the wide-angle end becomes too short, or the third lens unit becomes too close to the focal plane, causing dust on the lens surfaces to cast its image, and the reflection from the lens surfaces to be more apt to form ghost. This is no good. When the upper limit is exceeded, the back focal distance becomes longer than necessary, increasing the optical total length objectionably.

The inequalities of condition (3) gives a proper range for the refractive power of the third lens unit so that the entirety of the lens system gets the telephoto type. This allows the minimization of the size to be done with advantages.

When the lower limit of the inequalities of condition (3) is exceeded, as it implies that the refractive power of the third lens unit is too much strong, over-correction of field curvature results, though the size of the whole lens system is minimized. When the upper limit is exceeded, the tendency to the telephoto type as looked over the entirety of the lens system is weakened and this is reflected to an increase of the size of the lens system. So, that is not good.

Besides these, the present embodiment aims at an ultra reduction of the bulk of the whole lens system. To this end, the aperture ratio has to be made appropriate in respect to the zoom ratio and the size of the picture format. So, for the F-numbers FNW and FNT at full-open aperture of the entire system in the wide-angle end and the telephoto end respectively, the following conditions are set forth:

$$1.5FNW.Z > FNT \quad (4)$$

$$FNW > 0.1Y \quad (5)$$

where Z is the zoom ratio and Y is the diagonal length of the picture format.

When the inequality of condition (4) or (5) is violated, it becomes difficult to achieve an ultraminiature of the bulk of the whole lens system while still preserving the predetermined zoom ratio and the aperture ratio.

Another feature of the present embodiment is that letting the Abbe number of the material of the i-th lens element, positive or negative, be denoted by $vi$ with plus sign for the positive lens element and minus sign for the negative lens element, a range for the sum of their reciprocals, or $$\sum_{i=1}^{N} 1/vi,$$

is given as follows:

$$-0.1 < \sum_{i=1}^{N} 1/vi < -0.01 \quad (6)$$

When this condition is satisfied, as any of the lens units is constructed with a single lens or a cemented lens, the lens system is corrected as a whole well for chromatic aberrations.

It is to be noted that, to achieve a further advance in minimizing the bulk and size of the entirety of the lens system while still preserving good stability of optical performance throughout the entire zooming range, it is better to vary the ranges for the above-described factors in the conditions (1), (2) and (3) as follows:

$$0.15 < \Sigma d/fw < 0.3$$
$$0.25 < E1w/E2w < 0.6$$
$$0.3 < |f3|/FT < 0.8$$

It is also to be noted that, of all the lens surfaces in the lens system, at least one is preferably made aspheric in order to ensure that good optical performance is obtained.

Numerical examples 1 to 5 of zoom lenses of the invention are shown below. In the numerical examples, Ri is the radius of curvature of the i-th lens surface, when counted from the front, Di is the i-th axial lens thickness or air separation, when counted from the front, and Ni and $vi$ are the refractive index and Abbe number of the glass of the i-th lens element, when counted from the front.

The shape of an aspheric surface is expressed in the coordinates with the X-axis in the axial direction and the H-axis in a direction perpendicular to the optical axis, the direction in which light advances being taken as positive, by the following equation:

$$X = \frac{(1/R) H^2}{1 + \sqrt{1 - (H/R)^2}} + AH^2 + BH^4 + CH^6 + DH^8 + EH^{10}$$

where R is the radius of the osculating sphere and A, B, C, D and E are the aspheric coefficients.

Again, "D-Ox" means $10^{-x}$.

Also, the values of the factors in the above-described conditions (1) to (6) for the numerical examples 1 to 5 are listed in Table-1.

Numerical Example 1 (FIGS. 1, 6(A), 6(B) and 6(C))

-continued $F = 36.2-67.7$  $FNo = 1:5.79-9.7$  $2\omega = 61.7°-35.4°$

| *R1 = 21.10 | D1 = 1.5 | N1 = 1.58306 | ν1 = 30.2 |
|---|---|---|---|
| R2 = 14.69 | D2 = Variable | | |
| R3 = 115.98 | D3 = 3.0 | N2 = 1.49700 | ν2 = 81.6 |
| R4 = −13.23 | D4 = Variable | | |
| R5 = −16.91 | D5 = 1.7 | N3 = 1.51633 | ν3 = 64.1 |
| R6 = 179.623 | | | |

R1: Aspheric Surface

| A | B | C | D | E |
|---|---|---|---|---|
| 0.0 | −8.70D-05 | −3.65D-07 | −6.64D-09 | −5.95D-12 |

| Variable Separation | Focal Length | | |
|---|---|---|---|
| | 36.20 | 49.64 | 67.70 |
| D2 | 9.11 | 9.43 | 9.11 |
| D4 | 25.64 | 19.04 | 14.48 |

Numerical Example 2 (FIGS. 2, 7(A), 7(B) and 7(C))
$F = 39.2-67.5$  $FNo = 1:6.72-11.6$  $2\omega = 57.8°-35.4°$

| *R1 = 21.13 | D1 = 1.5 | N1 = 1.58306 | ν1 = 30.2 |
|---|---|---|---|
| R2 = 14.07 | D2 = Variable | | |
| R3 = 116.65 | D3 = 3.0 | N2 = 1.49700 | ν2 = 81.6 |
| R4 = −13.23 | D4 = Variable | | |
| R5 = −16.86 | D5 = 1.7 | n3 = 1.51633 | ν3 = 64.1 |
| R6 = 189.97 | | | |

R1: Aspheric Surface

| A | B | C | D | E |
|---|---|---|---|---|
| 0.0 | −9.28D-05 | 1.78D-07 | −2.65D-08 | 2.12D-10 |

| Variable Separation | Focal Length | | |
|---|---|---|---|
| | 39.20 | 50.83 | 67.75 |
| D2 | 9.07 | 9.36 | 8.98 |
| D4 | 23.84 | 18.66 | 14.50 |

Numerical Example 3 (FIGS. 3, 8(A), 8(B) and 8(C))
$F = 39.2-67.7$  $FNo = 1:7.93-13.43$  $2\omega = 61.73°-35.43°$

| *R1 = 40.65 | D1 = 1.2 | N1 = 1.58376 | ν1 = 30.2 |
|---|---|---|---|
| R2 = 17.74 | D2 = Variable | | |
| R3 = 49.25 | D3 = 3.0 | N2 = 1.48749 | ν2 = 70.2 |
| R4 = −16.73 | D4 = Variable | | |
| R5 = −649.37 | D5 = 3.5 | N3 = 1.56384 | ν3 = 60.7 |
| R6 = −27.38 | D6 = 3.91 | | |
| R7 = −19.55 | D7 = 2.0 | N4 = 1.70154 | ν4 = 41.2 |
| R8 = 74.79 | | | |

R1: Aspheric Surface

| A | B | C | D | E |
|---|---|---|---|---|
| 0.0 | −6.26D-05 | −2.65D-07 | 4.89D-09 | −5.50D-11 |

| Variable Separation | Focal Length | | |
|---|---|---|---|
| | 39.20 | 56.25 | 68.00 |
| D2 | 10.98 | 10.52 | 9.98 |
| D4 | 26.53 | 14.87 | 10.52 |

Numerical Example 4 (FIGS. 4, 9(A), 9(B) and 9(C))
$F = 36.22-67.64$  $FNo = 1:5.8-11.0$  $2\omega = 61.7°-35.5°$

| *R1 = −41.30 | D1 = 1.2 | N1 = 1.49171 | ν1 = 57.4 |
|---|---|---|---|
| R2 = 73.77 | D2 = Variable | | |
| R3 = 24.09 | D3 = 1.0 | N2 = 1.58306 | ν2 = 30.2 |
| R4 = 13.01 | D4 = 3.0 | N3 = 1.49171 | ν3 = 57.4 |
| *R5 = −18.63 | D5 Variable | | |
| *R6 = −17.97 | D6 = 2.0 | N4 = 1.49171 | ν4 = 57.4 |
| R7 = 163.62 | | | |

| | A | B | C |
|---|---|---|---|
| R1: | 0.0 | −5.69D-05 | −5.69D-08 |
| R5: | 0.0 | 1.54D-05 | 1.81D-07 |
| R6: | 0.0 | −1.39D-06 | −1.75D-07 |

| Variable Separation | Focal Length | | |
|---|---|---|---|
| | 36.22 | 49.64 | 67.54 |
| D2 | 9.63 | 10.40 | 10.73 |
| D5 | 30.31 | 22.28 | 16.83 |

Numerical Example 5 (FIGS. 5, 10(A), 10(B) and 10(C))
$F = 36.22-101.8$  $FNo = 1:9.6-28.3$  $2\omega = 61.8°-24°$

| *R1 = −45.16 | D1 = 1.2 | N1 = 1.49171 | ν1 = 57.4 |
|---|---|---|---|
| R2 = 63.18 | D2 = Variable | | |
| R3 = 26.02 | D3 = 1.0 | N2 = 1.58306 | ν2 = 30.2 |
| R4 = 13.46 | D4 = 0.1 | | |
| R5 = 13.16 | D5 = 3.0 | N3 = 1.49171 | ν3 = 57.4 |
| *R6 = −19.26 | D6 = Variable | | |
| *R7 = −21.47 | D7 = 2.0 | N4 = 1.49171 | ν4 = 57.4 |
| R8 = 125.23 | | | |

| | A | B | C | D |
|---|---|---|---|---|
| R1: | 0.0 | −4.00D-05 | −1.35D-07 | |
| R6: | 0.0 | 3.49D-05 | −1.55D-06 | |
| R7: | 0.0 | 6.23D-09 | −4.55D-07 | 1.00D-09 |

| Variable Separation | Focal Length | | |
|---|---|---|---|
| | 36.22 | 64.50 | 101.78 |
| D2 | 11.67 | 11.63 | 11.49 |
| D6 | 31.10 | 17.45 | 11.11 |

TABLE 1

| Condition No. | Factor | Numerical Example | | | | |
|---|---|---|---|---|---|---|
| | | 1 | 2 | 3 | 4 | 5 |
| (1) | $\Sigma d/fw$ | 0.17 | 0.17 | 0.25 | 0.2 | 0.2 |
| (2) | E1w/E2w | 0.33 | 0.35 | 0.32 | 0.37 | 0.43 |
| (3) | $|f3|/FT$ | 0.44 | 0.44 | 0.66 | 0.49 | 0.36 |
| (4) | FNT/(FNW · Z) | 0.60 | 0.67 | 0.66 | 0.68 | 0.70 |
| (5) | FNW/Y | 0.14 | 0.16 | 0.18 | 0.13 | 0.22 |
| (6) | $\sum_{i=1}^{N} 1/\nu i$ | −0.036 | −0.036 | −0.027 | −0.017 | −0.017 |

Figure 11:
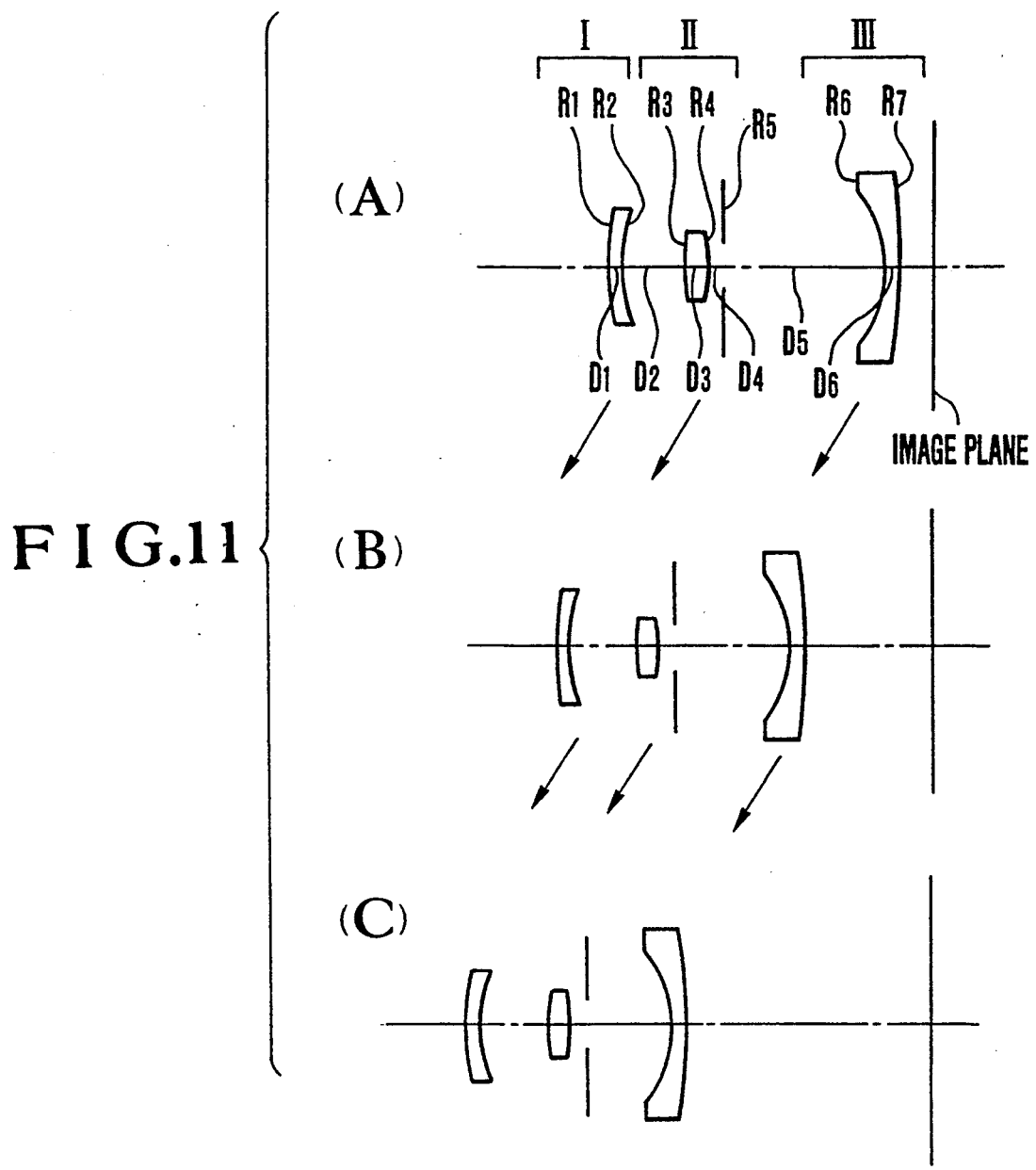
Figure 12:
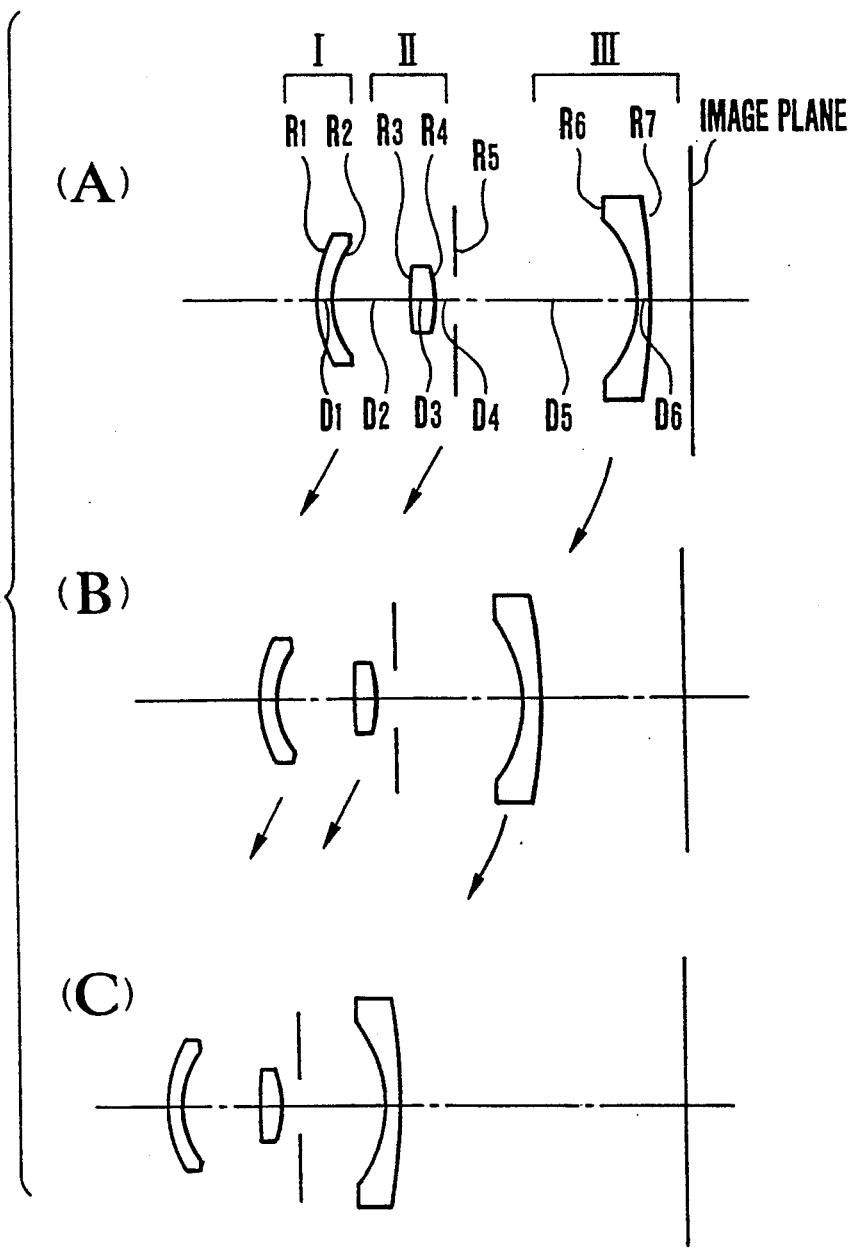
Figure 13A:
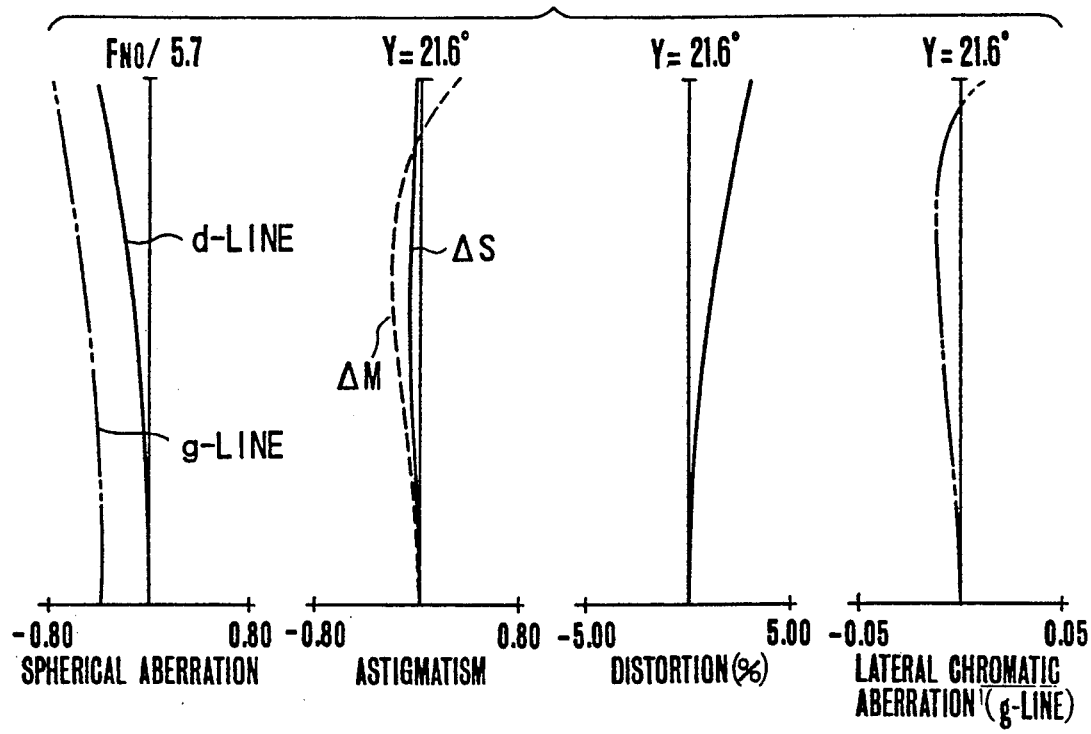
Figure 13B:
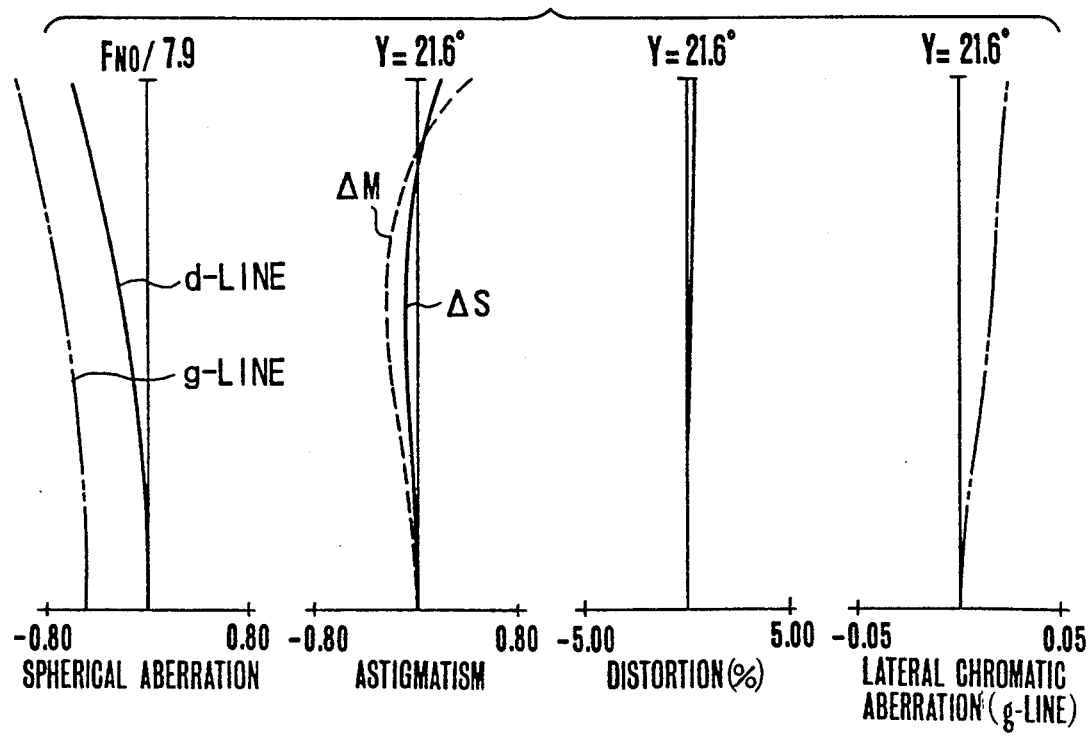
Figure 13C:
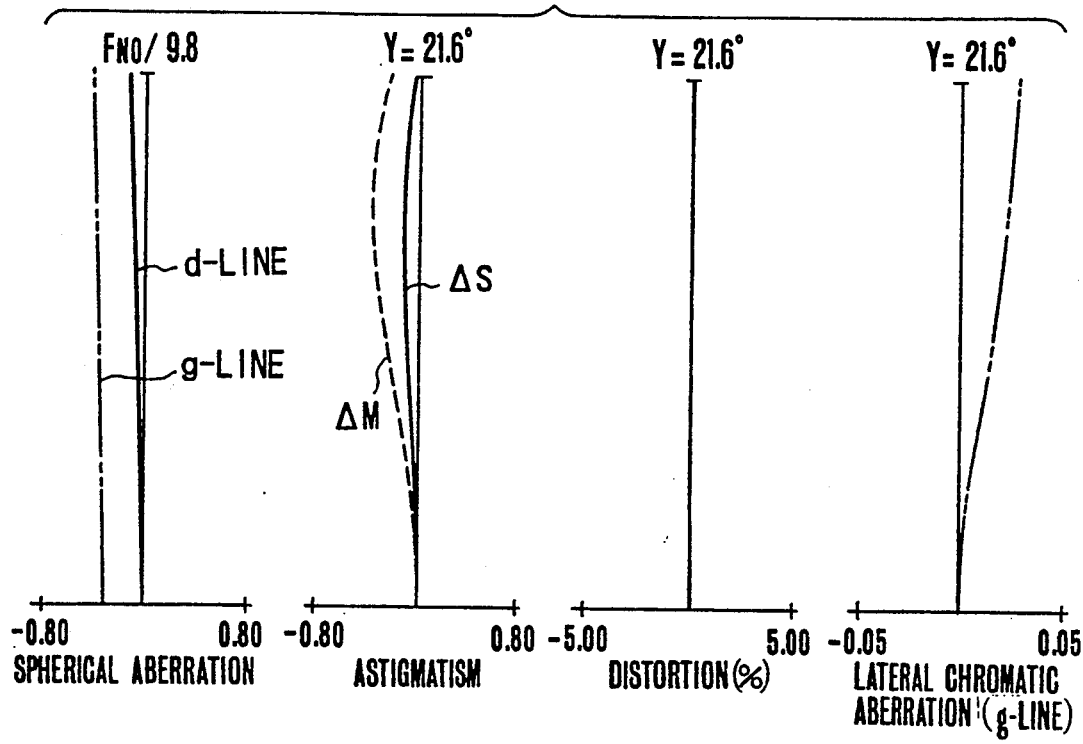
Figure 14A:
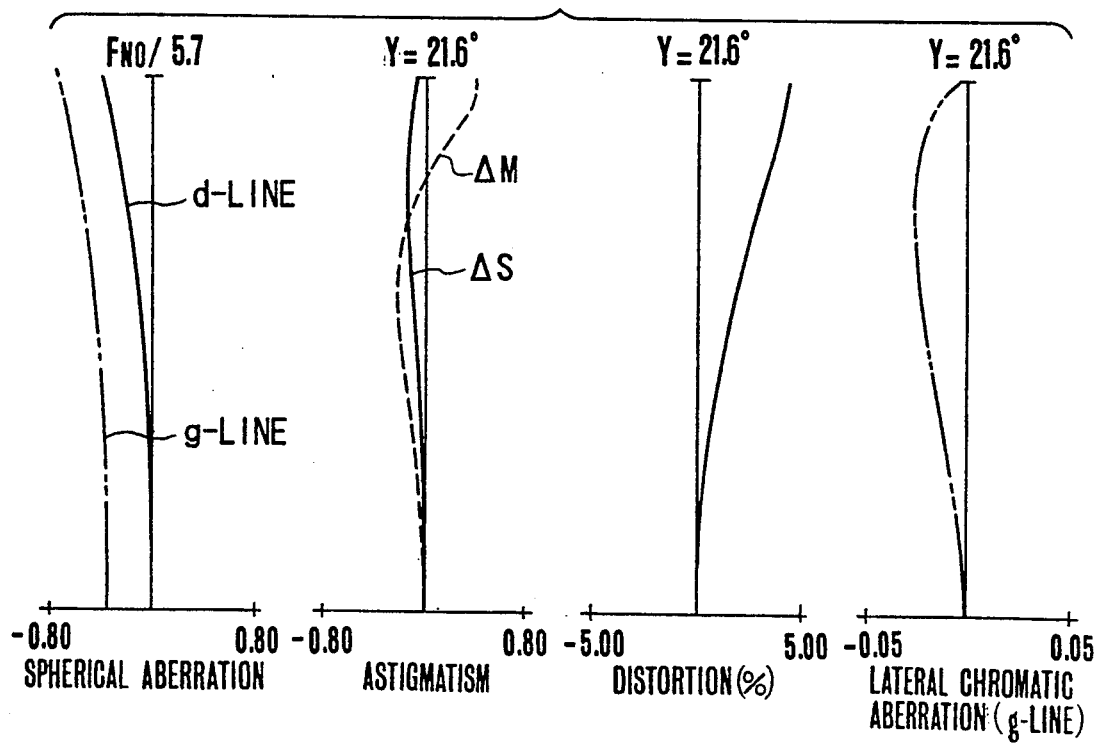
Figure 14B:
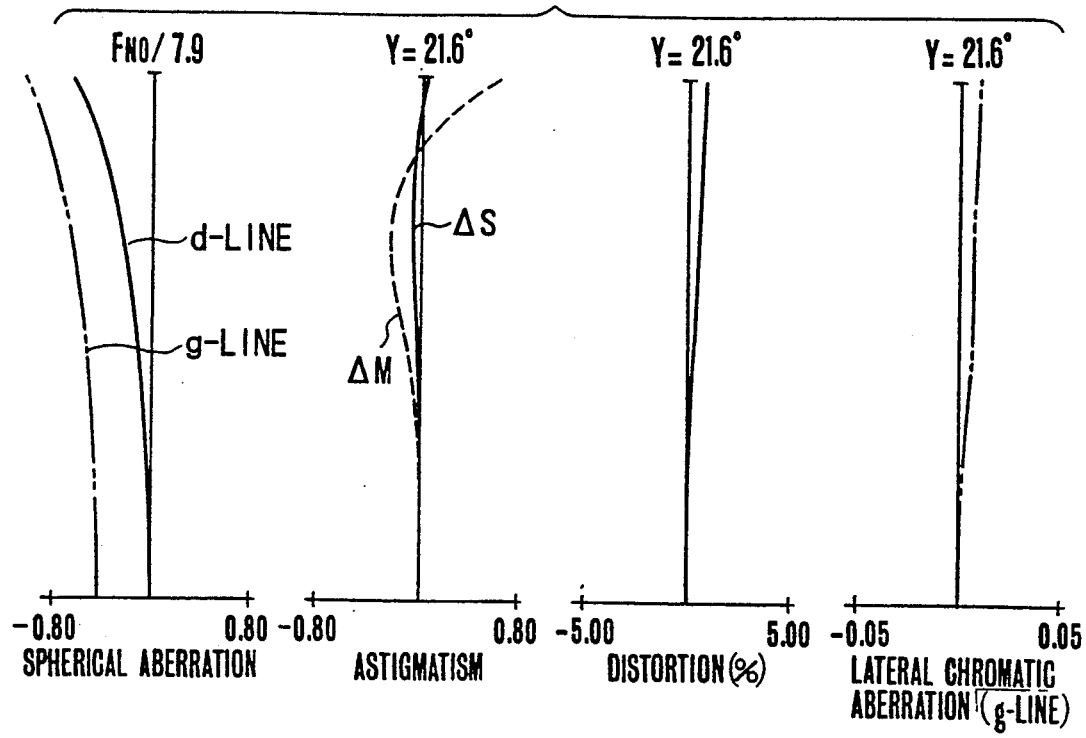
Figure 14C:
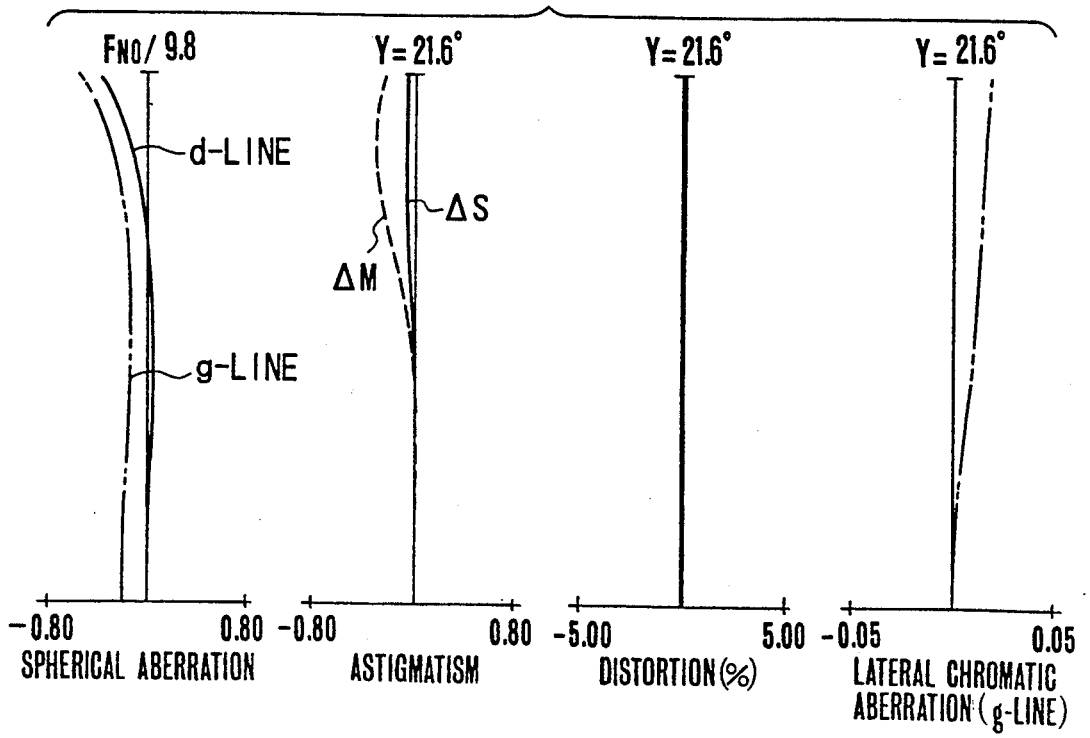

Another embodiment of the invention taken from the standpoint of the amounts of zooming movement of all the lens units is described by reference to the lens block diagrams of FIG. 11 and FIG. 12.

Even in this embodiment, the method of perfecting correction of chromatic aberrations in each individual lens unit as in the prior art is not employed. Yet the image chromatic aberrations of the entire lens system are corrected in good balance with the other aberrations. That is, the three lens units are designed so that their aberrations are canceled with one another. The first lens unit is constructed from a negative first lens of meniscus form convex toward the object side, the second lens unit from a positive second lens of bi-convex form, and the third lens unit from a negative third lens of meniscus form convex toward the image side. With this, despite the shortening of the total length of the entire lens system, the various aberrations including chromatic aberrations can be corrected in good balance over the entire zooming range. Thus, it is made possible to obtain a zoom lens of high optical performance.

And, for the amounts of movement M1, M2 and M3 of the first, second and third lens units respectively when zooming from the wide-angle end to the telephoto end, the following conditions are set forth:

$$0.6 < M1/M2 < 1.7 \quad (7)$$

$$0.3 < M2/M3 \, 0.9 \quad (8)$$

The technical significance of each of the above-cited conditions (7) and (8) is explained below.

The inequalities of condition (7) concern with the ratio of the total zooming movements of the first lens unit and the second lens unit. When the total movement of the first lens unit is too large, compared with the total movement of the second lens unit as exceeding the upper limit of the inequalities of condition (7), the effect of varying the magnification which the movement of the second lens unit produces takes too strong to the tendency to reverse variation of the magnification. Therefore, it becomes difficult to obtain the predetermined zoom ratio. Conversely when the total movement of the second lens unit of positive refractive power is too large, compared with the total movement of the first lens unit as exceeding the lower limit, the lens form on the telephoto side gets a great asymmetry, so comatic aberration is increased objectionably.

The inequalities of condition (8) concern with the ratio of the total zooming movements of the second lens unit and the third lens unit. When the total movement of the second lens unit is too large, compared with the total movement of the third lens unit as exceeding the upper limit of the inequalities of condition (8), the amount of variation of the air spacing between the second lens unit and the third lens unit becomes small, so the prescribed zoom ratio becomes difficult to obtain. When the total movement of the third lens unit is too large, compared with the total movement of the second lens unit, the air spacing becomes too narrow to avoid occurrence of mechanical interference between these two lens units.

Besides these, the present embodiment has features which find particular favor on aberration correction, or the following conditions:

$$0.5 < M3/FW < 1.3 \qquad (9)$$

$$-4 < F1/FW < -1.5 \qquad (10)$$

where F1 is the focal length of the first lens unit and FW is the shortest focal length of the entire lens system.

The inequalities of condition (9) concern with the total zooming movement of the third lens unit. When the total movement of the third lens is too large as beyond the upper limit, for obtaining the prescribed zoom ratio, the air spacing between the second lens unit and the third lens unit must previously be taken wide. Otherwise, objectionable results would be effected that the complete zoom lens gets a very long total length, the back focal distance in the wide-angle end shortens and further the effective diameter of the third lens unit increases largely. When the total movement of the third lens unit is too short as beyond the lower limit, for securing the prescribe zoom ratio, the refractive power of the third lens unit must be strengthened with the field curvature increased over the entire area of the image frame.

The inequalities of condition (10) concern with the negative refractive power of the first lens unit. When the refractive power of the first lens unit is too strong as beyond the upper limit, the on-axial aberrations on the wide-angle side become difficult to correct. When the refractive power of the first lens unit is too weak as beyond the lower limit, the spherical aberration on the wide-angle side becomes difficult to correct well.

To improve the optical performance while still maintaining the shortening of the total length of the zoom lens to be achieved, the invention sets forth other conditions for the focal lengths F2 and F3 of the second and third lens units respectively as follows:

$$0.4 < F2/FW < 0.9 \qquad (11)$$

$$-1.5 < F3/FW < -0.4 \qquad (12)$$

The inequalities of condition (11) concern with the positive refractive power of the second lens unit. When the refractive power is too weak as beyond the upper limit, for securing the prescribed zoom ratio, the total movement of the second lens unit increases largely. In turn the total length of the zoom lens is increased objectionably. When the refractive power is too strong as beyond the lower limit, the total length of the complete lens becomes short, but the variation with zooming of the aberrations increases largely.

The inequalities of condition (12) are to make the provision for the telephoto type over the entire lens system mainly at the third lens unit. By giving an appropriate range for its refractive power, the minimization of the size of the entire system is achieved advantageously.

When the upper limit of the inequalities of condition (12) is exceeded, the refractive power of the third lens unit is too strong to avoid over-correction of field curvature, although the size of the entire lens system is minimized easily. When the lower limit is exceeded, the lens system, because of suffering a weakened tendency to the telephoto type, increases in size objectionably.

Another feature of the present embodiment is that within the framework of the above-described power arrangement, a good compromise is made between the requirements of achieving the minimization of the entire lens system and of obtaining the prescribed zoom ratio, when the air spacing $D_{23T}$ in the telephoto end between the second lens unit and the third lens unit lies in the following range:

$$0.25 < D_{23T}/FW < 0.5 \qquad (13)$$

When the upper limit or the lower limit of the inequalities of condition (13) is exceeded, it becomes difficult to obtain as high a zoom ratio as 2, while still maintaining the minimization of the size of the entire lens system to be achieved.

Another feature of the present embodiment is that the third lens unit is constructed from a negative third lens of meniscus form convex toward the image side, the radii of curvature RA and RB of the front and rear surfaces of the third lens respectively satisfying the following condition:

$$1.40 < (RB+RA)/(RB-RA) < 1.65 \qquad (14)$$

The inequalities of condition (14) are to correct all the aberrations in good balance over the entire area of the image frame and over the entire zooming range. When either of the upper limit and the lower limit is exceeded, it becomes difficult to maintain good uniformity of the imagery over the entire area of the image frame.

In addition to this, to maintain good stability of the imagery throughout the entire zooming range, the present embodiment makes use of an aspheric surface at the front side or the rear side of the first lens in the first lens unit under the following condition:

$$1 < |B \cdot Y^3| < 15 \qquad (15)$$

where B is the aspheric coefficient of the 4th order of the aspheric surface, and Y is the diagonal length of the effective image frame.

Here, when the aspheric surface is applied to the front surface of the first lens, the aspheric coefficient B takes negative sign, when to the rear surface, it takes positive sign.

When the upper limit of the inequalities of condition (15) is exceeded, the aspheric surface produces an insufficient effect so that good correction of field curvature becomes difficult to do. When the lower limit is exceeded, the effect of the aspheric surface becomes too strong, so the field curvature is objectionably over-corrected.

Incidentally, in numerical examples 6 and 7 to be described later, the first lens is made of polycarbonate and formed to an aspheric lens. A zoom lens well corrected to field curvature is then obtained.

In the present embodiment, a better compromise between the requirements of getting good optical performance particularly over the entire zooming range and of achieving a great advance in the minimization of the size of the entire lens system is made when the above-described conditions (7), (8), (9) and (10) are otherwise set forth as follows:

$$0.9 < M1/M2 < 1.3$$
$$0.5 < M2/M3 < 0.8$$
$$0.7 < M3/FW < 1.1$$
$$-2.9 < F1/FW < -2.1$$

Next, the numerical examples 6 and 7 of zoom lenses of the invention are shown in tables below. The values of the factors in the above-described conditions (7) to (15) for the numerical examples 6 and 7 are listed in Table-2.

Numerical Example 6 (FIGS. 11, 13(A), 13(B) and 13(C))
F = 36.19-67.7   FNo = 1:5.8-9.8   2ω = 61.8°-35.4°

| | | | |
|---|---|---|---|
| *R1 = 17.94 | D1 = 1.5 | N1 = 1.58306 | ν1 = 30.2 |
| R2 = 12.95 | D2 = Variable | | |
| R3 = 69.27 | D3 = 3.0 | N2 = 1.49700 | ν2 = 81.6 |
| R4 = −14.66 | D4 = 2.74 | | |
| R5 = (Stop) | D5 = Variable | | |
| R6 = −16.93 | D6 = 1.7 | N3 = 1.71299 | ν3 = 53.8 |
| R8 = −81.53 | | | |

| Variable Separation | Focal Length | | |
|---|---|---|---|
| | 36.19 | 49.78 | 67.70 |
| D2 | 10.97 | 11.63 | 11.55 |
| D5 | 24.30 | 17.33 | 12.64 |

R1: Aspheric Surface; Aspheric Coefficients:
A = 0
B = −5.63 × 10⁻⁵
C = −4.46 × 10⁻⁷
D = −8.74 × 10⁻¹⁰
E = −1.77 × 10⁻¹¹

Numerical Example 7 (FIGS. 12, 14(A), 14(B) and 14(C))
F = 36.19-67.7   FNo = 1:5.8-9.8   2ω = 61.8°-35.4°

| | | | |
|---|---|---|---|
| *R1 = 36.25 | D1 = 1.5 | N1 = 1.80518 | ν1 = 25.4 |
| R2 = 23.29 | D2 = Variable | | |
| R3 = 43.92 | D3 = 3.0 | N2 = 1.48749 | ν2 = 70.2 |
| R4 = −15.68 | D4 = 2.52 | | |
| R5 = (Stop) | D5 = Variable | | |
| R6 = −16.03 | D6 = 1.7 | N3 = 1.74320 | ν3 = 49.3 |
| R7 = −74.39 | | | |

| Variable Separation | Focal Length | | |
|---|---|---|---|
| | 36.19 | 49.67 | 67.75 |
| D2 | 9.95 | 10.67 | 10.72 |
| D5 | 23.89 | 17.60 | 13.30 |

R1: Aspheric Surface; Aspheric Coefficients:
A = 0
B = −5.17 × 10⁻⁵
C = −6.66 × 10⁻⁸
D = −3.94 × 10⁻⁹
E = 1.74 × 10⁻¹¹

TABLE 2

| Condition No. | Factor | Numerical Example 6 | Numerical Example 7 |
|---|---|---|---|
| (7) | M1/M2 | 1.03 | 1.04 |
| (8) | M2/M3 | 0.65 | 0.66 |
| (9) | M3/FW | 0.91 | 0.86 |
| (10) | F1/FW | −2.48 | −2.36 |
| (11) | F2/FW | 0.68 | 0.67 |
| (12) | F3/FW | −0.84 | −0.77 |
| (13) | $D_{23T}$/FW | 0.43 | 0.37 |
| (14) | $\frac{RB + RA}{RB - RA}$ | 1.52 | 1.55 |
| (15) | $\|B \cdot Y^3\|$ | 4.56 | 4.18 |

Figure 16:
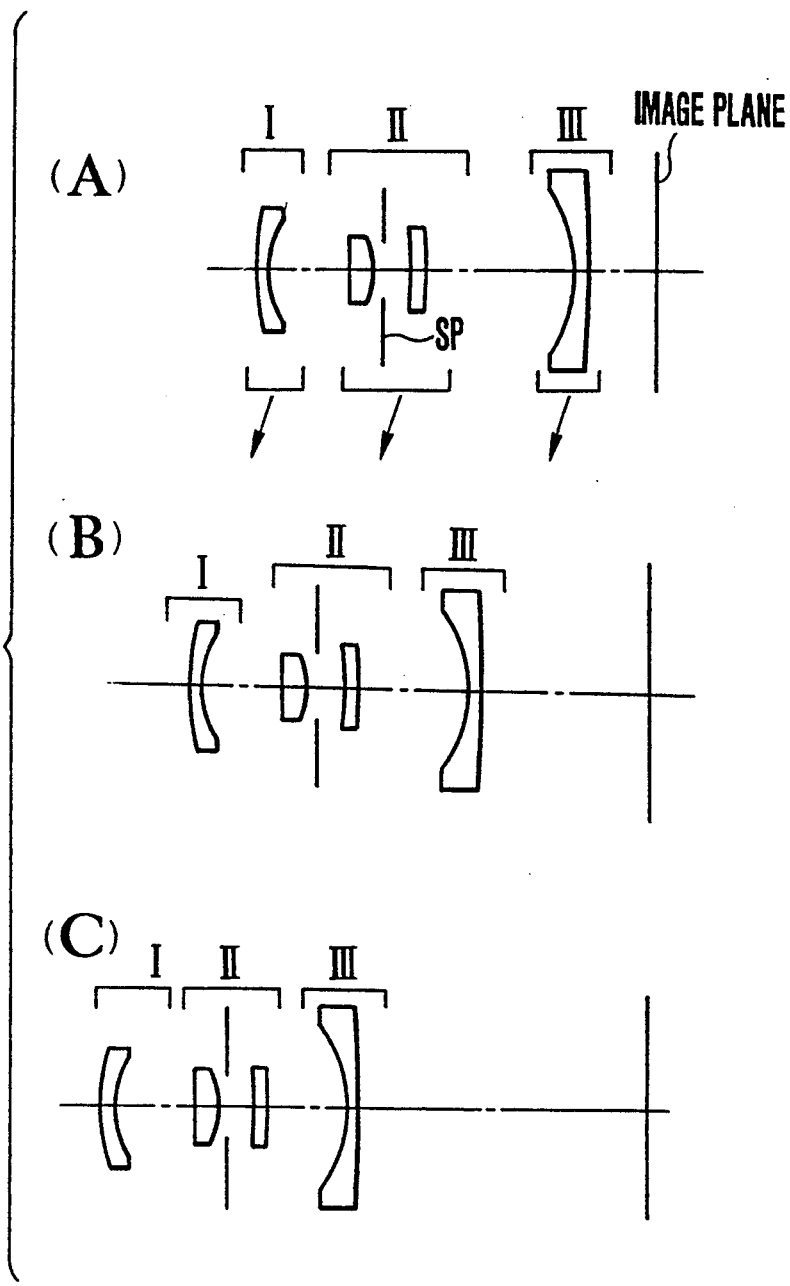
Figure 17A:
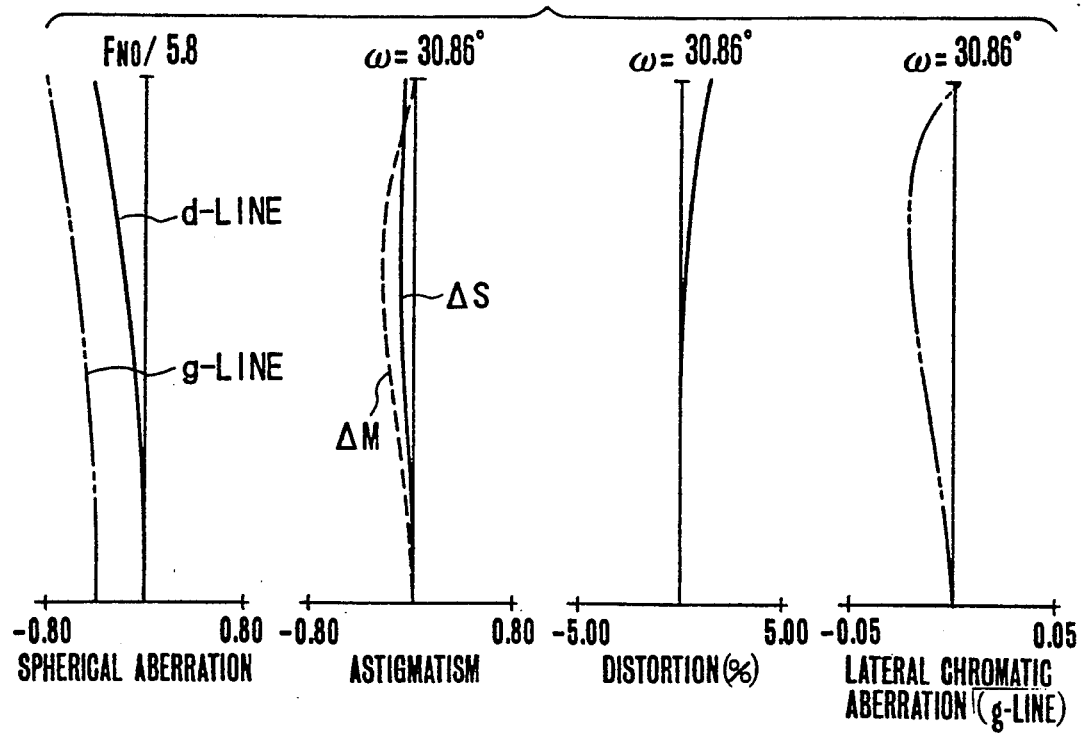
Figure 17B:
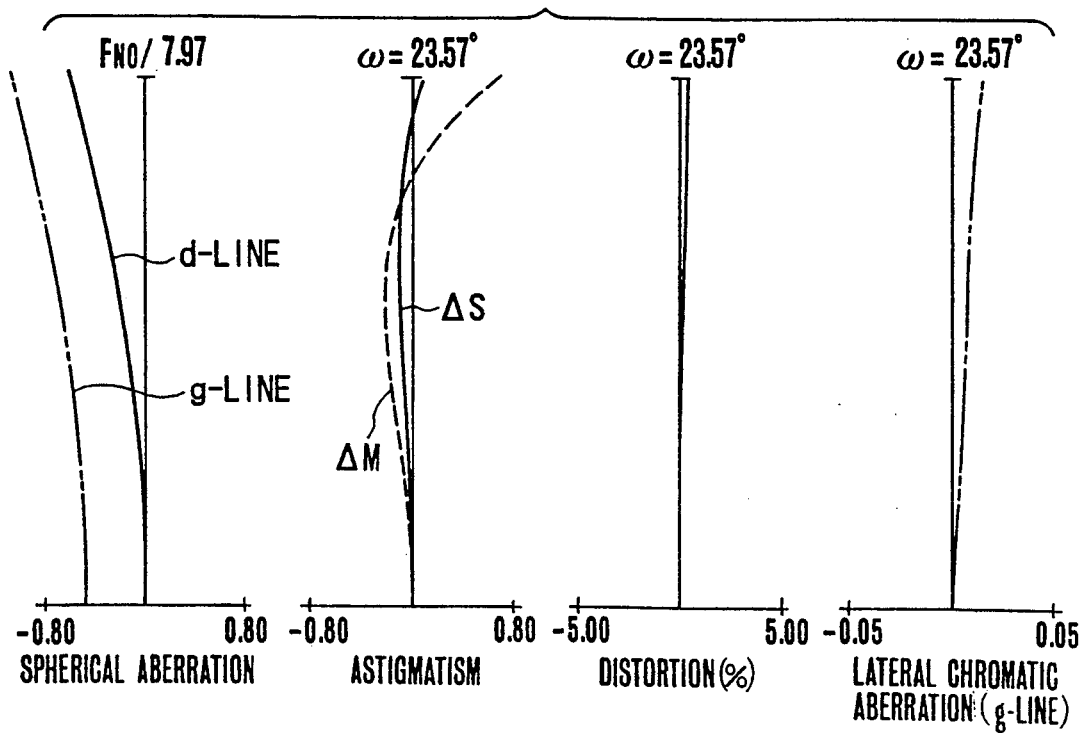
Figure 17C:
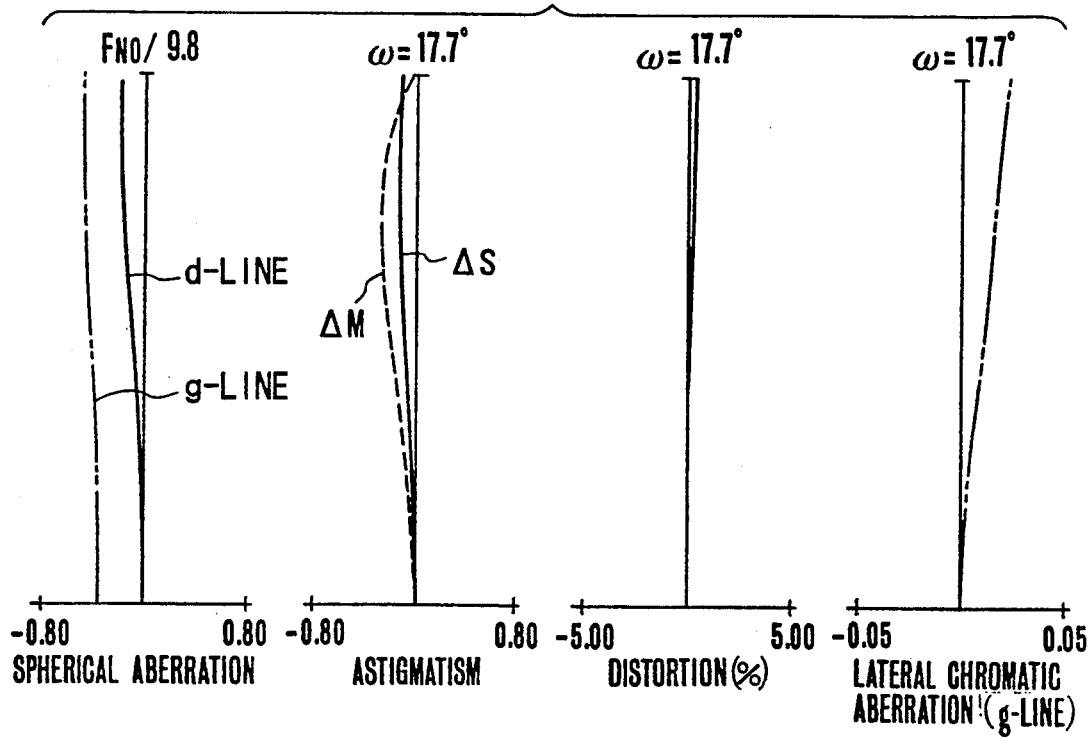
Figure 18A:
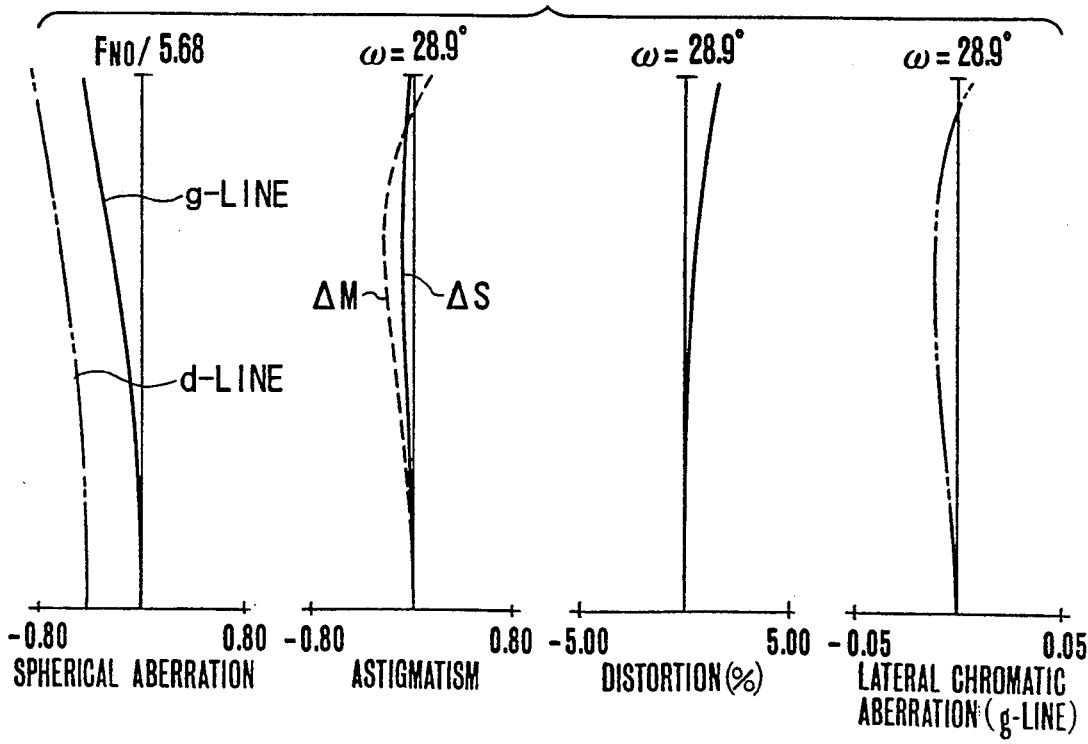
Figure 18B:
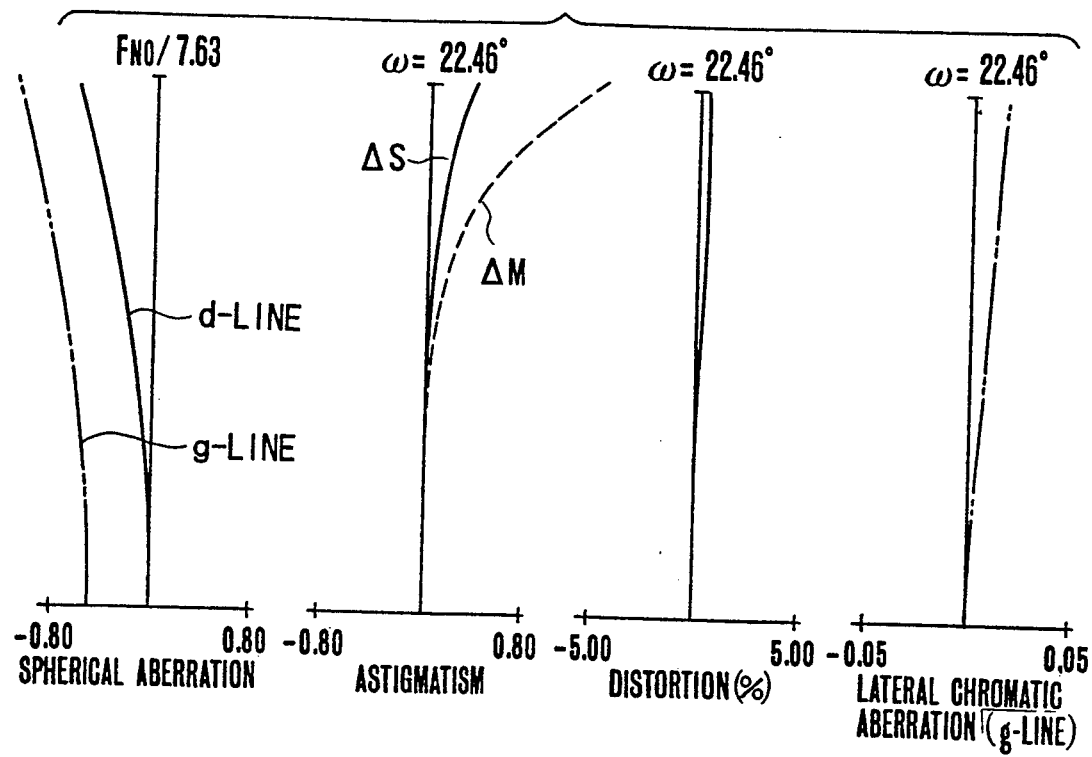
Figure 18C:
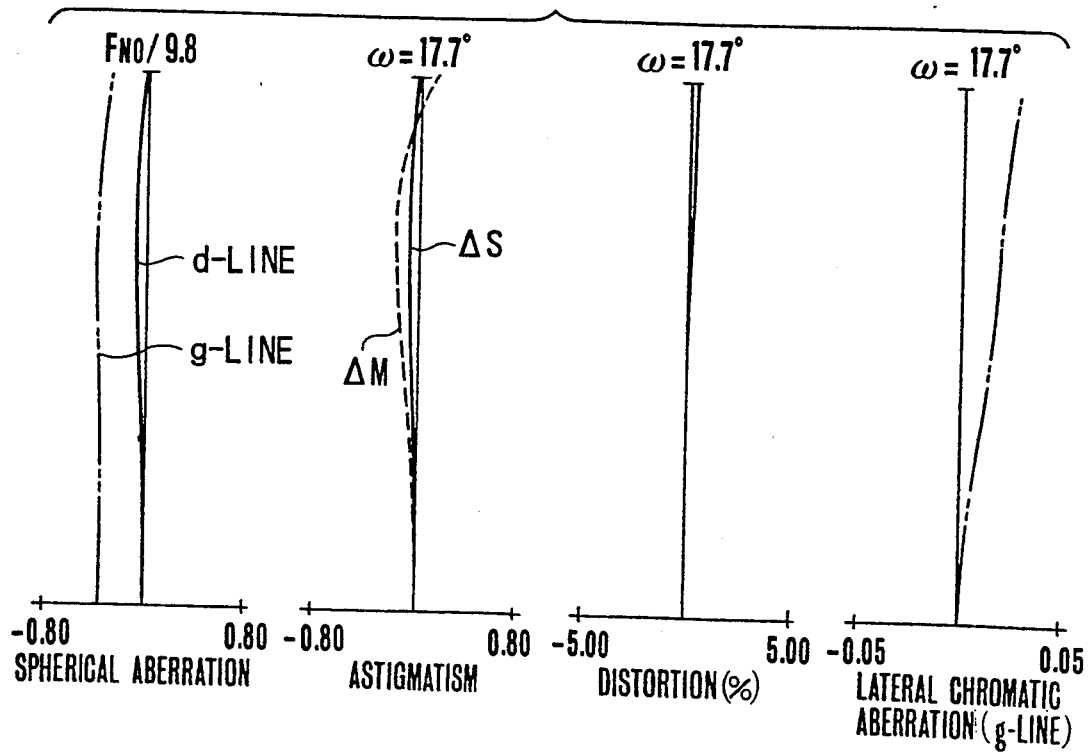

Another embodiment of the invention which is taken from the standpoint of the air separations between any two of the lens units is described by reference to the lens block diagrams of FIG. 15 and FIG. 16.

Particularly in the present embodiment, the first lens unit is constructed with a negative first lens of meniscus form convex toward the front, the second lens unit with a positive second lens of bi-convex form, a diaphragm and a negative third lens of meniscus form convex toward the rear, and the third lens unit with a negative fourth lens of meniscus form convex toward the rear, their arrangement satisfying the following conditions:

$$0.06 < (D1 + D2T)/FW < 0.7 \quad (16)$$

$$0.1 < (D3 + D4 + D5)/FW < 0.5 \quad (17)$$

where Di is the i-th lens thickness or air separation, when counted from the front, in the wide-angle end, D2T is the air separation between the first lens and the second lens in the telephoto end, and FW is the shortest focal length of the entire lens system.

The technical significance of each of the above-described conditions is explained below.

The inequalities of condition (16) give so appropriate a range for the sum of the lens thickness of the first lens in the first lens unit and the air separation between the first and second lens units in the telephoto end to contribute to a lens system of minimized bulk and size as a whole, while still maintaining good correction of aberrations, mainly field curvature.

When the upper limit of the inequalities of condition (16) is exceeded, the diameter of the front lens (the effective diameter of the first lens) increases largely. When the lower limit is exceeded, it becomes difficult to stabilize good correction of field curvature over the entire zooming range.

The inequalities of condition (17) concern with the axial thickness of the second lens unit, or the length from the front vertex of the second lens to the rear vertex of the third lens. With the minimized lens system as a whole, mainly coma in the telephoto end is well corrected.

When the upper limit of the condition (17) is exceeded, the bulk and size of the entire lens system increase largely. When the lower limit is exceeded, large coma is produced on the telephoto side.

To advantageously obtain a zoom ratio of 1.5-2 or thereabout, while still maintaining the shortening of the total length of the complete lens to be achieved, the invention sets forth other rules of lens design for the amounts of movement M1, M2 and M3 of the first, second and third lens units respectively as zooming from the wide-angle end to the telephoto end as follows:

$$0.6 < M1/M2 < 1.7 \quad (18)$$

$$0.3 < M2/M3 < 0.9 \quad (19)$$

The inequalities of condition (18) concern with the ratio of the total zooming movements of the first lens unit and the second lens unit. When the total movement of the first lens unit is too large, compared with the total movement of the second lens unit as exceeding the upper limit of the condition (18), the effect of varying the magnification as the second lens unit moves gets a too strong tendency to reverse variation of the magnification. Therefore, it becomes difficult to obtain the prescribed zoom ratio. Conversely when the total movement of the second lens unit is too large, compared with the total movement of the first lens unit as exceeding the lower limit, because the second lens unit is of positive refractive power, the asymmetry of the lens arrangement becomes large on the telephoto side, so that the amount of aberrations, particularly coma, produced increases objectionably.

The inequalities of condition (19) concern with the ratio of the total zooming movements of the second lens unit and the third lens unit. When the total movement of the second lens unit is too large compared with the total movement of the third lens unit as exceeding the upper limit of the condition (19), the amount of variation of the air spacing between the second lens unit and the third lens unit becomes so small to obtain the prescribed zoom ratio with ease. When the total movement of the third lens unit is too large, compared with the total movement of the second lens unit as exceeding the lower limit, the air spacing between the second lens unit and the third lens unit becomes too narrow to avoid occurrence of mechanical interference between these two lens units. So that is no good.

Besides these, the invention has another feature which aims particularly to secure the prescribed zoom ratio and good optical performance on the telephoto side at once. This feature is a condition for the air separation D6T between the third lens and the fourth lens as expressed by:

$$0.1 < D6T/FW < 0.6 \quad (20)$$

When the upper limit of the condition (20) is exceeded, the total movement of the second lens unit becomes so short as to secure the prescribed zoom ratio with ease. When the lower limit is exceeded, the amount of coma produced increases largely on the telephoto side.

Another feature is that the first lens is made of plastic material and its front or rear surface is formed to an aspheric shape with the negative refractive power getting stronger toward the margin. This produces an advantage of maintaining good correction of aberrations, particularly field curvature, over the entire zooming range.

Another feature is that the air separation between the first lens unit and the second lens unit is made first to increase gradually with zooming from the wide-angle end to a middle position and then to decrease gradually with zooming from the middle position to the telephoto end, and is made to have a slightly larger value in the telephoto end than in the wide-angle end. Thus, the aberrations, mainly field curvature, are well corrected over the entire zooming range.

It is to be noted that in the invention, to facilitate an effective advance in the minimization of the bulk and size of the entire lens system while still maintaining good optical performance over the entire zooming range, the above-described conditions (16) to (20) may otherwise be defined as follows:

$$0.17 < (D1 + D2T)/FW < 0.4$$
$$0.15 < (D3 + D4 + D5)/FW < 0.35$$
$$0.9 < M1/M2 < 1.3$$
$$0.5 < M2/M3 < 0.8$$
$$0.2 < D6/FW < 0.5$$

Numerical examples 8 and 9 of this embodiment are shown below.

The values of the factors in the above-described conditions (16) to (20) for the numerical examples 8 and 9 are also listed in Table-3.

Numerical Example 8 (FIGS. 15, 17(A), 17(B) and 17(C))
$F = 36.2 - 67.7 \quad FNo = 1:5.8-9.8 \quad 2\omega = 61.8°-35.4°$

| | | | |
|---|---|---|---|
| *R1 = 17.72 | D1 = 1.5 | N1 = 1.58306 | $\nu$1 = 30.2 |
| R2 = 12.90 | D2 = Variable | | |
| R3 = 119.46 | D3 = 3.0 | N2 = 1.49700 | $\nu$2 = 81.6 |
| R4 = −14.9 | D4 = 1.5 | | |
| R5 = (Stop) | D5 = 4.0 | | |
| R6 = −41.74 | D6 = 2.0 | N3 = 1.49171 | $\nu$3 = 57.4 |
| R7 = −30.98 | D7 = Variable | | |
| R8 = −18.99 | D8 = 1.7 | N4 = 1.71299 | $\nu$4 = 53.8 |
| R9 = −206.41 | | | |

| Variable Separation | Focal Length | | |
|---|---|---|---|
| | 36.20 | 49.62 | 67.70 |
| D2 | 10.81 | 11.41 | 11.21 |
| D7 | 20.35 | 13.78 | 9.27 |

R1: Aspheric Surface; Aspheric Coefficients:

$A = 0$
$B = -5.45 \times 10^{-5}$
$C = -3.78 \times 10^{-7}$
$D = -2.84 \times 10^{-9}$
$E = -5.22 \times 10^{-12}$ Numerical Example 9 (FIGS. 16, 18(A), 18(B) and 18(C))
$F = 39.2 - 67.7 \quad FN0 = 1:5.7-9.8 \quad 2\omega = 57.6°-35.4°$

| | | | |
|---|---|---|---|
| *R1 = 17.81 | D1 = 1.5 | N1 = 1.58306 | $\nu$1 = 30.2 |
| R2 = 12.95 | D2 = Variable | | |
| R3 = 139.45 | D3 = 3.0 | N2 = 1.49700 | $\nu$2 = 81.6 |
| R4 = −14.63 | D4 = 1.5 | | |
| R5 = (Stop) | D5 = 4.0 | | |
| R6 = −41.42 | D6 = 2.0 | N3 = 1.49171 | $\nu$3 = 57.4 |
| R7 = −31.20 | D7 = Variable | | |
| R8 = −19.10 | D8 = 1.7 | N4 = 1.71299 | $\nu$4 = 53.8 |
| R9 = −193.60 | | | |

| Variable Separation | Focal Length | | |
|---|---|---|---|
| | 39.22 | 52.32 | 67.70 |
| D2 | 10.94 | 11.53 | 11.21 |
| D7 | 19.89 | 14.04 | 10.30 |

R1: Aspheric Surface; Aspheric Coefficients:

$A = 0$
$B = -5.4 \times 10^{-5}$
$C = -3.72 \times 10^{-7}$
$D = -2.79 \times 10^{-9}$
$E = -3.93 \times 10^{-12}$

TABLE 3

| Condition No. | Factor | Numerical Example | |
|---|---|---|---|
| | | 8 | 9 |
| (16) | (D1 + D2T)/FW | 0.35 | 0.3 |
| (17) | (D3 + D4 + D5)/FW | 0.29 | 0.27 |
| (18) | M1/M2 | 1.02 | 1.01 |

TABLE 3-continued

| Condition No. | Factor | Numerical Example | |
|---|---|---|---|
| | | 8 | 9 |
| (19) | M2/M3 | 0.66 | 0.67 |
| (20) | D6/FW | 0.26 | 0.26 |

The present invention is next described in connection with yet another embodiment thereof by reference to FIGS. 19, 20 and 21. In this embodiment, the first lens unit is constructed with a negative first lens of meniscus form convex toward the front, the second lens unit with a positive second lens of bi-convex form with the rear lens surface having a stronger refractive power than the front lens surface has, and the third lens unit with a negative third lens of meniscus form convex toward the rear to thereby shorten the total length of the entire lens system, while still permitting the various aberrations including chromatic aberrations to be corrected in good balance over the entire zooming range. Thus, it is made possible to obtain a zoom lens having a high optical performance.

And, another features are that, letting the focal length of the i-th lens unit, when counted from the front, be denoted by Fi, the shortest focal length of the entire lens system by Fw, and the interval between the principal points of the i-th lens unit and the (i+1)st lens unit in the wide-angle end by EiW, the following conditions are satisfied:

$$-2.8 < F1/Fw < -1.3 \quad (21)$$

$$0.11 < E1W/Fw < 0.25 \quad (22)$$

The technical significance of each of the above-described conditions (21) and (22) is explained below.

The inequalities of condition (21) give so appropriate a range for the negative refractive power of the first lens unit as to well correct various aberrations.

When the refractive power of the first lens unit is too strong as beyond the upper limit of the condition (21), it becomes difficult to correct the various aberrations in good balance over the entire zooming range. When the refractive power of the first lens unit is too weak as beyond the lower limit, it becomes difficult to well correct longitudinal chromatic aberration on the wide-angle side.

The inequalities of condition (22) give so appropriate a range for the interval between the principal points of the first lens unit and the second lens unit in the wide-angle end as to contribute to a reduction of the bulk and size of the entire lens system, while still permitting the various aberrations to be corrected in good balance.

When the interval between the principal points of the first lens unit and the second lens unit is too long as exceeding the upper limit of the condition (22), the effective diameter of the first lens unit increases largely. When the interval between the principal points of the first lens unit and the second lens unit is too short as exceeding the lower limit, the symmetric property of the whole lens system collapses so that it becomes difficult to correct the various aberrations in good balance.

To improve the correction of all aberrations with the limitation of the bulk and size of the entire lens system to a minimum, the present embodiment sets forth additional conditions as follows:

$$-1 < F2/F3 < -0.6 \quad (23)$$
$$-0.3 < (E1W - E1T)/(E2W - E2T) < 0.2 \quad (24)$$
$$0.16 < (N1 + N3)/2 - N2 < 0.45 \quad (25)$$
$$\nu1 < \nu3 < \nu2 \quad (26)$$

where EiT is the interval between the principal points of the i-th and (i+1)st lens units, when counted from the front, in the telephoto end, and Ni and $\nu$i are the refractive index and Abbe number of the material of the i-th lens respectively.

The inequalities of condition (23) give so appropriate a range for the ratio of the refractive powers of the second lens unit and the third lens unit as to effectively obtain the prescribed zoom ratio.

When the refractive power of the third lens unit is too weak as exceeding the upper limit of the condition (23), the required total movement of the third lens unit for securing the prescribed zoom ratio increases largely. The total length of the entire lens system then becomes unduly long. When the refractive power of the third lens unit is too strong as exceeding the lower limit, it becomes difficult to well correct off-axial aberrations such as field curvature.

The inequalities of condition (24) give so appropriate a range for the ratio of the amounts of variation of the principal point intervals between the first and second lens units and between the second and third lens units as to well correct aberrations, chiefly field curvature.

When the upper limit of the condition (24) is exceeded, the field curvature is caused to vary in the negative direction to a large extent when zooming from the wide-angle end to the telephoto end. When the lower limit is exceeded, the field curvature is caused to vary in the opposite or positive direction when zooming from the wide-angle end to the telephoto end.

The inequalities of condition (25) are to establish so appropriate a relationship among the refractive indices of the materials of all the lens units as to well correct chiefly the image surface characteristics. When the upper limit is exceeded, the Petzval sum increases in the positive direction. When the lower limit is exceeded, the Petzval sum increases in the opposite or negative direction. In either case, it becomes difficult to well correct astigmatism.

The inequalities of condition (26) are to establish so appropriate a relationship among the Abbe numbers of the materials of all the lens units as to well correct longitudinal chromatic aberration and lateral chromatic aberration over the entire zooming range.

When the condition (26) is violated, it becomes difficult to correct these chromatic aberrations in good balance over the entire zooming range.

Besides these, the present embodiment has other features which aim chiefly to maintain good stability of the imagery of the entire area of the image frame throughout the entire zooming range. In this connection, as an aspheric sphere is applied to the front lens surface of the first lens unit, another aspheric sphere to the rear lens surface of the second lens unit, and still another aspheric sphere to the front lens surface of the third lens unit, letting the 4th order aspheric coefficient of the aspheric surface of the i-th lens unit be denoted by Bi, and the diagonal length of the effective area of the image frame by Y, the following conditions are satisfied:

$$-15 < B1 \cdot Y^3 < -1 \quad (27)$$
$$-7 < B2 \cdot Y^3 < -0.1 \quad (28)$$

-continued $$|B3 \cdot Y^3| < 2 \quad (29)$$

The inequalities of conditions (27) and (29) are to well correct aberrations, chiefly field curvature.

When the upper limit of the condition (27) or the lower limit of the condition (29) is exceeded, it becomes difficult to well correct field curvature. When the lower limit of the condition (27) or the upper limit of the condition (29) is exceeded, the aspheric surface produces too strong an effect, so over-correction of field curvature results.

When the upper limit of the condition (28) is exceeded, the aspheric surface produces too weak an effect, it becomes difficult to well correct spherical aberration. When the lower limit is exceeded, over-correction of spherical aberration results.

Numerical examples 10 to 12 of this embodiment are shown in the following tables.

The values of the factors of the above-described conditions (21) to (25) and (27) to (29) for the numerical examples 10 to 12 are also listed in Table-4.

Figure 19:
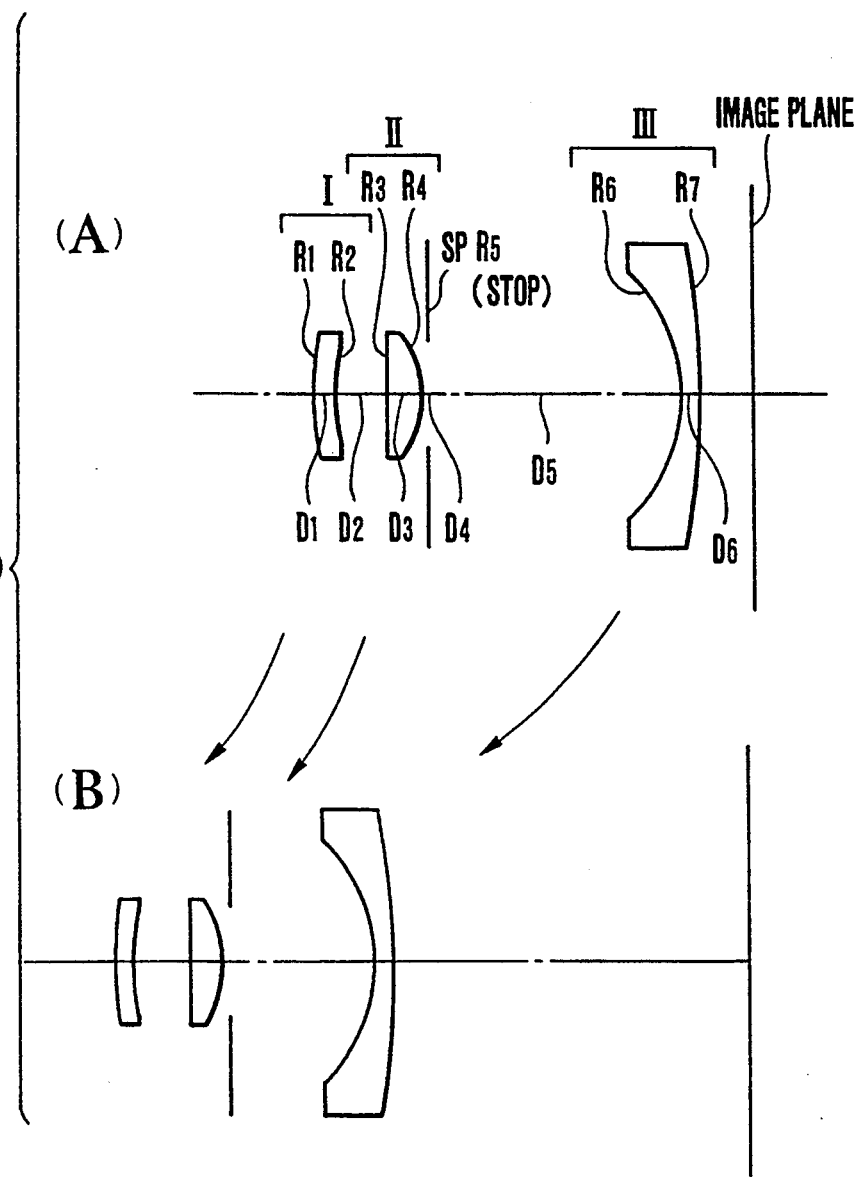
Figure 22A:
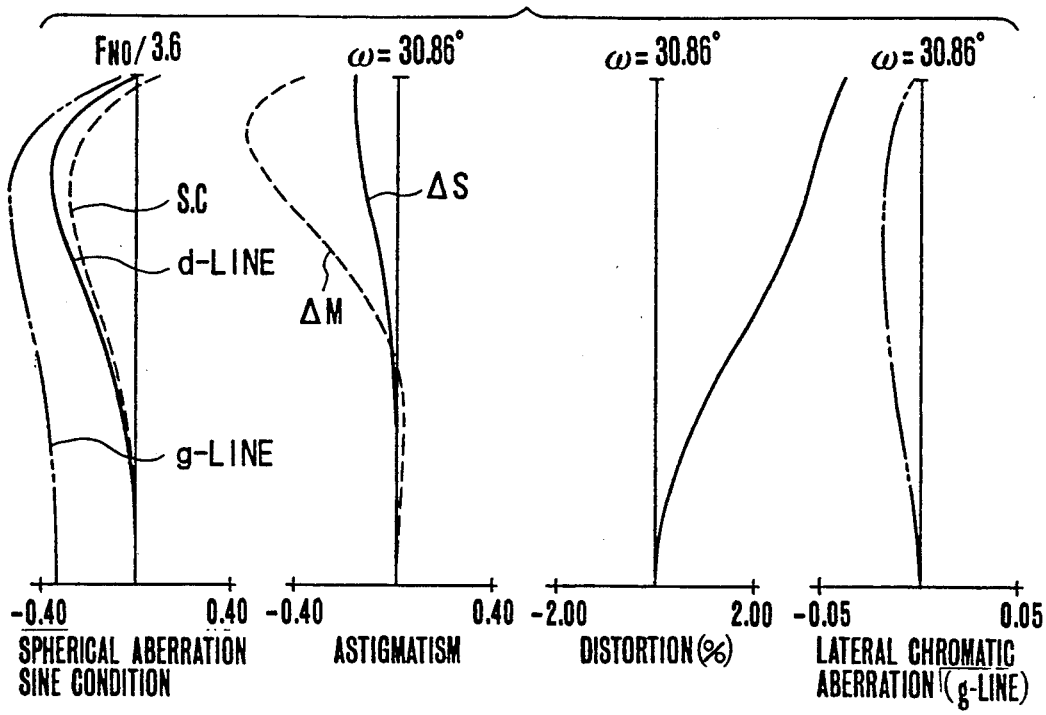
Figure 22B:
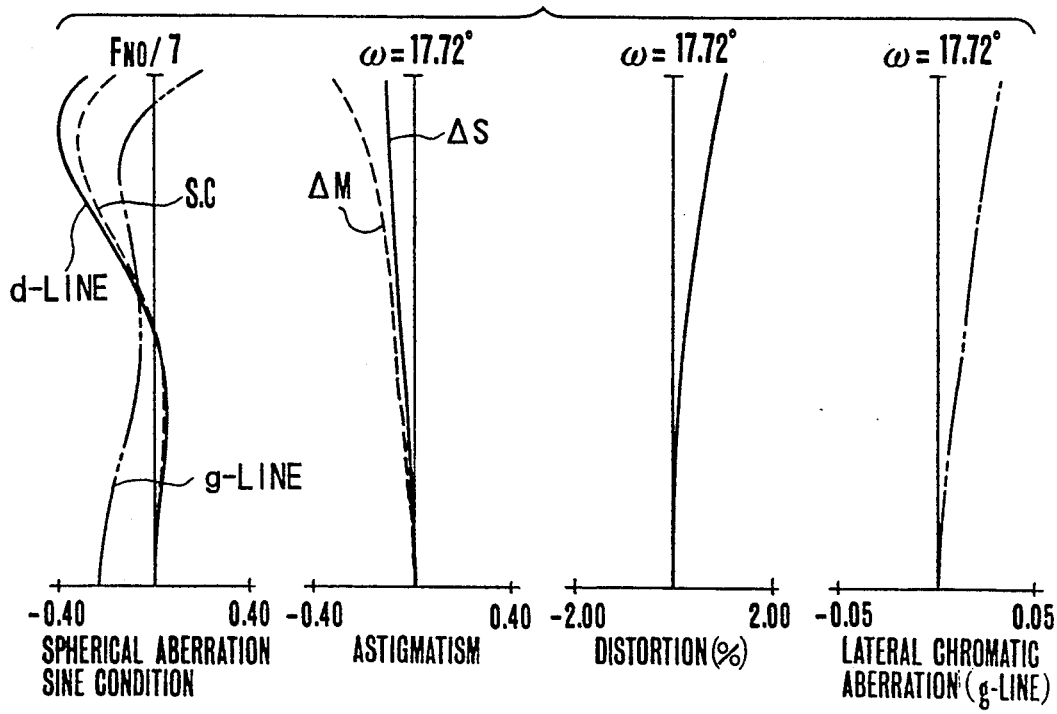

Numerical Example 10 (FIGS. 19, 22(A) and 22(B))
F = 36.2-67.7   FNo = 1:3.6-7   2ω = 61.7°-35.4°

| | | |
|---|---|---|
| *R1 = 33.42 | D1 = 1.6 | N1 = 1.80518   ν1 = 25.4 |
| R2 = 20.31 | D2 = Variable | |
| R3 = 238.31 | D3 = 3.0 | N2 = 1.49831   ν2 = 65.0 |
| *R4 = −11.57 | D4 = 1.0 | |
| R5 = (Stop) | D5 = Variable | |
| *R6 = −15.98 | D6 = 1.7 | N3 = 1.72916   ν3 = 54.7 |
| R7 = −79.26 | | |

| Variable | Focal Length | |
|---|---|---|
| Separation | 36.20 | 67.74 |
| D2 | 5.71 | 6.29 |
| D5 | 25.48 | 14.85 |

Aspheric Coefficients:

R1: A = 0
B = −1.07 × 10⁻⁴
C = −5.08 × 10⁻⁷
D = −1.57 × 10⁻⁸
R4: A = 0
B = −1.51 × 10⁻⁵
C = −9.39 × 10⁻⁸
R6: A = 0
B = −2.12 × 10⁻⁶
C = −3.53 × 10⁻⁸

Figure 20:
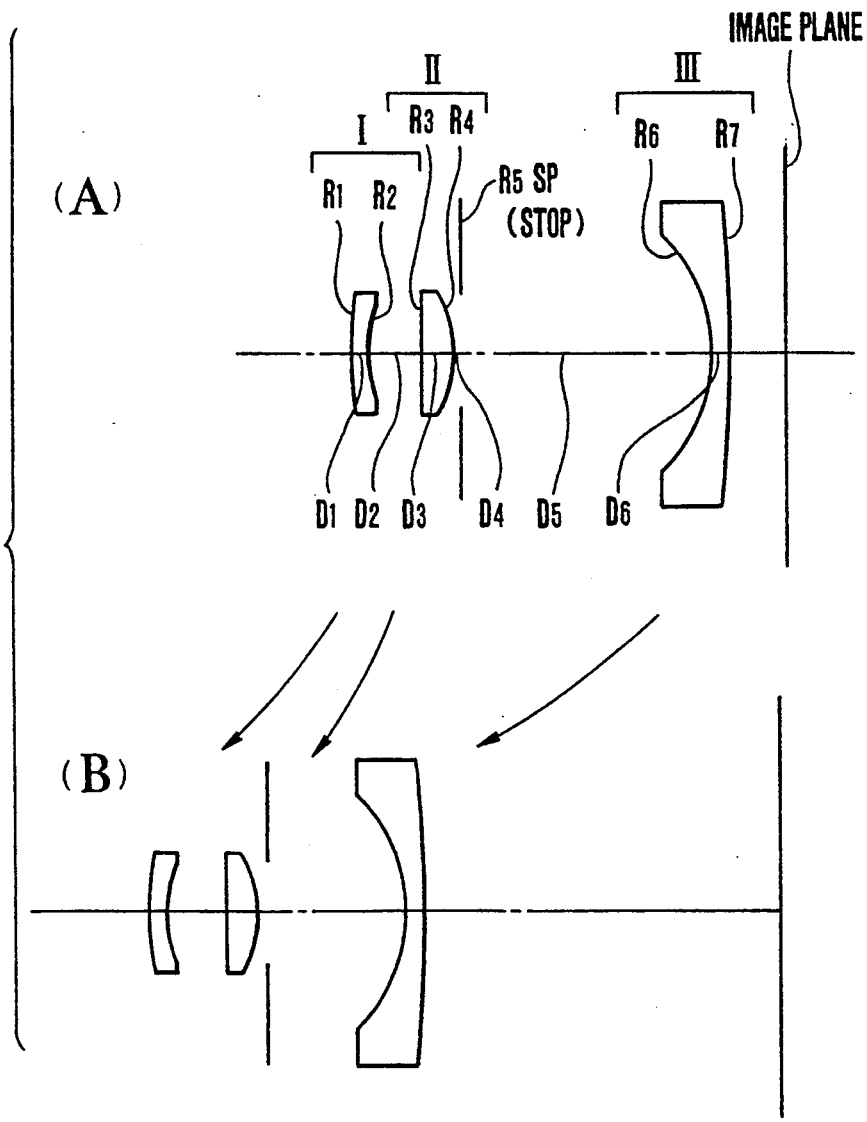
Figure 23A:
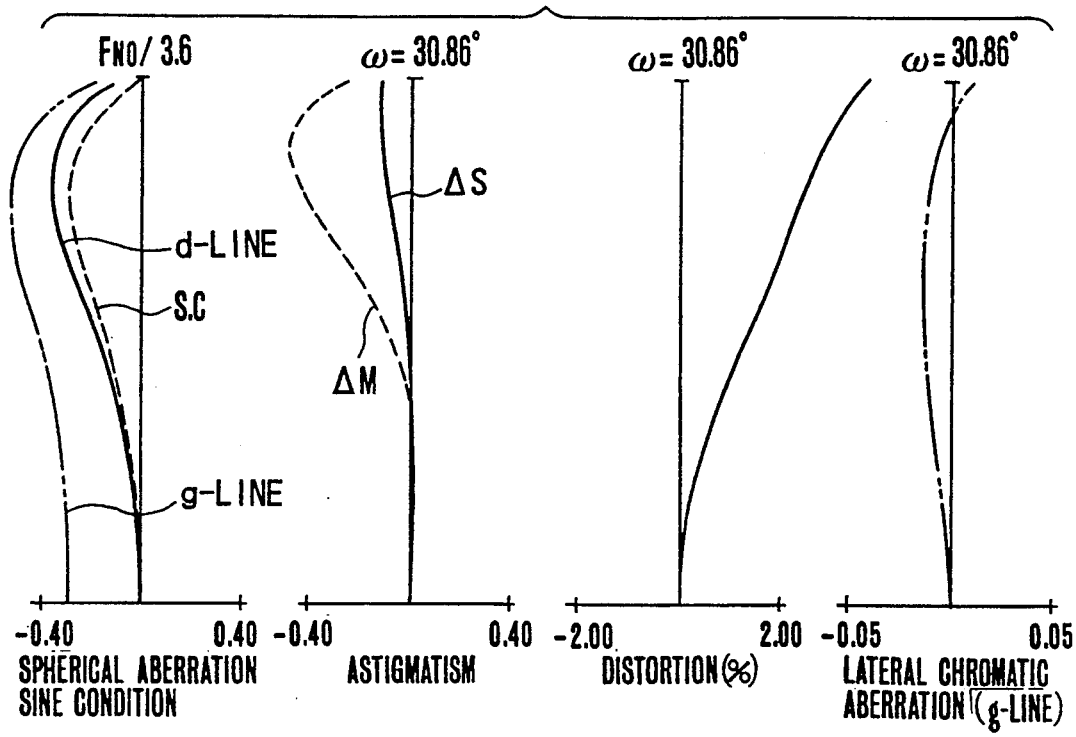
Figure 23B:
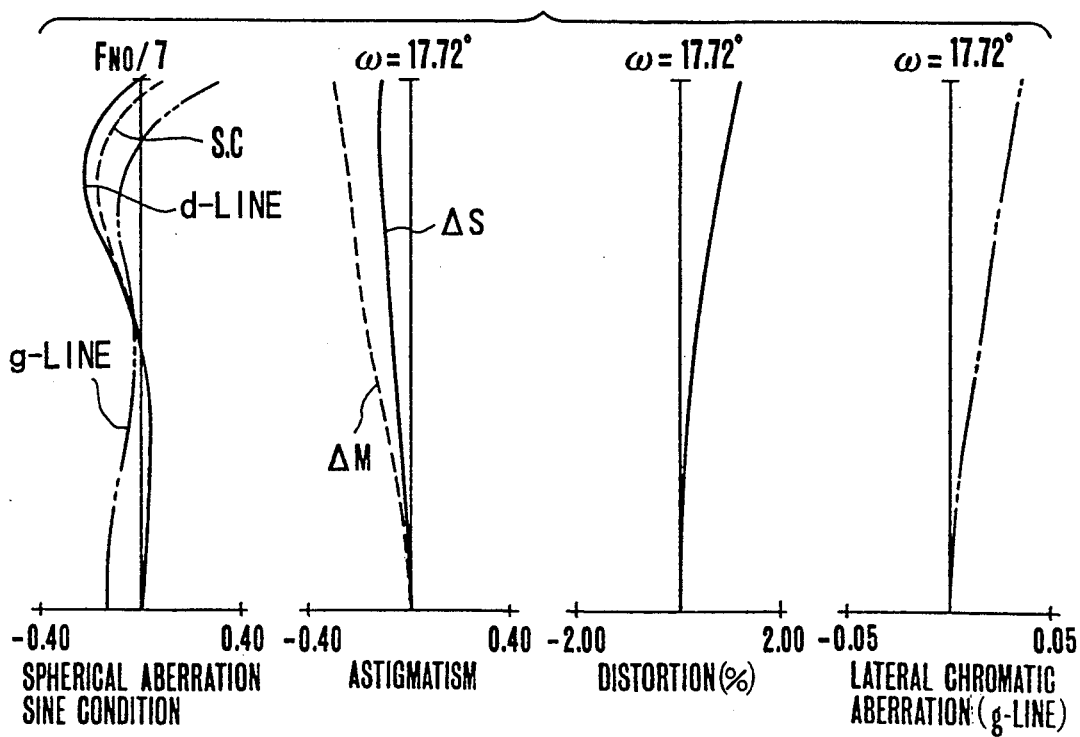

Numerical Example 11 (FIGS. 20, 23(A) and 23(B))
F = 36.2-67.7   FNo = 1:3.6-7   2ω = 61.7°-35.4°

| | | |
|---|---|---|
| *R1 = 38.28 | D1 = 1.61 | N1 = 1.91348   ν1 = 32.4 |
| R2 = 23.01 | D2 = Variable | |
| R3 = 229.45 | D3 = 3.08 | N2 = 1.49700   ν2 = 81.6 |
| *R4 = −11.58 | D4 = 1.03 | |
| R5 = (Stop) | D5 = Variable | |
| *R6 = −16.06 | D6 = 1.70 | N3 = 1.61800   ν3 = 63.4 |
| R7 = −195.68 | | |

| Variable | Focal Length | |
|---|---|---|
| Separation | 36.18 | 67.70 |
| D2 | 5.80 | 6.32 |
| D5 | 25.60 | 14.67 |

Aspheric Coefficients:

R1: A = 0
B = −9.34 × 10⁻⁵
C = −4.35 × 10⁻⁷
D = −1.31 × 10⁻⁸
R4: A = 0
B = −1.06 × 10⁻⁵
C = −3.97 × 10⁻⁸
R6: A = 0
B = −1.68 × 10⁻⁷
C = −5.64 × 10⁻⁸

Figure 21:
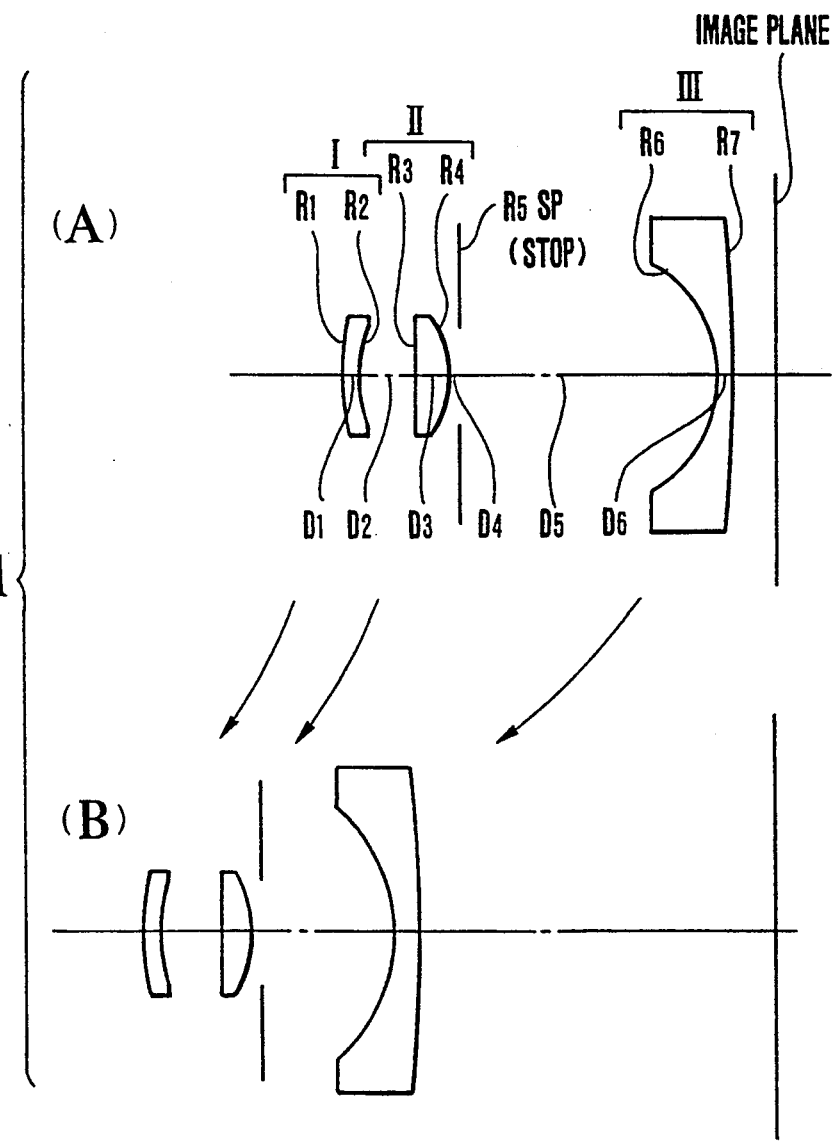
Figure 24A:
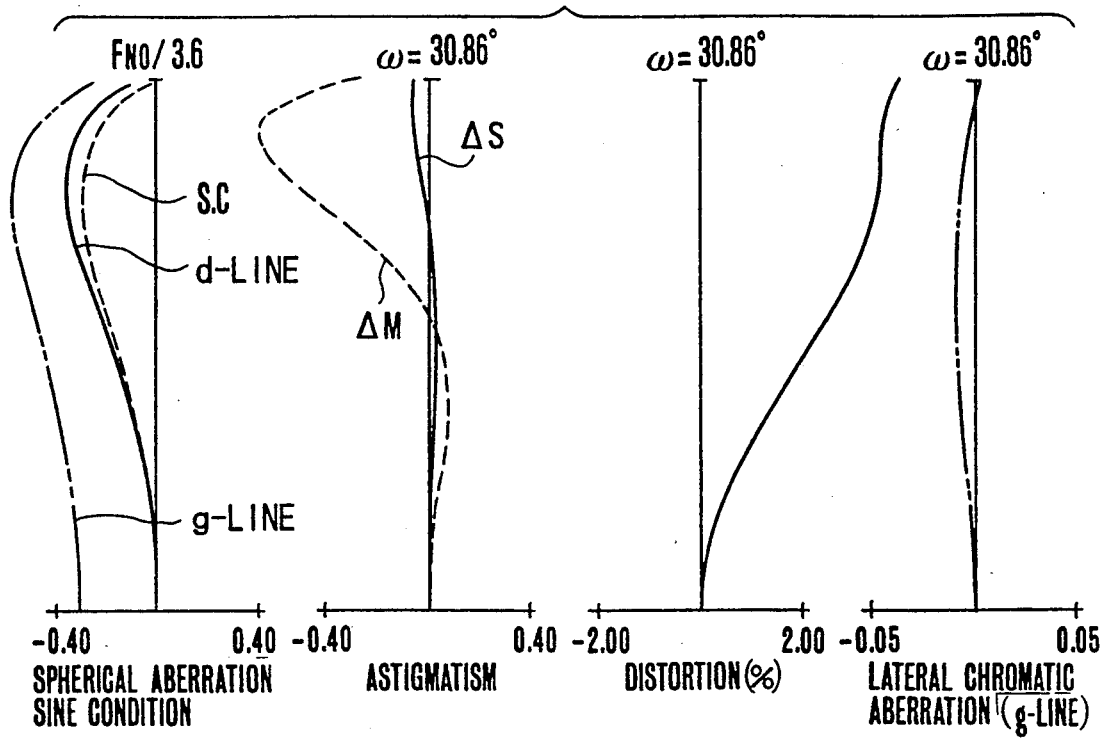
Figure 24B:
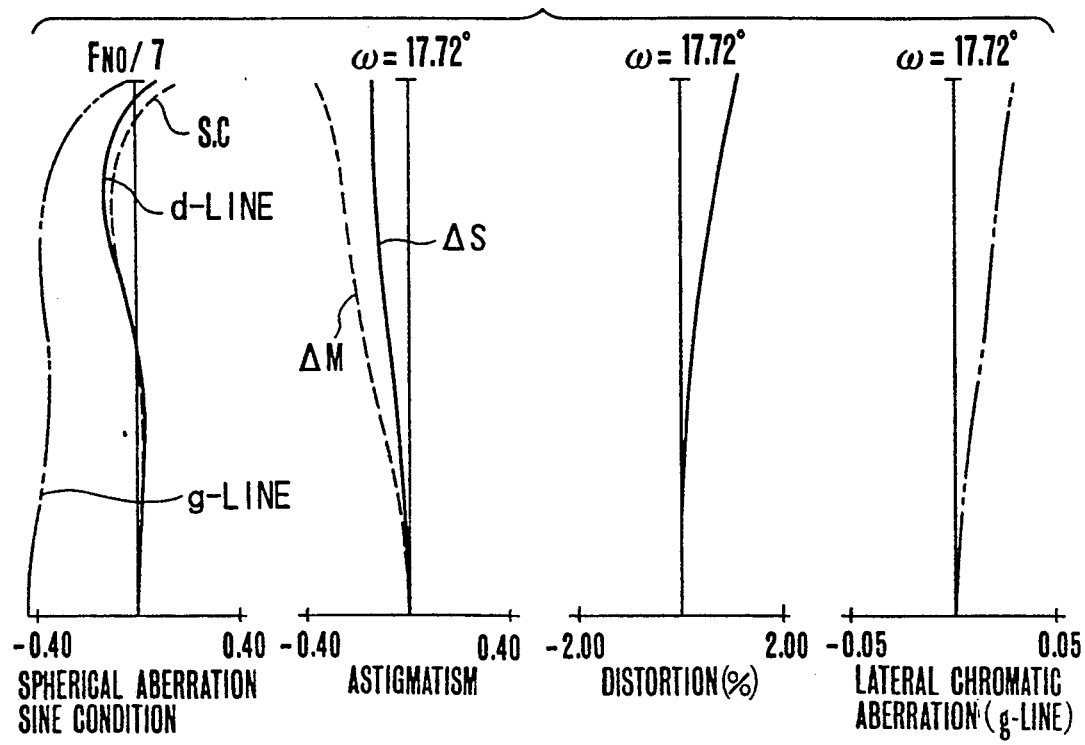
Figure 25:
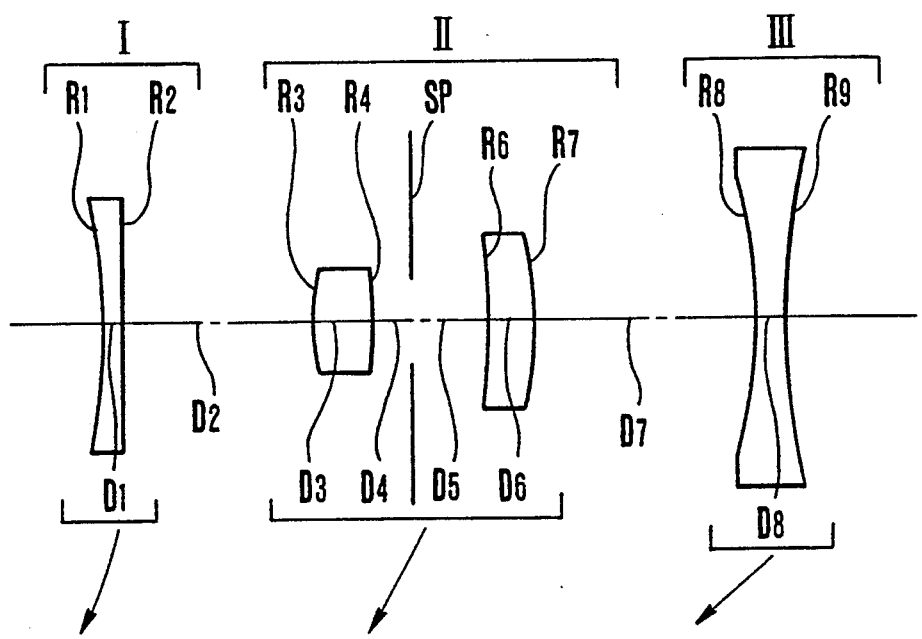
Figure 26:
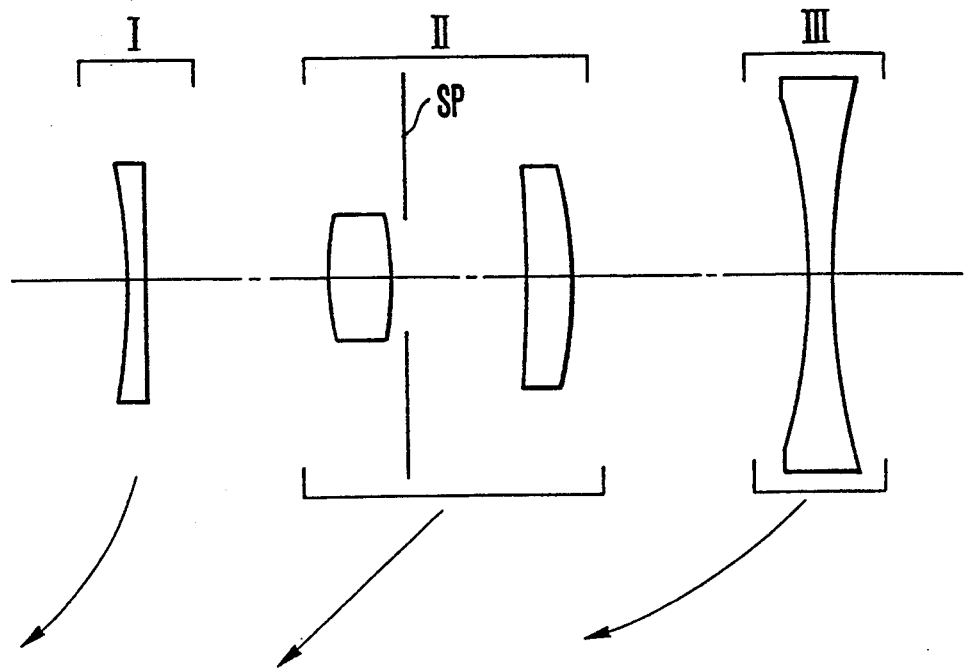

Numerical Example 12 (FIGS. 21, 24(A) and 24(B))
F = 36.2-67.8   FNo = 1:3.6-7   2ω = 61.7°-35.4°

| | | |
|---|---|---|
| *R1 = 26.38 | D1 = 1.60 | N1 = 1.87800   ν1 = 38.1 |
| R2 = 18.81 | D2 = Variable | |
| R3 = 96.75 | D3 = 3.30 | N2 = 1.43387   ν2 = 95.1 |
| *R4 = −11.33 | D4 = 1.04 | |
| R5 = (Stop) | D5 = Variable | |
| *R6 = −13.59 | D6 = 1.70 | N3 = 1.49700   ν3 = 81.6 |
| R7 = −179.43 | | |

| Variable | Focal Length | |
|---|---|---|
| Separation | 36.20 | 67.77 |
| D2 | 5.69 | 6.44 |
| D5 | 26.11 | 14.30 |

Aspheric Coefficients:

R1: A = 0
B = −8.22 × 10⁻⁵
C = −4.56 × 10⁻⁷
D = −1.15 × 10⁻⁸
R4: A = 0
B = −1.52 × 10⁻⁵
C = −5.07 × 10⁻⁸
R6: A = 0
B = −3.81 × 10⁻⁶
C = −8.12 × 10⁻⁸
D = 1.98 × 10⁻⁹
E = −2.53 × 10⁻¹²

TABLE 4

| Condition No. | Factor | Numerical Example 10 | 11 | 12 |
|---|---|---|---|---|
| (21) | F1/Fw | −1.88 | −1.84 | −2.29 |
| (22) | E1W/Fw | 0.17 | 0.18 | 0.15 |
| (23) | F2/F3 | −0.8 | −0.78 | −0.79 |
| (24) | $\frac{E1W - E1T}{E2W - E2T}$ | −0.05 | −0.05 | −0.06 |
| (25) | $\frac{N1 + N3}{2} - N2$ | 0.27 | 0.27 | 0.25 |
| (27) | $B1 \cdot Y^3$ | −8.68 | −7.57 | −6.67 |
| (28) | $B2 \cdot Y^3$ | −1.22 | −0.86 | −1.23 |
| (29) | $B3 \cdot Y^3$ | −0.17 | −0.04 | 0.31 |

A last embodiment of the invention which is taken in view of focusing is described by reference to FIGS. 25, 26, 27 and 28. In this embodiment, a varifocal lens comprises, from front to rear, a first lens unit composed of a negative first lens, a second lens unit composed of a positive second lens and a positive third lens, and a third lens unit composed of a negative fourth lens, these three lens units being moved to vary the focal length, and the air separation between the second and third lens unit being varied to effect focusing, wherein letting the interval between the principal points of the first and second lens units in the wide-angle end be denoted by e1w, the interval between the principal points of the second and third lens units by e2w, the total sum of the thicknesses of all the lenses by Σ D, the shortest focal length of the entire lens system by fw, and the radius of curvature of the i-th lens surface by Ri, the following conditions are satisfied:

$$0.1 < \Sigma D/fw < 1.0 \quad (30)$$

$$0.2 < e1w/e2w < 2.0 \quad (31)$$

$$-6 < (R2+R1)/(R2-R1) < 6 \quad (32)$$

Alternatively, $$0.1 < \Sigma D/fw < 1.0 \tag{30}$$

$$0.2 < e1w/e2w < 2.0 \tag{31}$$

$$-0.5 < (R8+R7)/(R8-R7) < 1.1 \tag{33}$$

In the same figures, SP stands for the aperture stop (F-number stop), and FS for the flare stop. The arrows indicate the directions in which the lens units, the aperture stop and the flare stop move when varying the focal length from the wide-angle end to the telephoto end.

The varifocal lens according to the present embodiment, when varying the focal length from the wide-angle end to the telephoto end, moves all the lens units toward the object side as shown in each of the figures. Particularly in the present embodiment, the three lens units are all moved toward the object side independently of each other to vary the focal length. Again, the third lens unit is moved axially to effect focusing. The aperture stop SP is arranged in between the second lens and the third lens of the second lens unit, and, when varying the focal length, moves in unison with the second lens unit.

Figure 27:
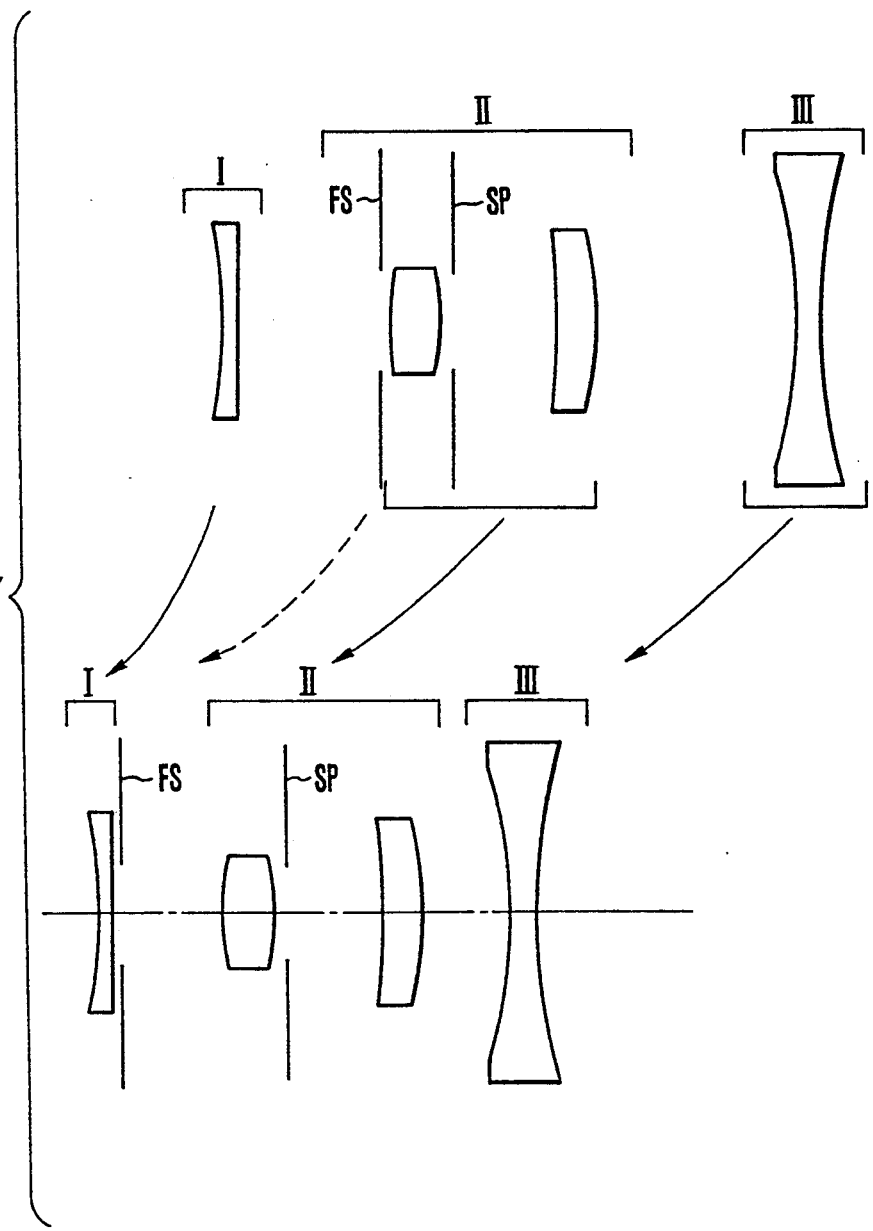

In FIG. 27, the flare stop FS is arranged in between the first lens unit and the second lens unit, on variation of the focal length from the wide-angle end to the telephoto end, to move either in unison with, or independently of, the third lens unit.

Figure 28:
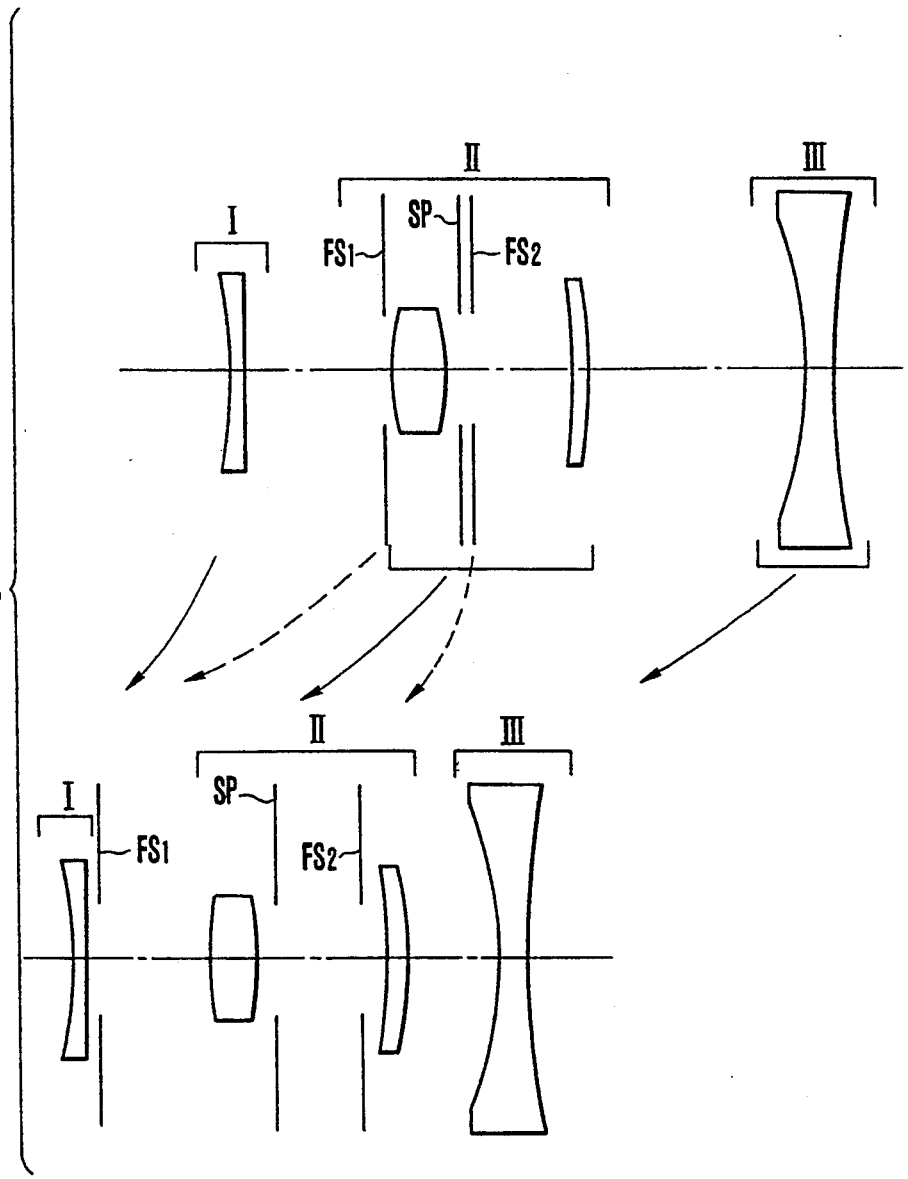
Figure 29A:
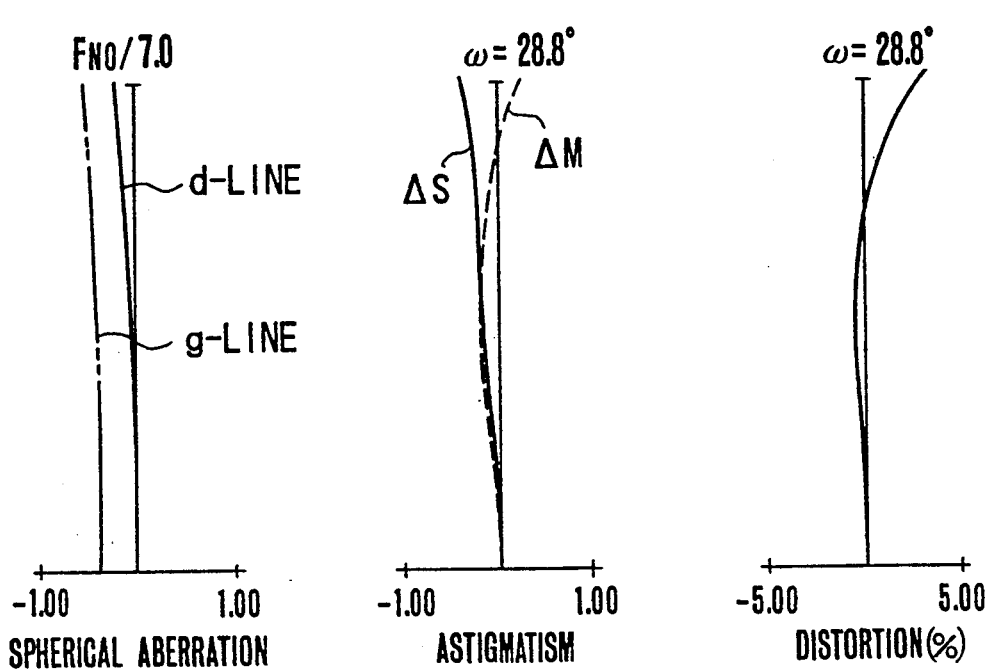
Figure 29B:
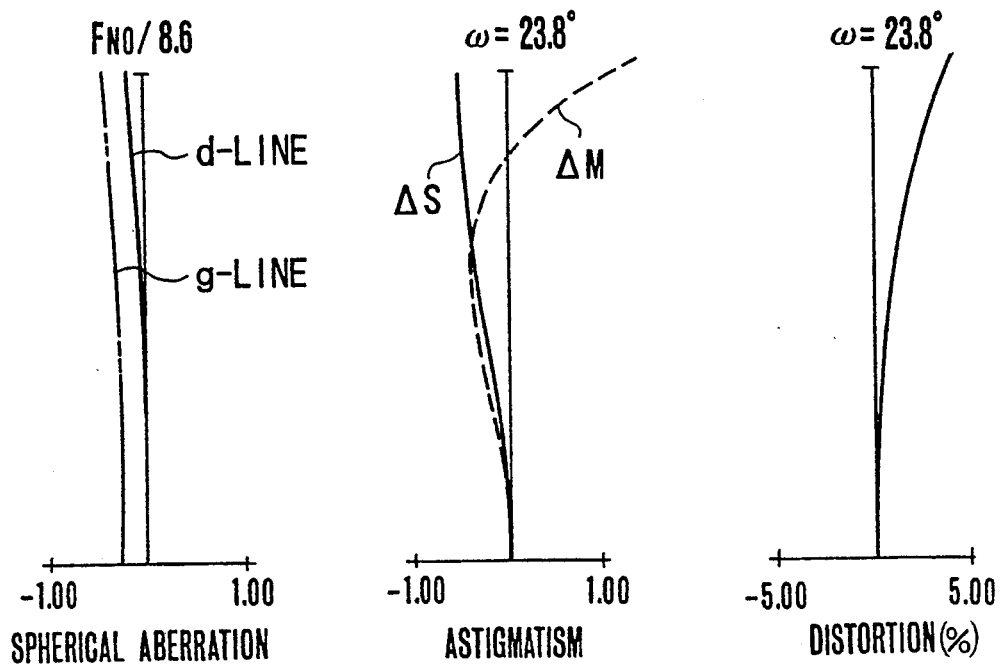
Figure 29C:
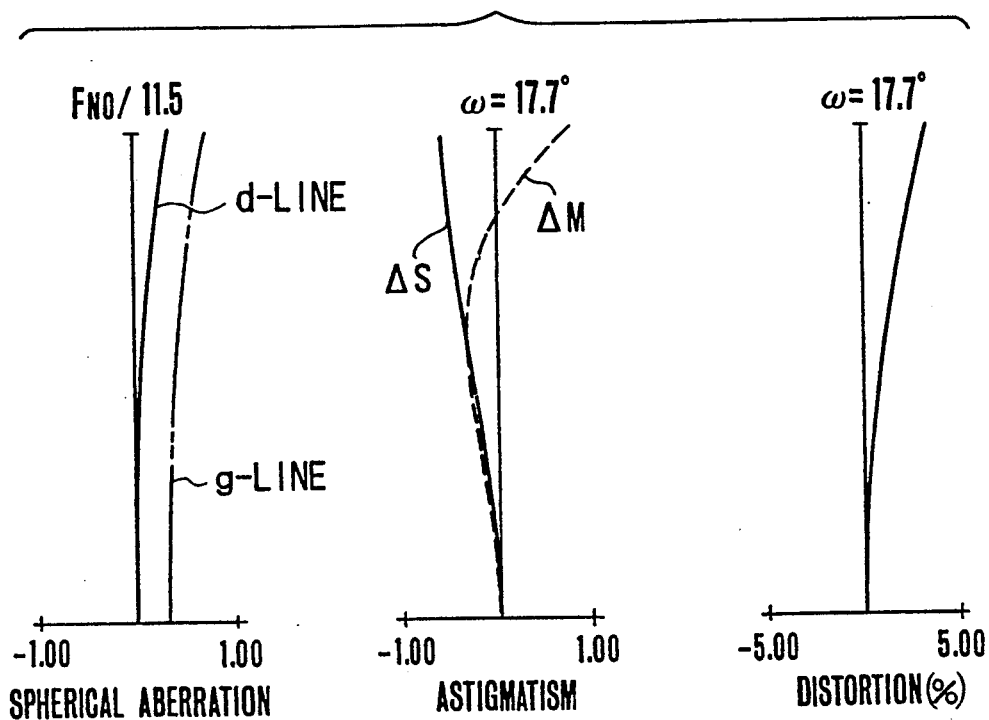
Figure 30A:
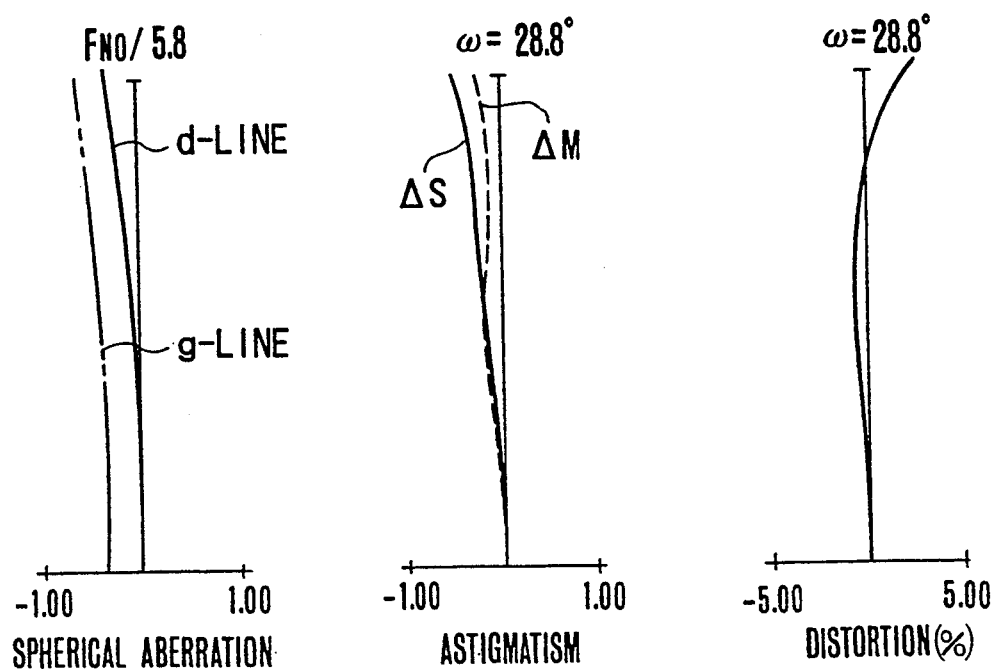
Figure 30B:
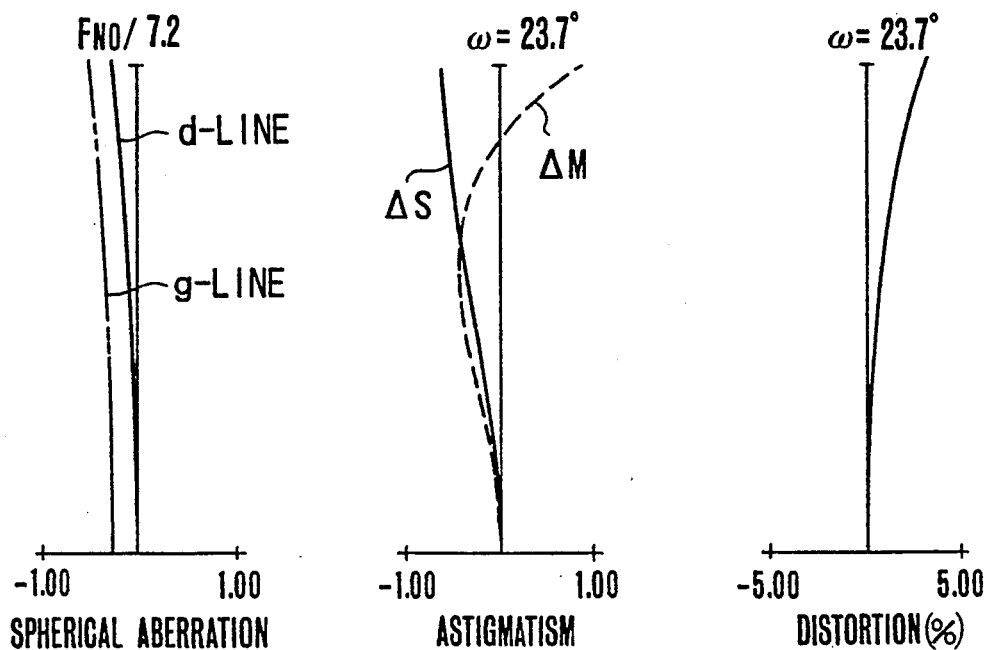
Figure 30C:
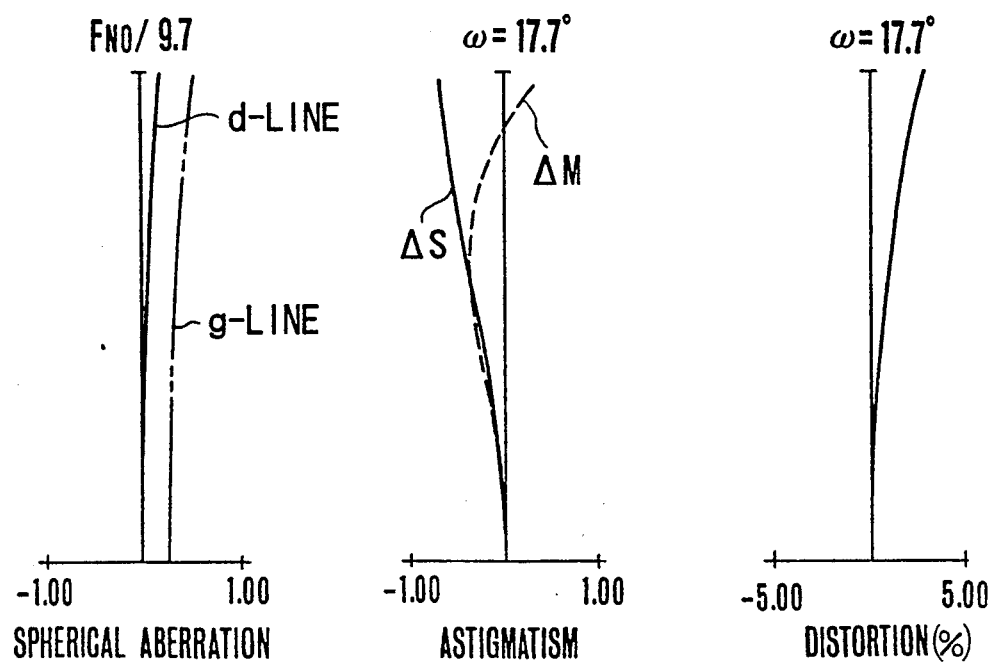
Figure 31A:
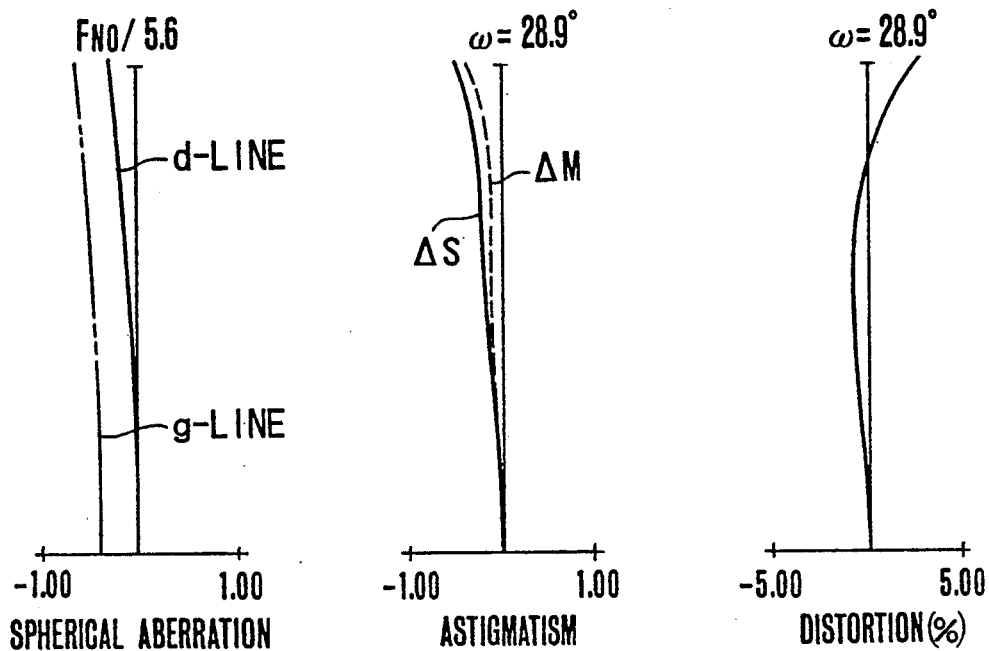
Figure 31B:
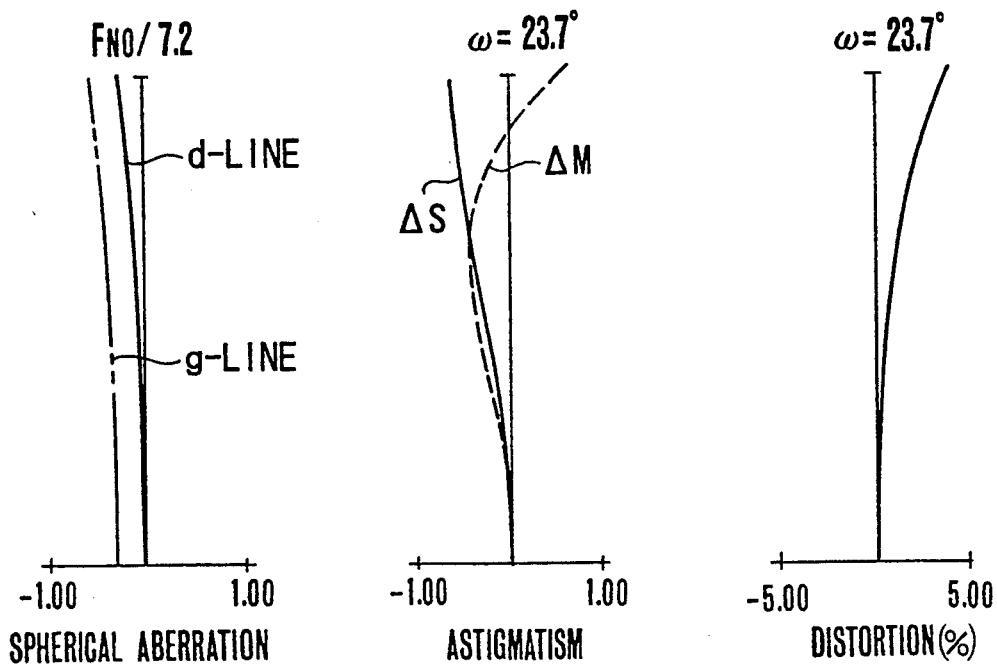
Figure 31C:
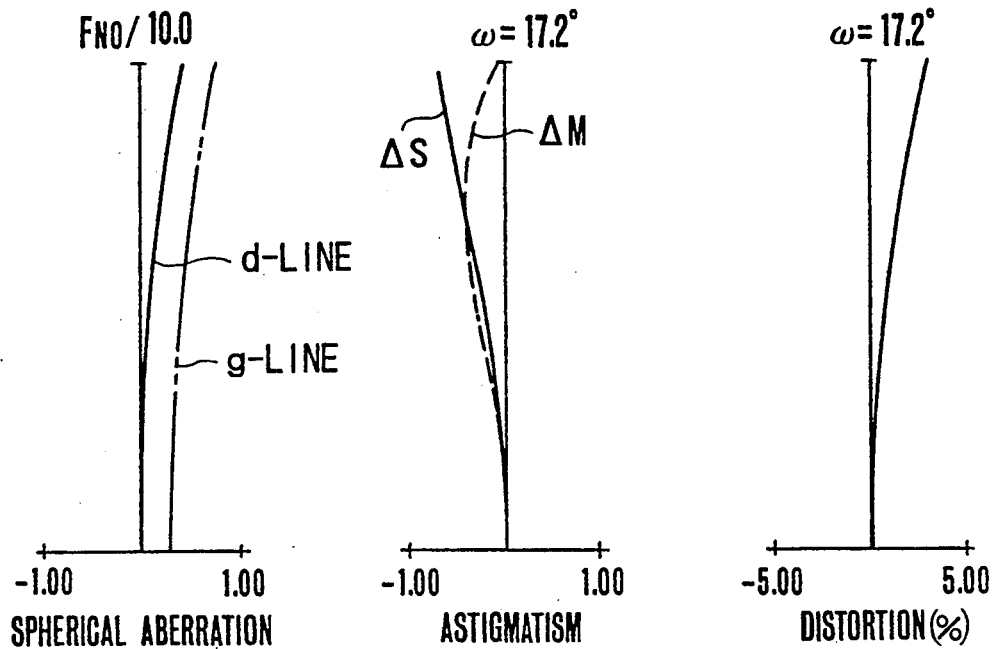
Figure 32A:
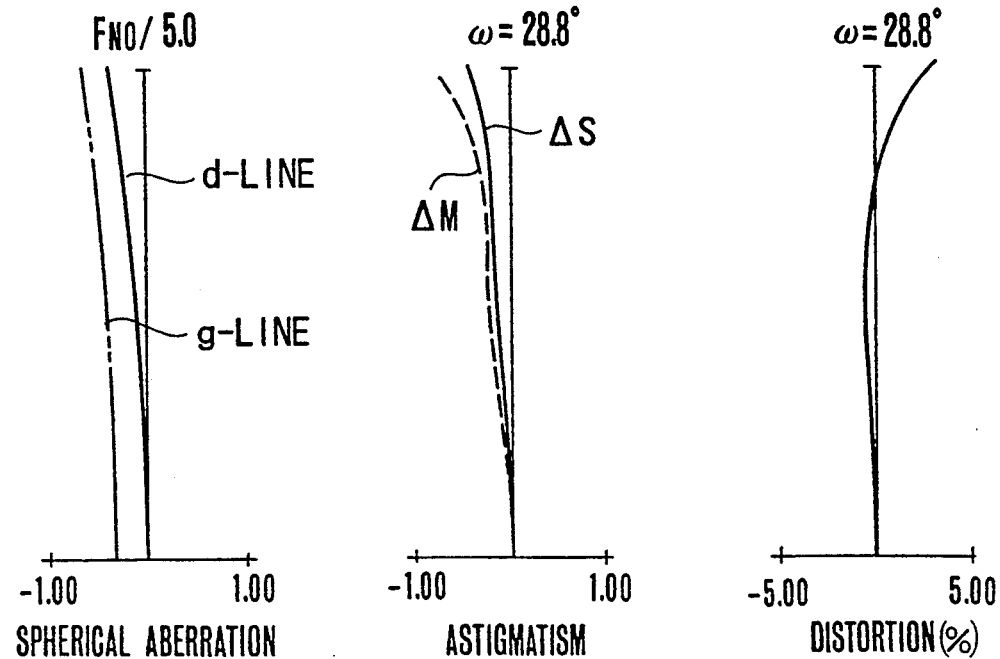
Figure 32B:
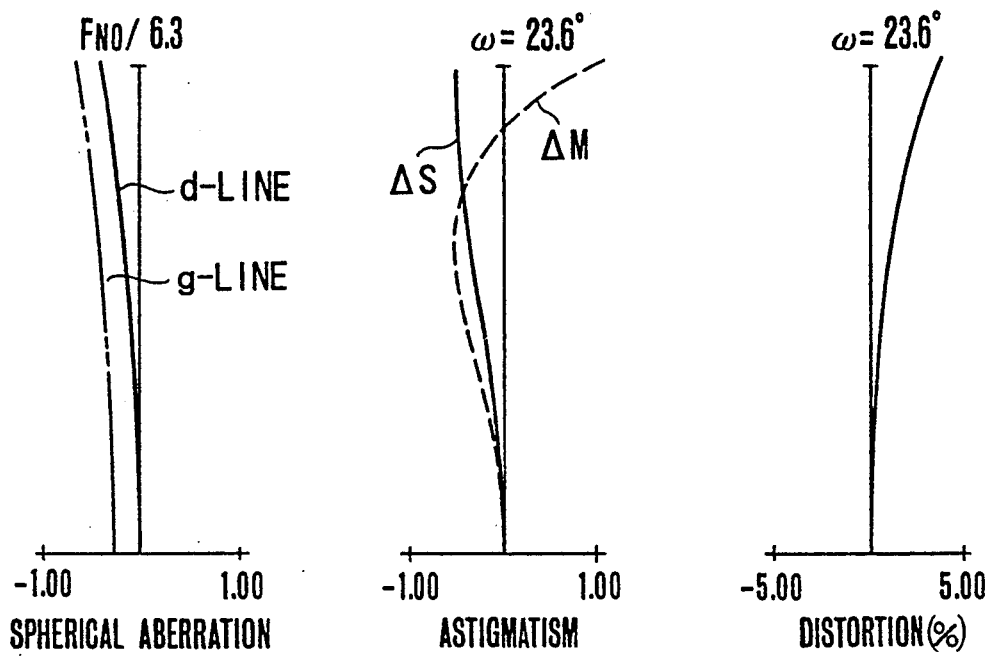
Figure 32C:
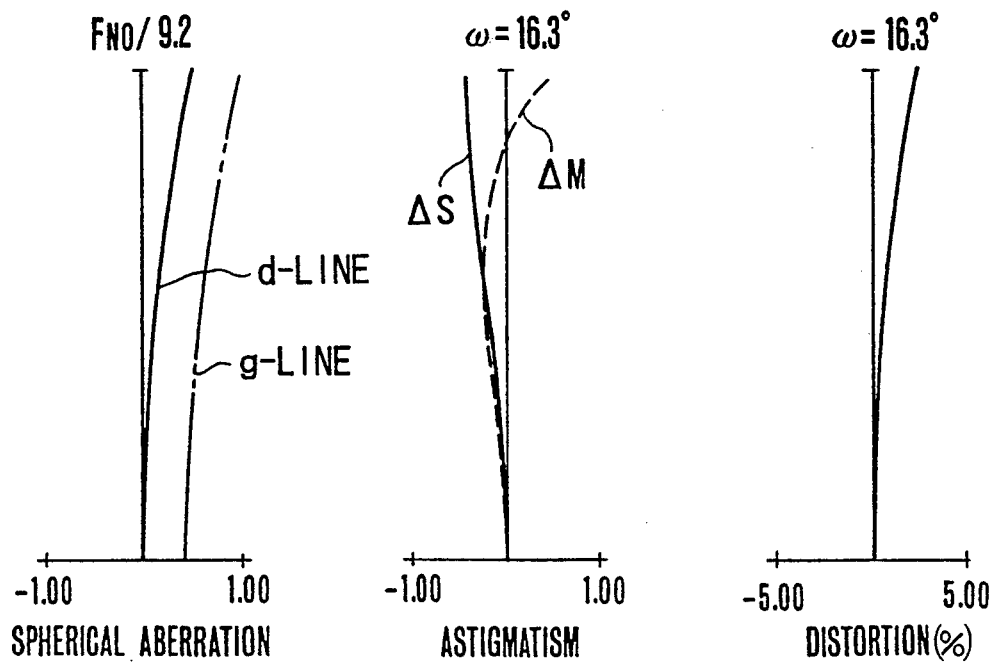

In FIG. 28, a first flare stop FS1 is arranged in between the first lens unit and the second lens unit, and a second flare stop FS2 is arranged in between the second lens and the third lens. And, when varying the focal length from the wide-angle end to the telephoto end, as shown by the dashed line arrows, the first flare stop FS1 moves either in unison with, or independently of, the third lens unit, and the second flare stop FS2 moves forward at a slower speed than the speed of movement of the second lens unit.

The zoom lens of the invention, as shown in FIG. 25 to FIG. 28, is constructed from three lens units of negative, positive and negative refractive powers from the object side, in other words, the second lens unit of positive refractive power flanked by the first and third lens units of negative refractive power, so that the lens form gets a refractive power arrangement of nearly symmetric type during zooming.

In particular, the second lens unit is constructed with the second lens of positive refractive power on the object side of the stop and the third lens of positive refractive power on the image side, so that the lens form as a whole is nearly symmetric with respect to the stop over the entire range of variation of the focal length.

By using such a nearly symmetric type of lens arrangement, instead of employing the method of correcting chromatic aberrations in each lens unit as in the prior art, the lens system is corrected as a whole for the chromatic aberrations in good balance. In other words, the aberrations of the three lens units are canceled out with each other.

And, by satisfying the above-described conditions (30) and (31) and at least one of the above-described conditions (32) and (33), variation of aberrations is lessened over the entire zooming range to obtain good optical performance.

The technical significance of each of the above-described conditions is explained below.

The inequalities of condition (30) are, as the 3-unit varifocal lens is constructed with four lenses as a whole, to properly set the total sum of the thicknesses of these four lenses. When the total sum of the lens thicknesses is too thin as beyond the lower limit, it becomes difficult to well maintain the surface tolerance of each lens. When it is too thick as beyond the upper limit, the whole lens system comes to increase in size.

The inequalities of condition (31) are, as the varifocal lens is constructed with three lens units of negative, positive and negative refractive powers, concerned with the paraxial refractive power arrangement of all the lens units in the wide-angle end and aim chiefly to correct various aberrations with ease while still maintaining the minimization of the size of the entire lens system to be achieved. When the lower limit is exceeded, the back focal distance in the wide-angle end becomes too short and the effective diameter of the fourth lens comes to increase. Conversely when the upper limit is exceeded, the back focal distance becomes longer than necessary, so the total length of the lens system gets longer.

The inequalities of condition (32) concern with the shape of the negative first lens and aim chiefly to well correct spherical aberration. When the lower limit is exceeded, large spherical aberrations of higher orders are produced, and variation of aberrations with variation of the surface shape becomes large. Conversely when the upper limit is exceeded, the spherical aberration is under-corrected over the entire range of variation of the focal length.

The inequalities of condition (33) concern with the shape of the negative fourth lens and aim chiefly to well correct off-axial aberrations throughout the entire range of variation of the focal length. When the lower limit is exceeded, the astigmatism increases largely. When the upper limit is exceeded, over-correction of the meridional image surface results.

Incidentally, in the varifocal lens of the present embodiment, to maintain particularly the Petzval sum at a proper value to well correct curvature of field, it is good to satisfy at least one of the following conditions:

$$1.57 < N1 \tag{34}$$

$$1.72 < N4 \tag{35}$$

where N1 and N4 are the refractive indices of the materials of the first lens and the fourth lens respectively.

When the conditions (34) and (35) are violated, the curvature of field comes to be over-corrected in either case. So, that is no good.

In the present embodiment, to achieve reduction of the weight of the entire lens system, it is good to make, for example, the positive third lens, from plastic material. And, at this time, to prevent change of the imaging performance such as focus shift with variation of the ambient temperature from occurring, it is good to set the focal length f3 of the third lens as follows:

$$1 < f3/fw < 15 \tag{36}$$

When the positive refractive power of the third lens is too strong as beyond the lower limit of the condition (36), the focus shift with temperature change increases largely, and the lens barrel structure gets more complicated. Conversely when the positive refractive power of the third lens is too weak as beyond the upper limit, the whole second lens unit produces large spherical aberration. So, that is no good.

In the present embodiment, to lessen variation of aberrations throughout the entire range of variation of the focal length for obtaining good optical performance, it is good to apply an aspheric sphere of such shape that the negative refractive power gets stronger toward the margin of the lens to at least one lens surface of the first lens. Or it is good to apply an aspheric sphere of such shape that the positive refractive power gets weaker toward the margin of the lens to at least one lens surface in the second lens unit.

The varifocal lens of the present embodiment has its first, second and third lens units made to move forward independently of each other when the focal length is varied from the wide angle-end to the telephoto end. But the moving method is not necessarily confined to this, provided it results that the focal length is varied and a sharp image is obtained.

Figure 33:
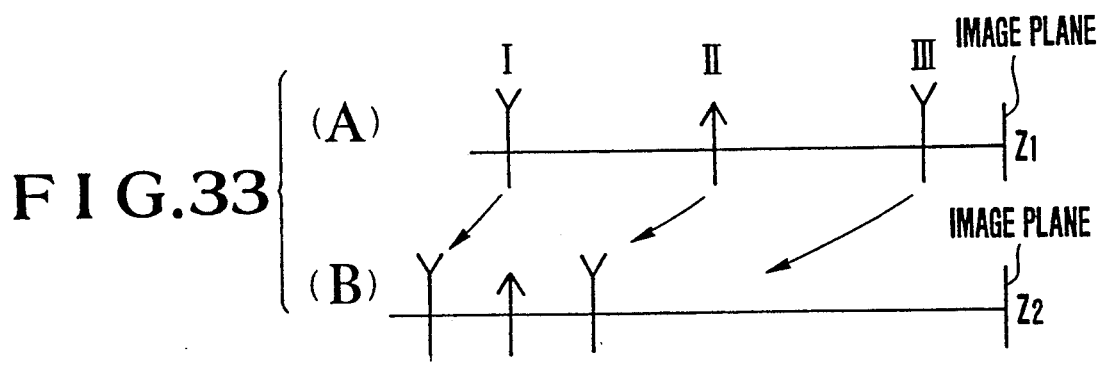
FIGS. 33, 34 and 35 are diagrams illustrating the ways in which the lens units of the varifocal lens of the invention move axially when zooming.

The parts (A) and (B) of FIG. 33, similarly to FIG. 25 to FIG. 28, show the states of varying the focal length from a focal length position z1 to another focal length position z2 by moving the first, second and third lens units independently of each other.

Figure 34:
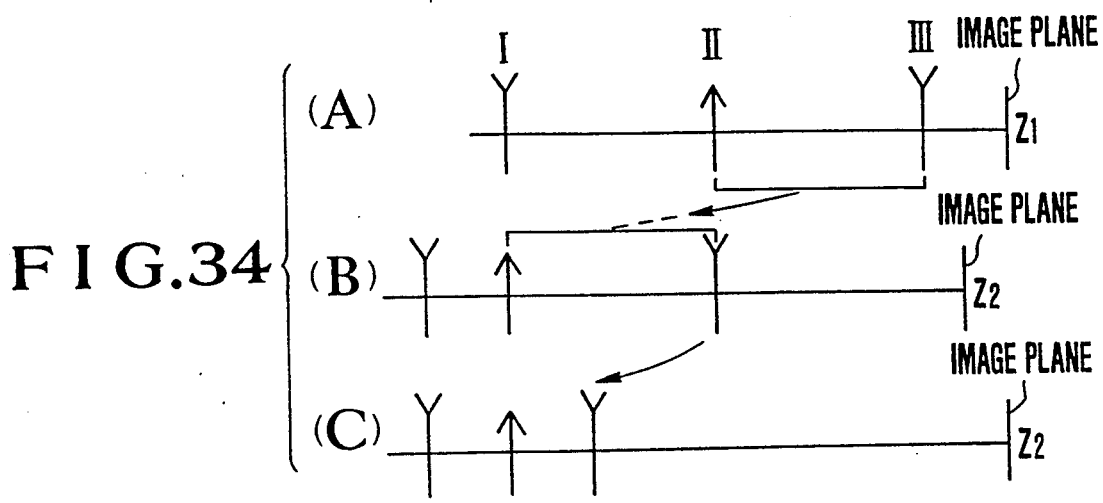

This may otherwise be done. As shown in, for example, the parts (A) and (B) of FIG. 34, the first lens unit is moved independently, while the second lens unit and the third lens unit are moved in unison forward until the second lens unit reaches a position corresponding to the focal length position z2. The shift of the image plane occurring in this time is then compensated by moving the third lens unit for focusing and setting it as shown in part (C) of FIG. 34. And, as a result, an identical optical arrangement to that of the part (B) of FIG. 33 takes place. It is also to be noted that the movements of all the lens units when varying the focal length from the focal length position z2 to the focal length position z1 are just reverse to those described above.

Figure 35:
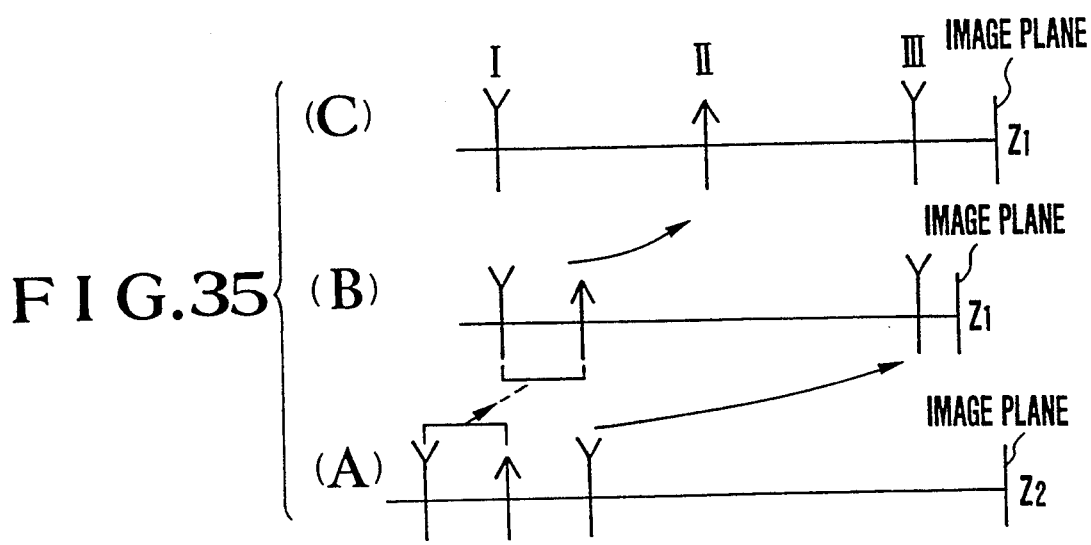

Besides this, the zooming movements may otherwise be done as shown in parts (A), (B) and (C) of FIG. 35. Taking the focal length position z2 as the reference, when varying the focal length from the focal length position z2 to the focal length position z1, as shown in the parts (A) and (B) of FIG. 35, the third lens unit is moved independently, while the first lens unit and the second lens unit are moved in unison rearward until the first lens unit reaches a position corresponding to the focal length position z1. The second lens unit for focusing is then moved so as to compensate for the shift of the image plane occurring in this time, and set as shown in the part (C) of FIG. 35. And, as a result, an identical optical arrangement to that shown in the part (A) of FIG. 33 takes place. It is also to be noted that the movements of all the lens units when varying the focal length from the focal length position z1 to the focal length position z2 are just reverse to those described above.

Numerical examples 13 to 16 of this embodiment of the invention are shown below.

The values of the factors in the above-described conditions (30) to (36) for the numerical examples 13 to 16 are also listed in Table-5.

Numerical Example 13 (FIGS. 25, 29(A), 29(B) and 29(C))
F = 39.3–67.6   FNo = 1:7.0–11.5   $2\omega$ = 57.7°–35.5°

*R1 = −44.33   D1 = 1.20      N1 = 1.58306   $\nu$1 = 30.2
R2 = −456.87   D2 = Variable
R3 = 29.92     D3 = 4.00      N2 = 1.49700   $\nu$2 = 81.6

-continued

R4 = −29.45    D4 = 2.43
R5 = (Stop)    D5 = 5.05
R6 = −98.00    D6 = 3.00      N3 = 1.49171   $\nu$3 = 57.4
*R7 = −30.95   D7 = Variable
R8 = −48.36    D8 = 2.00      N4 = 1.78590   $\nu$4 = 44.2
R9 = 45.85

| Variable Separation | Focal Length | | |
|---|---|---|---|
| | 39.30 | 49.09 | 67.60 |
| D2 | 12.83 | 11.27 | 8.63 |
| D7 | 15.37 | 11.73 | 7.82 |

R1: Aspheric Coefficients:
A = 0
B = −2.613 × 10$^{-5}$
C = −8.468 × 10$^{-9}$
D = 6.892 × 10$^{-11}$ R7: Aspheric Coefficients:
A = 0
B = 2.485 × 10$^{-5}$
C = 2.161 × 10$^{-7}$ Numerical Example 14 (FIGS. 26, 30(A), 30(B) and 30(C))
F = 39.33–67.8   FNo = 1:5.8–9.7   $2\omega$ = 57.6°–35.4°

*R1 = −51.31   D1 = 1.20      N1 = 1.69895   $\nu$1 = 30.1
R2 = −384.19   D2 = Variable
R3 = 30.19     D3 = 4.00      N2 = 1.49700   $\nu$2 = 81.6
R4 = −28.23    D4 = 1.09
R5 = (Stop)    D5 = 7.73
R6 = −83.82    D6 = 3.00      N3 = 1.49171   $\nu$3 = 57.4
*R7 = −34.70   D7 = Variable
R8 = −42.40    D8 = 2.00      N4 = 1.78590   $\nu$4 = 44.2
R9 = 59.99

| Variable Separation | Focal Length | | |
|---|---|---|---|
| | 39.33 | 49.23 | 67.80 |
| D2 | 12.50 | 11.74 | 9.67 |
| D7 | 16.57 | 12.15 | 7.63 |

R1: Aspheric Coefficients:
A = 0
B = −2.079 × 10$^{-5}$
C = −2.835 × 10$^{-8}$
D = −4.861 × 10$^{-11}$ R7: Aspheric Coefficients:
A = 0
B = 2.627 × 10$^{-5}$
C = 9.850 × 10$^{-8}$
D = 3.187 × 10$^{-10}$ Numerical Example 15 (FIGS. 27, 31(A), 31(B) and 31(C))
F = 39.19–70.0   FNo = 1:5.8–10.0   $2\omega$ = 57.8°–34.3°

*R1 = −51.12   D1 = 1.20      N1 = 1.68893   $\nu$1 = 31.1
R2 = −413.89   D2 = Variable
R3 = Flare Stop   D3 = Variable
R4 = 30.29     D4 = 4.00      N2 = 1.49700   $\nu$2 = 81.6
R5 = −28.23    D5 = 1.17
R6 = (Stop)    D6 = 7.80
R7 = −83.58    D7 = 3.00      N3 = 1.49171   $\nu$3 = 57.4
*R8 = −34.61   D8 = Variable
R9 = −42.16    D9 = 2.00      N4 = 1.78590   $\nu$4 = 44.2
R10 = 59.37

| Variable Separation | Focal Length | | |
|---|---|---|---|
| | 39.19 | 49.34 | 70.01 |
| D2 | 11.97 | 6.63 | 0.50 |
| D3 | 0.50 | 4.98 | 8.70 |
| D8 | 16.74 | 12.26 | 7.47 |

R1: Aspheric Coefficients:
A = 0
B = −2.141 × 10$^{-5}$
C = −2.000 × 10$^{-8}$
D = −4.861 × 10$^{-11}$ R8: Aspheric Coefficients:
A = 0
B = 2.672 × 10$^{-5}$
C = 1.021 × 10$^{-7}$
D = 3.187 × 10$^{-10}$ Numerical Example 16 (FIGS. 28, 32(A), 32(B) and 32(C))

-continued

| F = 39.32–74.0 | FNo = 1:5.0–9.2 | 2ω = 57.6°–32.6° | |
|---|---|---|---|
| *R1 = −53.43 | D1 = 1.20 | N1 = 1.69895 | ν1 = 30.1 |
| R2 = −658.93 | D2 = Variable | | |
| R3 = First Flare Stop | D3 = Variable | | |
| R4 = 30.60 | D4 = 4.00 | N2 = 1.49700 | ν2 = 81.6 |
| R5 = −27.87 | D5 = 1.51 | | |
| R6 = (Stop) | D6 = Variable | | |
| R7 = Second Flare Stop | D7 = Variable | | |
| R8 = −82.18 | D8 = 1.50 | N3 = 1.49171 | ν3 = 57.4 |
| *R9 = −37.49 | D9 = Variable | | |
| R10 = −37.66 | D10 = 2.00 | N4 = 1.78590 | ν4 = 44.2 |
| R11 = 70.06 | | | |

| Variable Separation | Focal Length | | |
|---|---|---|---|
| | 39.33 | 49.48 | 74.00 |
| D2 | 11.51 | 6.53 | 1.00 |
| D3 | 0.50 | 5.38 | 8.94 |
| D6 | 1.00 | 6.35 | 7.00 |
| D7 | 7.78 | 2.43 | 1.78 |
| D9 | 18.15 | 13.27 | 7.57 |

R1: Aspheric Coefficients:
$A = 0$
$B = -2.075 \times 10^{-5}$
$C = -3.025 \times 10^{-8}$
$D = -2.222 \times 10^{-10}$ R9: Aspheric Coefficients:
$A = 0$
$B = 2.704 \times 10^{-5}$
$C = 9.656 \times 10^{-8}$
$D = 4.303 \times 10^{-10}$

TABLE 5

| Condition No. | Factor | Numerical Example | | | |
|---|---|---|---|---|---|
| | | 13 | 14 | 15 | 16 |
| (30) | ΣD/fw | 0.260 | 0.259 | 0.260 | 0.221 |
| (31) | e1w/e2w | 0.714 | 0.645 | 0.639 | 0.566 |
| (32) | (R2 + R1)/(R2 − R1) | 1.215 | 1.308 | 1.282 | 1.177 |
| (33) | (R8 + R7)/(R8 − R7) | −0.027 | 0.172 | 0.169 | 0.301 |
| (34) | N1 | 1.583 | 1.699 | 1.699 | 1.699 |
| (35) | N4 | 1.786 | 1.786 | 1.786 | 1.786 |
| (36) | f3/fw | 2.308 | 3.002 | 3.005 | 3.527 |

As has been described above, according to the invention, by specifying the refractive power, the form and the construction and arrangement of the three lens units as has been described before, a zoom lens whose bulk and size as a whole are minimized with a zoom ratio of about 2 and having good optical performance throughout the entire zooming range, can be achieved.

What is claimed is:

1. An image forming system comprising:
   from front to rear,
   a first lens unit having a negative refractive power;
   a second lens unit having a positive refractive power;
   a third lens unit having a negative refractive power,
   wherein at least one lens unit of said first lens unit and said second lens unit consists of a cemented lens or single lens, with variation of the focal length of the entire image forming system being performed by varying each of the air separation between said first lens unit and said second lens unit and the air separation between said second lens unit and said third lens unit, and an object in front of said first lens unit results in an effective image frame behind said third lens unit, and
   wherein said image forming system satisfies the following conditions:

$$0.1 < \Sigma d/fw < 0.5$$

wherein Σd is the sum of the axial thickness of said first, second, and third lens units, and fw is the shortest focal length of the entire image forming system.

2. An image forming system according to claim 1, satisfying the following conditions:

$$0.2 < E1w/E2w < 1.2$$

$$0.2 < |f3|/FT < 1.0$$

where E1w and E2w are the interval between the principal points of said first lens unit and said second lens unit and the interval between the principal points of said second lens unit and said third lens unit in the wide-angle end respectively, f3 is the focal length of said third lens unit and FT is the longest focal length of the entire lens system.

3. An image forming system according to claim 1, satisfying the following conditions:

$$0.25 < D_{23T}/FW < 0.5$$

where $D_{23T}$ is the air separation between said second lens unit and said third lens unit in the telephoto end and FW is the shortest focal length of the entire image forming system.

4. An image forming system comprising:
   from front to rear,
   a first lens unit having a negative refractive power;
   a second lens unit having a positive refractive power;
   a third lens unit having a negative refractive power;
   wherein the number of all lenses is, taking a cemented lens or two, not more than four, and
   wherein variation of the focal length of the image forming system is performed by varying the air separation between said first lens unit and said second lens unit and the air separation between said second lens unit and said third lens unit, and an object in front of said first lens unit results in an effective image frame behind said third lens unit, and
   wherein said image forming system satisfies the following conditions:

$$0.1 < \Sigma d/fw < 0.5$$

where Σd is the sum of the axial thickness of said first, second, and third lens units, and fw is the shortest focal length of the entire image forming system.

5. An image forming system according to claim 4, satisfying the following conditions:

$$0.2 < E1w/E2w < 1.2$$

$$0.2 < |f3|/FT < 1.0$$

where E1w and E2w are the interval between the principal points of said first lens unit and said second lens unit and the interval between the principal points of said second lens unit and said third lens unit in the wide-angle end respectively, f3 is the focal length of said third lens unit and FT is the longest focal length of the entire image forming system.

6. Image forming system according to claim 4, satisfying the following conditions:

$$1.5 FNW \cdot Z < FNT$$
$$FNW < 0.1Y$$

where FNW and FNT are the F-numbers at full-open aperture of the entire image forming system system in the wide-angle end and the telephoto end respectively, Z is the zoom ratio and Y is the diagonal length of the image frame.

7. An image forming system according to claim 4, wherein each of said lens units consists of a single lens.

8. An image forming system according to claim 4, satisfying the following conditions:

$$0.6 < M1/M2 < 1.7$$
$$0.3 < M2/M3 < 0.9$$

where M1, M2 and M3 are the amounts of movement of said first, second and third lens units in varying the focal length from the wide angle-end to the telephoto end respectively.

9. An image forming system of claim 4, satisfying the following conditions:

$$0.5 < M3/FW < 1.3$$
$$-4 < F1/FW < -1.5$$

where M3 is the amount of movement of said third lens unit in varying the focal length from the wide-angle end to the telephoto end, F1 is the focal length of said first lens unit, and FW is the shortest focal length of the entire image forming system.

10. An image forming system according to claim 4, satisfying the following condition:

$$0.25 < D_{23T}/FW < 0.5$$

where $D_{23T}$ is the air separation between said second lens unit and said third lens unit in the telephoto end and FW is the shortest focal length of the entire image forming system.

11. An image forming system according to claim 4, wherein said third lens unit is a singlet of meniscus shape convex toward the image side, and satisfies the following condition:

$$1.40 < (RB+RA)/(RB-RA) < 1.65$$

where RA and RB are the radii of curvature of the front and rear surfaces of said singlet respectively.

12. An image forming system according to claim 11, wherein said first lens unit is a singlet of meniscus shape convex toward the object side and an aspheric surface is applied to the front or rear side of said singlet, and satisfying the following condition:

$$1 < |B \cdot Y^3| < 15$$

where B is the 4th order aspheric coefficient of said aspheric surface, and Y is the diagonal length of the effective image frame.

13. An image forming according to claim 12, satisfying the following conditions:

$$0.4 < F2/FW < 0.9$$
$$-1.5 < F3/FW < -0.4$$

where F2 and F3 are the focal lengths of said second and third lens units respectively, and FW is the shortest focal length of the entire image forming system.

14. An image forming system according to claim 4, wherein
said first lens unit consists of a single first lens,
said second lens unit consists of a positive second lens and a positive third lens, and
said third lens unit consists of a single fourth lens, wherein letting the i-th lens thickness or air separation in the wide-angle end be denoted by Di, the air separation between said first lens and said second lens in the telephoto end by D2T, and the shortest focal length of the entire image forming system by FW, the following conditions are satisfied:

$$0.06 < (D1+D2T)/FW < 0.7$$
$$0.1 < (D3+D4+D5)/FW < 0.5$$

15. An image forming according to claim 14, satisfying the following conditions:

$$0.6 < M1/M2 < 1.7$$
$$0.3 < M2/M3 < 0.9$$

where M1, M2 and M3 are the amounts of movement of said first, second and third lens units in varying the focal length from the wide-angle end to the telephoto end.

16. An image forming system according to claim 15, satisfying the following condition:

$$0.1 < D6T/FW < 0.6$$

where D6T is the air separation between said third lens and said fourth lens in the telephoto end.

17. An image forming system according to claim 4, wherein all said lens units each consists of a single lens and, letting the focal length of the i-th lens unit be denoted by Fi, the shortest focal length of the entire image forming system by FW, and the interval between the principal points of the i-th lens unit and the (i+1)st lens unit by EiW, the following conditions are satisfied:

$$-2.8 < F1/Fw < -1.3$$
$$0.11 < E1W/Fw < 0.25$$

18. An image forming system according to claim 17, wherein letting the interval between the principal points of the i-th lens unit and the (i+1)st lens unit in the telephoto end be denoted by EiT, and the refractive index and Abbe number of the material of the lens of said i-th lens unit by Ni and $\Sigma i$ respectively, the following conditions are satisfied:

$$-1 < F2/F3 < -0.6$$
$$-0.3 < (E1W - E1T)/(E2W - E2T) < 0.2$$
$$0.16 < (N1 + N3)/2 - N2 < 0.45$$
$$\nu 1 < \nu 3 < \nu 2$$

19. An image forming system according to claim 4, wherein focusing is performed by varying the air separation between said second lens unit and said third lens unit.

20. An image forming system according to claim 4, wherein said second lens unit has two positive lenses.

21. An image forming system according to claim 4, wherein said third lens unit has two lenses.

22. A compact varifocal lens system for forming an image from an object comprising:
from front to rear,
a first lens unit having a negative refractive power;
a second lens unit having a positive refractive power;
a third lens consisting of a single lens with negative refractive power;
wherein one of said first lens unit and said second lens unit consists of a single lens, and
wherein variation of the focal length of the entire lens system is performed by varying both the air separation between said first lens unit and second lens unit and the air separation between said second lens unit and said third lens unit, and an object in front of said first lens unit results in an effective image frame behind said third lens unit, and
wherein said compact varifocal lens satisfies the following conditions:

$$0.4 < F2/Fw < 0.9$$

$$-1.5 < F3/Fw < -0.4$$

where F2 and F3 are the focal lengths of said second and third lens units respectively, and Fw is the shortest focal length of the entire lens system.

23. A compact varifocal lens according to claim 22, satisfying the following conditions:

$$0.1 < \Sigma d/fw < 0.5$$

where d is the sum of the axial thicknesses of said first, second and third lens units, and fw is the shortest focal length of the entire lens system.

24. A compact varifocal lens according to claim 22, satisfying the following conditions:

$$0.2 < E1w/E2w < 1.2$$

$$0.2 < |f3|/FT < 1.0$$

where E1w and E2w are the interval between the principal points of said first lens unit and said second lens unit and the interval between the principal points of said second lens unit and said third lens unit in the wide-angle end respectively, f3 is the focal length of said third lens unit and FT is the longest focal length of the entire lens system.

25. A compact varifocal lens according to claim 22, satisfying the following conditions:

$$1.5\, FNW.Z > FNT$$

$$FNW > 0.1Y$$

where FNW and FNT are the F-numbers at full-open aperture of the entire lens system in the wide-angle end and the telephoto end respectively, Z is the zoom ratio and Y is the diagonal length of the image frame.

26. A compact varifocal lens according to claim 22, wherein all said lens units consist of a single lens.

27. A compact varifocal lens according to claim 22, satisfying the following conditions:

$$0.6 < M1/M2 < 1.7$$

$$0.3 < M2/M3 < 0.9$$

where M1, M2 and M3 are the amounts of movement of said first, second and third lens units in varying the focal length from the wide-angle end to the telephoto end respectively.

28. A compact varifocal lens according to claim 22, satisfying the following conditions:

$$0.5 < M3/FW < 1.3$$

$$-4 < F1/FW < -1.5$$

where M3 is the amount of the movement of said third lens unit in varying the focal length from the wide-angle end to the telephoto end, F1 is the focal length of said first lens unit, and FW is the shortest focal length of the entire lens system.

29. A compact varifocal lens according to claim 22, satisfying the following condition:

$$0.25 < D_{23T}/FW < 0.5.$$

where $D_{23T}$ is the air separation between said second lens unit and said third lens unit in the telephoto end and FW is the shortest focal length of the entire lens system.

30. A compact varifocal lens according to claim 22, wherein said third lens unit is a singlet of meniscus shape convex toward the image side, and satisfies the following condition:

$$1.40 < (RB+RA)/(RB-RA) < 1.65$$

where RA and RB are the radii of curvature of the front and rear surfaces of said singlet respectively.

31. A compact varifocal lens according to claim 22, wherein
said first lens unit consists of a single first lens,
said second lens unit consists of a positive second lens and a positive third lens, and
said third lens unit consists of a single fourth lens, wherein letting the i-th lens thickness or air separation in the wide-angle end be denoted by Di, the air separation between said first lens and said second lens in the telephoto end by D2T, and the shortest focal length of the entire system by FW, the following conditions are satisfied:

$$0.06 < (D1+D2T)/FW < 0.7$$

$$0.1 < (D3+D4+D5)/FW < 0.5.$$

32. An image forming system comprising:
from front to rear,
a first lens unit having a negative refractive power;
a second lens unit having a positive refractive power;
a third lens unit having a negative refractive power;
wherein at least one lens unit of said first lens unit and said second lens unit consists of a cemented lens or single lens, with variation of the focal length of the entire image forming system being performed by varying each of the air separation between said first lens unit and said second lens unit and the air separation between said second lens unit and said third lens unit, and an object in front of said first lens unit results in an effective image frame behind said third lens unit, and
wherein said image forming system satisfies the following condition:

$$0.25 < D_{23T}/FW < 0.5$$

where $D_{23T}$ is the air separation between said second lens unit and said third lens unit in the telephoto end and FW is the shortest focal length of the entire image forming system.

33. An image forming system according to claim 32, satisfying the following conditions:

$$1.5 FNW \cdot Z < FNT$$

$$FNW < 0.1Y$$

where FNW and FNT are the F-numbers at full-open aperture of the entire image forming system in the wide-angle end and the telephoto end respectively, Z is the zoom ratio and Y is the diagonal length of the image frame.

34. An image forming system according to claim 32, wherein all said lens units each consist of a single lens.

35. An image forming system according to claim 32, satisfying the following conditions:

$$0.6 < M1/M2 < 1.7$$

$$0.3 < M2/M3 < 0.9$$

where M1, M2 and M3 are the amounts of movement of said first, second and third lens units in varying the focal length from the wide angle-end to the telephoto end respectively.

36. An image forming system according to claim 32, satisfying the following conditions:

$$0.5 < M3/FW < 1.3$$

$$-4 < F1/FW < -1.5$$

where M3 is the amount of movement of said third lens unit in varying the focal length from the wide-angle end to the telephoto end, F1 is the focal length of said first lens unit, and FW is the shortest focal length of the entire image forming system.

37. An image forming system according to claim 32, wherein said third lens unit is a singlet of meniscus shape convex toward the image side, and satisfies the following condition:

$$1.40 < (RB+RA)/(RB-RA) < 1.65$$

where RA and RB are the radii of curvature of the front and rear surfaces of said singlet respectively.

38. An image forming system according to claim 37, wherein said first lens unit is a singlet of meniscus shape convex toward the object side and an aspheric surface is applied to the front or rear side of said singlet, and satisfying the following condition:

$$1 < |B \cdot Y^3| < 15$$

where B is the 4th order aspheric coefficient of said aspheric surface, and Y is the diagonal length of the effective image frame.

39. An image forming system according to claim 38, satisfying the following conditions:

$$0.4 < F2/FW < 0.9$$

$$-1.5 < F3/FW < -0.4$$

where F2 and F3 are the focal lengths of said second and third lens units respectively, and FW is the shortest focal length of the entire lens system.

40. An image forming system according to claim 32, wherein
said first lens unit consists of a single first lens,
said second lens unit consists of a positive second lens and positive third lens, and
said third lens unit consists of a single fourth lens, wherein letting the i-th lens thickness or air separation in the wide-angle end be denoted by Di, the air separation between said first lens and said second lens in the telephoto end by D2T, and the shortest focal length of the entire image forming system by FW, the following conditions are satisfies:

$$0.06 < (D1+D2T)/FW < 0.7$$

$$0.1 < (D3+D4+D5)/FW < 0.5$$

41. An image forming system according to claim 40, satisfying the following conditions:

$$0.6 < M1/M2 < 1.7$$

$$0.3 < M2/M3 < 0.9$$

where M1, M2 and M3 are the amounts of movement of said first, second and third lens units in varying the focal length from the wide-angle end to the telephoto end.

42. An image forming system according to claim 41, satisfying the following condition:

$$0.1 < D6T/FW < 0.6$$

where D6T is the air separation between said third lens and said fourth lens in the telephoto end.

43. An image forming system according to claim 32, wherein all said lens units each consists of a single lens and, letting the focal length of the i-th lens unit be denoted by Fi, the shortest focal length of the entire image forming system by Fw, and the interval between the principal points of the i-th lens unit and the (i+1)st lens unit by EiW, the following conditions are satisfied:

$$-2.8 < F1/Fw < -1.3$$

$$0.11 < E1W/Fw < 0.25$$

44. An image forming system according to claim 43, wherein letting the interval between the principal points of the i-th lens unit and the (i+1)st lens unit in the telephoto end be denoted by EiT, and the refractive index and Abbe number of the material of the lens of said i-th lens unit by Ni and $\Sigma i$ respectively, the following conditions are satisfied:

$$-1 < F2/F3 < -0.6$$
$$-0.3 < (E1W - E1T)/(E2W - E2T) < 0.2$$
$$0.16 < (N1 + N3)/2 - N2 < 0.45$$
$$\nu 1 < \nu 3 < \nu 2$$

45. An image forming system according to claim 40, wherein focusing is performed by varying the air separation between said second lens unit and said third lens unit.

46. An image forming system according to claim 45, satisfying the following conditions:

$$0.1 < \Sigma D/fw < 1.0$$

$0.2 < e1w/e2w < 2.0$ $-6 < (R2+R1)/(R2-R1) < 6$ where e1w is the interval between the principal points of said first lens unit and said second lens unit in the wide-angle end, e2w is the interval between the principal points of said second lens unit and said third lens unit in the wide-angle end, $\Sigma D$ is the total sum of the thicknesses of all the lenses, fw is the shortest focal length of the entire image forming system, and Ri is the radius of curvature of the i-th lens surface.

47. An image forming system according to claim 46, satisfying the following condition:

$0.1 < \Sigma D/fw < 1.0$ $0.2 < e1w/e2w < 2.0$ $-0.5 < (R8+R7)/(R8-R7) < 1.1$ wherein e1w is the interval between the principal points of said first lens unit and said second lens unit in the wide-angle end, e2w is the interval between the principal points of said second lens unit and said third lens unit in the wide-angle end, $\Sigma D$ is the total sum of the thicknesses of all the lenses, fw is the shortest focal length of the entire system, and Ri is the radius of curvature of the i-th lens surface.

* * * * *

UNITED STATES PATENT AND TRADEMARK OFFICE
CERTIFICATE OF CORRECTION

PATENT NO. : 5,305,148
DATED : IKEMORI, ET AL.
INVENTOR(S) : April 19, 1994

Page 1 of 3

It is certified that error appears in the above-indentified patent and that said Letters Patent is hereby corrected as shown below:

COLUMN 2
    Line 26, "drawings" should read --drawings.--; and
    line 57, "canceled" should read --cancelled--.

COLUMN 6
    Line 39, "canceled" should read --cancelled--.

COLUMN 7
    Line 3, "Conversely" should read --Conversely,--;
    line 7, "form" should read --from--; and
    line 44, "prescribe" should read --prescribed--.

COLUMN 11
    Line 1, "respectively" should read --respectively,--;
    line 5, "$0.3<M2/M30.9$ (19)" should read --$0.3<M2/M3<0.9$ (19)--;
    line 16, "Conversely" should read --Conversely,--; and
    line 39, "So" should read --So,--.

COLUMN 13
    Line 24, "And, another" should read --Other--.

COLUMN 17
    Line 60, "canceled" should read --cancelled--.

COLUMN 18
    Line 19, "Conversely" should read --Conversely,--;
    line 28, "Conversely" should read --Conversely,--; and
    line 67, "Conversely" should read --Conversely,--.

UNITED STATES PATENT AND TRADEMARK OFFICE
CERTIFICATE OF CORRECTION

PATENT NO. : 5,305,148
DATED : IKEMORI, ET AL.
INVENTOR(S) : April 19, 1994

Page 2 of 3

It is certified that error appears in the above-indentified patent and that said Letters Patent is hereby corrected as shown below:

COLUMN 22
    Line  5, "second," should read --second--;
    line 22, "conditions:" should read --condition:--;
    line 36, "or" should read --as--;
    line 46, "conditions:" should read --condition:--;
    line 51, "second," should read --second--; and
    line 67, "Image" should read --An image--.

COLUMN 23
    Line  6, "system" (second occurrence) should be deleted;
    line 23, "of" should read --according to--; and
    line 63, "forming" should read --forming system--.

COLUMN 24
    Line 22, "forming" should read --forming system--;
    line 42, "FW," should read --Fw,--; and
    line 55, "$\Sigma_i$" should read --$vi$--.

COLUMN 25
    Line 30, "conditions:" should read --condition:--; and
    line 34, "d" should read --$\Sigma d$--.

UNITED STATES PATENT AND TRADEMARK OFFICE
CERTIFICATE OF CORRECTION

PATENT NO. : 5,305,148
DATED : IKEMORI, ET AL.
INVENTOR(S) : April 19, 1994

It is certified that error appears in the above-indentified patent and that said Letters Patent is hereby corrected as shown below:

COLUMN 27
    Line 11, "FNW<0.1Y" should read --FNW>0.1Y--; and
    line 19, "consist" should read --consists--.

COLUMN 28
    Line 15, "satisfies:" should read --satisfied:--; and
    line 53, "$\Sigma_i$" should read --$vi$--.

Signed and Sealed this

Fifteenth Day of November, 1994

BRUCE LEHMAN

Attest:

Attesting Officer    Commissioner of Patents and Trademarks